US012646027B2

(12) United States Patent
Sidhu

(10) Patent No.: US 12,646,027 B2
(45) Date of Patent: Jun. 2, 2026

(54) SYSTEMS AND METHODS FOR ELECTRONIC DEVICE TRACKING AND STATUS ANALYSIS

(71) Applicant: Insight Direct USA, Inc., Chandler, AZ (US)

(72) Inventor: Harjot Sidhu, Vancouver (CA)

(73) Assignee: Insight Direct USA, Inc., Chandler, AZ (US)

( * ) Notice: Subject to any disclaimer, the term of this patent is extended or adjusted under 35 U.S.C. 154(b) by 0 days.

(21) Appl. No.: 18/905,260

(22) Filed: Oct. 3, 2024

(65) Prior Publication Data

US 2026/0050870 A1 Feb. 19, 2026

Related U.S. Application Data

(63) Continuation of application No. 18/821,087, filed on Aug. 30, 2024, and a continuation of application No.
(Continued)

(51) Int. Cl.
*G06Q 10/0833* (2023.01)
*G06Q 10/0631* (2023.01)
(Continued)

(52) U.S. Cl.
CPC . *G06Q 10/0833* (2013.01); *G06Q 10/063114* (2013.01); *G06Q 10/087* (2013.01); *G06Q 10/30* (2013.01)

(58) Field of Classification Search
CPC ....... G06Q 10/087; G06Q 10/20; G06Q 10/30
See application file for complete search history.

(56) References Cited

U.S. PATENT DOCUMENTS 7,395,275 B1 7/2008 Parent et al.
9,704,167 B2 7/2017 Yang et al.
(Continued)

OTHER PUBLICATIONS

Admire Mhlaba, A Hardware based Model for an Asset Monitoring and Tracking System: Case of Laptops, 2015 (Year: 2015).*
(Continued)

*Primary Examiner* — Ismail A Manejwala
(74) *Attorney, Agent, or Firm* — Kinney & Lange, P.A.

(57) ABSTRACT

An example method of tracking multiple electronic devices is described herein that can include accessing first information regarding the multiple electronic devices with the first information including a connection state for a first plurality of electronic devices of the multiple electronic devices representative of a most recent timestamp that each of the first plurality of electronic devices was active and concurrently determining a first status for each applicable electronic device of the multiple electronic devices dependent upon the first information. The method can further include assigning the first status as a current status for each of the multiple devices in a device tracking database, accessing second information regarding the multiple electronic devices with the second information including the connection state for a second plurality of electronic devices of the multiple electronic devices, and concurrently determining a second status for each of the multiple electronic devices dependent upon the second information.

17 Claims, 26 Drawing Sheets

Related U.S. Application Data

18/821,066, filed on Aug. 30, 2024, and a continuation of application No. 18/821,080, filed on Aug. 30, 2024, and a continuation of application No. 18/821,071, filed on Aug. 30, 2024.

(60) Provisional application No. 63/682,902, filed on Aug. 14, 2024.

(51) Int. Cl.
 *G06Q 10/087* (2023.01)
 *G06Q 10/30* (2023.01)

(56) References Cited

U.S. PATENT DOCUMENTS

| | | | |
|---|---|---|---|
| 10,685,395 | B1 | 6/2020 | Hecht et al. |
| 11,200,534 | B1 | 12/2021 | Greenbaum |
| 11,665,758 | B2 | 5/2023 | Boushley et al. |
| 11,792,286 | B2 | 10/2023 | Aher et al. |
| 2004/0215544 | A1 | 10/2004 | Formale et al. |
| 2010/0130167 | A1 | 5/2010 | Bennett et al. |
| 2010/0138355 | A1 | 6/2010 | Kodger, Jr. |
| 2015/0356497 | A1 | 12/2015 | Reeder et al. |
| 2016/0359946 | A1 | 12/2016 | Hintermeister |
| 2017/0228688 | A1 | 8/2017 | Bourlon |
| 2018/0111683 | A1 | 4/2018 | Di Benedetto et al. |
| 2018/0165635 | A1 | 6/2018 | Modica et al. |
| 2020/0336610 | A1* | 10/2020 | Mochizuki ............ G06F 16/166 |
| 2021/0019837 | A1 | 1/2021 | Watson |
| 2021/0158305 | A1 | 5/2021 | Factor |
| 2021/0211294 | A1 | 7/2021 | Ferrington et al. |
| 2021/0224727 | A1* | 7/2021 | Rakhunde .......... G06Q 10/0631 |
| 2021/0241225 | A1 | 8/2021 | Rehn et al. |
| 2022/0083927 | A1* | 3/2022 | Vargas ................. G06Q 20/206 |
| 2022/0167490 | A1 | 5/2022 | Berg et al. |
| 2022/0305202 | A1 | 9/2022 | Rosinko et al. |
| 2023/0137639 | A1 | 5/2023 | Makhija et al. |
| 2024/0211871 | A1* | 6/2024 | Ramirez .............. G06Q 10/087 |
| 2024/0289806 | A1 | 8/2024 | Hawkins et al. |
| 2025/0005513 | A1* | 1/2025 | Schell .................. G06Q 10/087 |
| 2025/0069145 | A1 | 2/2025 | Pellerin et al. |
| 2025/0139646 | A1 | 5/2025 | Tomar |

OTHER PUBLICATIONS

Dutta et al., A Tracking Solution of IT Assets and Resource Management, Int'l Journal of Mathematics and Computer Research, vol. 10, Issue 7 (Year: 2022).

"Your Guide to Secure Data Destruction in 2021", Feb. 2021, https://planitroi.com/data-destruction/your-guide-to-secure-data-destruction-in-2021/ (Year:2021).

"Information—Technology—Log Report", Sep. 2022, https://web.archive.org/web/20220929014127/https://www.datadestroyers.eu/technology/log_report.html (Year: 2022).

Singh, "Vehicle Rental, Leasing & Sharing Management: Rising use of vehicle telematics driving 29.4 million devices by 2033", Apr. 2024, https://transformainsights.com/research/reports/vehicle-rental-leasing-sharing-management (Year: 2024).

"Telematics for Fleets: Making Sense of and Cents from Vehicle Data", Oct. 2022, https://intellias.com/telematics-for-fleets/ (Year: 2022).

* cited by examiner

Pending Device Status

Current Device Status

90

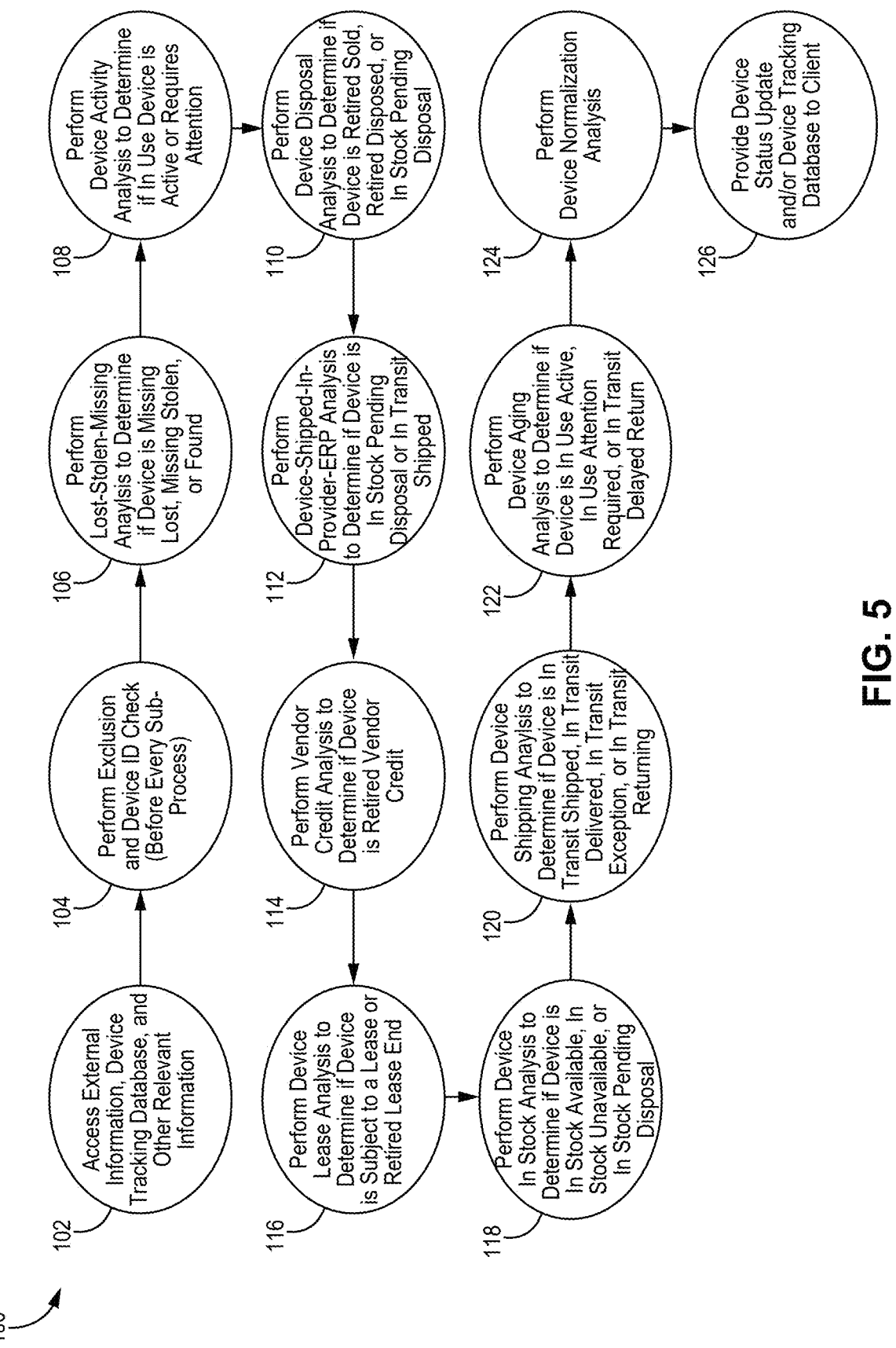

102 — Access External Information, Device Tracking Database, and Other Relevant Information 104 — Perform Exclusion and Device ID Check (Before Every Sub-Process)

106 — Perform Lost-Stolen-Missing Analysis to Determine if Device is Missing Lost, Missing Stolen, or Found 108 — Perform Device Activity Analysis to Determine if In Use Device is Active or Requires Attention 110 — Perform Device Disposal Analysis to Determine if Device is Retired Sold, Retired Disposed, or In Stock Pending Disposal 112 — Perform Device-Shipped-In-Provider-ERP Analysis to Determine if Device is In Stock Pending Disposal or In Transit Shipped 114 — Perform Vendor Credit Analysis to Determine if Device is Retired Vendor Credit 116 — Perform Device Lease Analysis to Determine if Device is Subject to a Lease or Retired Lease End 118 — Perform Device In Stock Analysis to Determine if Device is In Stock Available, In Stock Unavailable, or In Stock Pending Disposal 120 — Perform Device Shipping Analysis to Determine if Device is In Transit Shipped, In Transit Delivered, In Transit Exception, or In Transit Returning 122 — Perform Device Aging Analysis to Determine if Device is In Use Active, In Use Attention Required, or In Transit Delayed Return 124 — Perform Device Normalization Analysis 126 — Provide Device Status Update and/or Device Tracking Database to Client

SYSTEMS AND METHODS FOR ELECTRONIC DEVICE TRACKING AND STATUS ANALYSIS

CROSS-REFERENCE TO RELATED APPLICATIONS

This application is a continuation of U.S. application Ser. No. 18/821,066, filed Aug. 30, 2024; U.S. application Ser. No. 18/821,071, filed Aug. 30, 2024; U.S. application Ser. No. 18/821,080, filed Aug. 30, 2024; and, U.S. application Ser. No. 18/821,087, filed Aug. 30, 2024, all of which are entitled "SYSTEMS AND METHODS FOR ELECTRONIC DEVICE TRACKING AND STATUS ANALYSIS." Additionally, this application claims the benefit of U.S. provisional application having Ser. No. 63/682,902, filed on Aug. 14, 2024, entitled "SYSTEMS AND METHODS FOR ELECTRONIC DEVICE TRACKING AND STATUS ANALYSIS."

TECHNICAL FIELD

The disclosure relates generally to the tracking and status analysis of electronic devices and, more specifically, to the determination of changes in device use statuses and reporting those device use and/or physical location statuses to a client/company.

BACKGROUND

A company may have and/or use thousands of electronic devices, such as computers, routers, switches, modems, mobile phones, and/or other devices. These devices are usually used by employees to perform tasks or duties related to their employment and can be in various states of use. However, it is difficult and time consuming to determine and keep abreast of the use of the devices, including which employee has each device, whether that employee is actively using the device, and, if the employee does not have the device, the physical location of the device. Requesting that employees provide information regarding use of their devices can reduce productivity and may have limited results. Additionally, not all devices are necessarily in the possession of employees; instead, some devices may be in repair, may be in inventory until being provided to employees, or may be at an end of life and awaiting disposal. Thus, it is difficult and time consuming to track the physical locations and/or statuses of devices. Moreover, it is advantageous for the client/company to know whether the devices are in use, available but unused, being repaired, or at their end of life and should be retired (e.g., sold or disposed), which is difficult when dealing with thousands of devices. With this information, the client/company can more easily decide whether to purchase more devices, sell or otherwise retire devices, and/or take other actions with regards to their electronic devices.

SUMMARY

An example method of tracking multiple electronic devices each capable of having one of multiple statuses is described herein that can include accessing first information regarding the multiple electronic devices with the first information including a connection state for a first plurality of electronic devices of the multiple electronic devices representative of a most recent timestamp that each of the first plurality of electronic devices was active and concurrently determining, by a computer processor, a first status for each applicable electronic device of the multiple electronic devices dependent upon the first information. The method can further include assigning the first status as a current status for each of the multiple devices in a device tracking database, accessing second information regarding the multiple electronic devices with the second information including the connection state for a second plurality of electronic devices of the multiple electronic devices, and concurrently determining, by the computer processor, a second status for each of the multiple electronic devices dependent upon the second information. The method can also include automatically determining, by the computer processor, a status change representative of a change of the status from the current status to the second status for each electronic device of the multiple electronic devices; automatically preventing, by the computer processor, the status change from the current status to the second status for each electronic device for which the first status and the second status are determined in response to the status change being a prohibited status change such that the current status for each applicable electronic device in the device tracking database remains the first status; and automatically updating the current status, by the computer processor, for each of the multiple electronic devices in the device tracking database with the second status in response to the status change being an allowable status change.

An example system for tracking multiple electronic devices each capable of having one of multiple statuses is described herein that can include a device tracking database that includes a current status for each of the multiple devices, external information regarding the multiple electronic devices with the external information including a connection state for a plurality of electronic devices of the multiple electronic devices representative of a most recent timestamp that each of the plurality of electronic devices was active, and a computer processor in electronic communication with the external information and device tracking database. The computer processor can be configured to access the external information and concurrently identify, for at least a portion of the multiple electronic devices, a pending status dependent upon the external information; automatically and concurrently determine, for at least a portion of the multiple electronic devices for which the current status and the pending status are identified, a status change representative of a change of the status from the current status to the pending status for each electronic device of the multiple electronic devices; automatically prevent the status change in the device tracking database from the current status to the pending status in response to the status change being a prohibited status change such that the current status for each applicable electronic device in the device tracking database remains unchanged; and automatically update the current status for at least a portion of the multiple electronic devices in the device tracking database with the pending status in response to the status change being an allowable status change. The system can further include a transmission module in communication with the device tracking database and configured to provide, via electronic transmission, device status information for the multiple electronic devices to a client for which the multiple electronic devices are tracked with the device status information being dependent upon the device tracking database.

BRIEF DESCRIPTION OF THE DRAWINGS

FIG. 5 is an example process for tracking the device statuses of multiple devices and reporting those device statuses to the client.

Figure 1A:
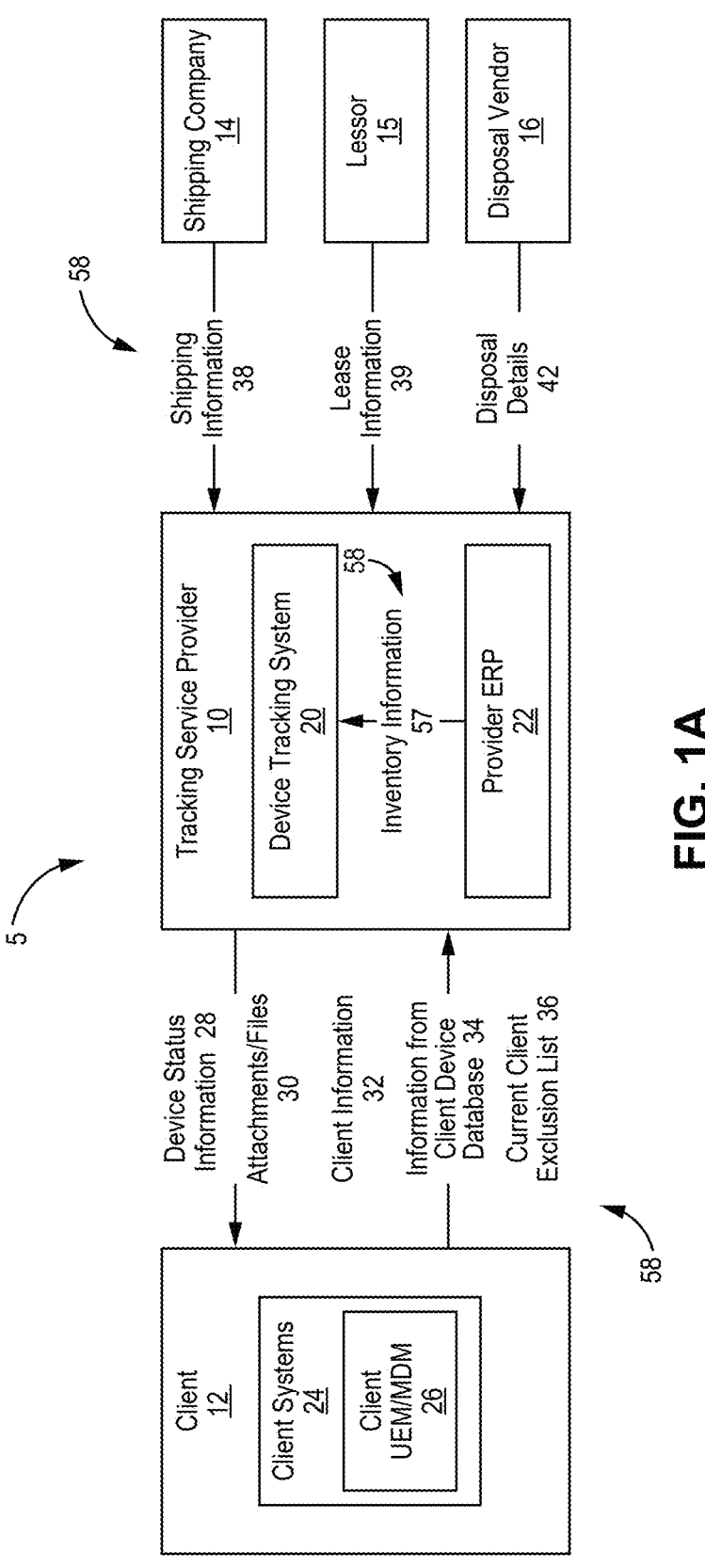
FIG. 1A is a block schematic diagram of an example environment for a device tracking system and related external information sources for tracking device statuses for a client.

While the above-identified figures sets forth one or more examples of the present disclosure, other examples/embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figure may not be drawn to scale, and applications and examples of the present invention may include features and components not specifically shown in the drawings.

DETAILED DESCRIPTION

Systems and processes are disclosed herein for determining the status of multiple electronic devices and for providing the device status information to a client for which the multiple electronic devices are tracked. It is common for clients, which can be large companies with hundreds or thousands of employees, to own, lease, and/or otherwise use thousands of electronic devices. These electronic devices can be a variety of devices having any configurations, such as desktop computers, laptop computers, switches, modems, routers, mobile devices, tablets, printers, cameras, watches, servers, smart electronics (e.g., smart TVs, smart appliances), gaming consoles, and other electronic devices. Understanding the statuses of these devices, where these devices are physically located, and other information regarding these devices can be invaluable to a company so that the company can use the status information to make informed decisions about whether to purchase, lease, and/or otherwise procure more devices; sell unused and/or old devices; let leases lapse on devices; contact employees who are in possession of unused devices; provide unused devices to employees in need of the devices; and/or other inventory and/or supply decisions.

The disclosed systems and processes track the electronic devices by assigning/designating the devices as having one of multiple current device statuses that are tracked/recorded in a device tracking database that includes the current device statuses as well as other information regarding each device. The current statuses of devices can be, for example, one of the following sixteen statuses: In Stock Available, In Stock Unavailable, In Stock Pending Disposal, In Transit Shipped, In Transit Delivered, In Transit Exception, In Transit Returning, In Transit Delayed Return, In Use Active, In Use Attention Required, Retired Disposed, Retired Sold, Retired Lease End, Retired Vendor Credit, Missing Lost, and Missing Stolen. However, the systems and processes can include configurations in which the devices are assigned other statuses, including additional statuses not listed above or fewer statuses than the above-listed sixteen statuses.

The systems and processes disclosed herein can determine the current statuses of the devices by performing, for example by one or more computer processors automatically and/or manually, a variety of sub-processes depending on external information (e.g., information external to the device tracking system). This external information can be received, accessed, and/or otherwise obtained via any electronic communication methods. Any reference to accessing, receiving, obtaining, and/or otherwise using external information in this disclosure includes using any electronic communication methods to use the external information by the systems and processes herein.

The systems and processes can use the external information to identify and/or otherwise determine a pending status of each device, compare the pending status to the current status of the device (as listed in the device tracking database), and determine whether to update the current status in the device tracking database with the pending status. These functions and/or capabilities can be performed, for example, automatically by one or more computer processors.

The systems and processes can determine a status change of the device (e.g., a change from the current status as listed in the device tracking database to the pending status as determined from the external information). The status changes can be determined automatically by, for example, one or more computer processors. If the status change is an allowable status change, the systems and processes can update the device status in the device tracking database. If the status change is a prohibited status change, the systems and processes can prevent the update of the device status such that the device status in the device tracking database remains unchanged. If the status change is a prohibited status change, the systems and methods may also be configured to generate an alert of the prohibited status change. If the status change is an unusual status change, the systems and processes can allow the update of the device status in the device tracking database but generate a warning/alert of the unusual status change. The systems and processes can take other actions in response to the status change, and these actions can be performed automatically by, for example, one or multiple computer processes.

These actions, as well as the actions listed above, can be performed automatically as external information is accessed (via any electronic communication methods) in response to a prior determination/evaluation and/or other triggering events. The systems and processes can perform the above determinations (e.g., assigning of statuses, preventing the assigning of statuses, and/or generating alerts) by, for example, one or more computer processors for thousands of devices concurrently and/or within a designated/specified amount of time. In one example, the systems and processes perform the determinations for thousands of devices within thirty minutes and update the device tracking database accordingly. In another example, the sub-processes, with regards to a subset of the device statuses, are performed in sequence thirty minutes apart with each sub-process determining the device statuses for all applicable devices (e.g., all devices having and/or associated with the particular subset of device statuses) concurrently within that specified amount of time. The systems and processes can be configured to perform the determinations in a variety of other ways, including continuously as new/updated external information is accessed (e.g., received and/or otherwise used).

It may be advantageous for the systems and methods to perform these determinations to update the device tracking database in a relatively short amount of time in order to ensure that the device statuses in the device tracking database are up to date. Any delay (e.g., taking an extended period of time to make the determinations for one or multiple devices) can result in the client/company making decisions based on incorrect information. Additionally, the ability to determine the device statuses for many devices in a short amount of time allows for the systems and processes to accommodate and process new external information that results in new pending statuses, current statuses, etc. Due to the systems and processes making determinations based upon status changes, it is advantageous for the device tracking database to be up to date (e.g., have the most current device statuses) before new pending statuses are analyzed/compared to identify status changes that are allowable, prohibited, and/or unusual.

The tracking database and/or the device status information can be provided to the client/company via any method (e.g., electronic communication such as an email) and at any time, including upon request, upon the changes in current status of one or a minimum number of devices, at regular intervals (e.g., once per week), and/or at other times. For example, one or more computer processors can be configured to automatically generate the electronic communication to the client/company and/or automatically generate the device status information included in that electronic communication. Additionally and/or alternatively, the device status information can be provided in any format, including in tables, graphs, and/or other visual, audio, and/or textual tools. In one example, the device status information and/or other related information can be displayed using a user interface (as shown, for example, in FIGS. 2A and 2B and described below). In another example, the device status information is provided in the text of an email or other electronic communication (e.g., text message, direct message, etc.) to the client/company.

The systems and processes can be configured to passively receive at least a portion of the external information in an electronic communication, actively access at least a portion of the external information via electronic communication methods, request at least a portion of the external information via electronic communication methods, and/or procure at least a portion of the external information via other electronic communication methods.

In some examples, at least two or more of the passive receipt of information, the active access of information, the request for external information, and the procurement of the external information via other electronic communication methods can be accomplished by the system concurrently and continuously, such that the system automatically executes the associated processes in a distributed and concurrent manner to accelerate and expedite the acquisition of information and the corresponding system updates.

In one example, the systems and processes can include electronically accessing an enterprise resource planning (hereinafter, "ERP") system of a client and/or of the tracking service provider, a unified endpoint management (hereinafter, "UEM") system of a client, and/or a mobile device management ("MDM") system of the client to get external information regarding the electronic devices. ERP, UEM, and/or MDM systems are electronic systems that can communicate electronically with electronic devices to send and receive information. As part of the exchange of information, these systems can periodically and/or continuously record the times (e.g., a timestamp) at which each device has electronically connected to the systems to exchange information. The electronic connection of devices to ERP, UEM, and/or MDM systems and/or the electronic connection of these systems to the devices can be performed automatically and/or can be set up to be performed automatically upon connection of the devices to, for example, the internet.

The information from the ERP, UEM, and/or MDM systems can include a connection state for at least a portion of the electronic devices with the connection state indicating/including a timestamp of the most recent time (e.g., including time of day, date, or other time-related information) when the electronic devices established an electronic connection with the ERP, UEM, and/or MDM systems. The recordation of the connection state (e.g., the timestamp of most recent connection/activity) can be performed automatically by one or more computer processors. Moreover, the connection state can be provided to and/or accessed by the systems and processes automatically via electronic communication to ensure system 20 has the necessary information to determine device statuses.

The connection state with the timestamp provides the tracking systems and processes with information regarding the time of last use of the electronic device, which in turn is used to determine the activity status of the electronic device. For example, if the electronic device has not been active in the last thirty days (or another specified amount of time), the systems and processes can update the current status to reflect that the device is in use but that attention is required. In another example, if the electronic device has not been active since it was delivered to the client/employee, the systems and processes can update the current status from a status of In Transit Delivered to In Use Attention Required. The connection state, also referred to herein as the device connectivity heartbeat, can provide other information as to the use of the electronic device and, in turn, to the device status.

Because the tracking systems and processes use a client (and/or tracking service provider) ERP, UEM, and/or MDM system to automatically access/collect external information regarding the electronic devices, the tracking systems and processes require no additional/separate programs or applications to be installed on the device and/or user interactions to obtain device connectivity heartbeat/state information. This capability/configuration is advantageous as it can automate and/or simplify the processes for obtaining the external information needed for determining the device statuses as well as require no specific onboarding processes/preconfigurations. Moreover, the automatic and concurrent collection of such device connectivity heartbeat information in a distributed manner that is collected across the potentially numerous (e.g., thousands) of electronic devices during electronic communications between the electronic devices and the client enables the systems and processes to utilize the connectivity heartbeat information in a timely manner for status determinations before the status changes or the information becomes otherwise stale/outdated.

Further, the systems and processes can include receiving external information (via electronic communication), such as disposal information regarding the disposal of specific electronic devices, from a disposal vendor via electronic communication. The systems and processes can include setting up a connection process such that the disposal vendor can automatically push the external information to the tracking systems and/or processes. In another example, the systems and processes can include an application programming interface (hereinafter, "API") that is configured to automatically request the external information from external sources, such as a shipping company and/or device lessor, and receive information in response to the request. In this example, the API can automatically retrieve a tracking number corresponding to the shipment of an electronic device from the tracking service provider to the client. The API can then be configured to automatically use the tracking number to request a shipment status of the electronic device from the shipping company. The shipping company can, in response, provide the shipment status (e.g., the package is on its way to the address of the employee and is expected to be delivered in three days). The systems and processes can include other electronic communication methods of exchanging information with external sources to obtain/access the necessary external information. Moreover, the systems and processes can include setting up these electronic communication methods of exchanging information for future and/or continued exchange of information (e.g., setting up the API, setting up the processes of pushing and/or pulling information from the external sources). These configurations allow for the tracking systems and processes to obtain/access the necessary external information automatically without the need for intervention by an operator/user and concurrently for many devices at the same time. Any of these electronic communication methods, strategies, etc. can be performed automatically by, for example, one or multiple computer processors. Further, the systems and processes described herein can include automatically, for example by one or multiple computer processors, extracting, organizing, saving, and/or configuring the necessary information from the external information accessed, received, and/or otherwise obtained by the systems and/or during the processes.

Thus, the disclosed tracking systems and processes have many advantages. The systems/processes can obtain/access the necessary information, determine the device statuses, and provide those up-to-date statuses to the client automatically without intervention by an operator/user (e.g., by one or more computer processors). The systems and processes can perform these determinations concurrently for a very large number of electronic devices within a very short period of time to ensure the device statuses are up to date, therefore providing the decision-makers with the most accurate information regarding the statuses of the client's devices. One or multiple computer processors can be used by the systems and processes to perform the determinations and/or other tasks/instructions for a large number of devices concurrently and/or over a short period of time. Furthermore, the systems and processes can accommodate thousands of electronic devices, thereby giving the client a full view of all electronic devices being used and/or otherwise under the control of the client. The systems and processes require no additional applications, programs, etc. to be present on the electronic devices, thereby allowing for a device to be added to the tracking database/system without the need for preconfiguration of that device. Thus, a client can utilize the tracking systems/processes across the entirety of the client's device inventory from day one (e.g., the first day the client decides to utilize the tracking systems/processes). The systems and processes can provide a user interface that allows the operator/user and/or client to interact with a very large amount of information regarding the electronic devices, increasing the client's knowledge of the statuses of the devices, the leasing information of the devices, the end-of-life information (e.g., health score) of the devices, and/or other information that is useful to inventory/supply decisions.

Moreover, the systems and processes allow for easy and/or automatic onboarding of new devices because, when an electronic device appears in the external information received by the systems and processes but is not in the device tracking database, the systems and processes can be configured to automatically check the client ERP, UEM, and/or MDM systems to determine if the new electronic device is an error (the serial number was incorrectly entered and should be the serial number of an already existing electronic device) or if the new electronic device is correct. If correct, the systems and processes can automatically add the device to the necessary tracking processes and/or device tracking databases to ensure the device statuses are determined and recorded.

The disclosed systems and processes also include safeguards that prevent device status changes that are prohibited. These prohibited status changes are ones that are incorrect and only result from an error in the external information. For example, a status change of an electronic device from a current status of Retired Sold to a new status of In Stock Available is prohibited, as the device cannot have a status that indicates that the device is available for use by the client after the device has been sold. Additionally, the disclosed systems and processes can automatically generate alert in response to status changes that are unusual but not prohibited/impossible. The alerts can notify an operator/user of an unusual situation so that the operator/user can investigate to ensure the systems/processes are correct and/or the status changes are correct. In some examples, the system can take automatic action in response to a status change that is classified as "unusual," such as automatically issuing a message to administrators or other users, automatically re-printing a return ticket for a device, and/or other automatic action as is further described below. These capabilities allow for the device status information to be very accurate.

Finally, the disclosed systems and processes can provide the device status information to the client automatically and at any interval defined by the client. This allows for the systems and processes to be tailored to the client depending on the client's needs, desires, etc. These and other advantages will be realized by reviewing the below disclosure.

Figure 1B:
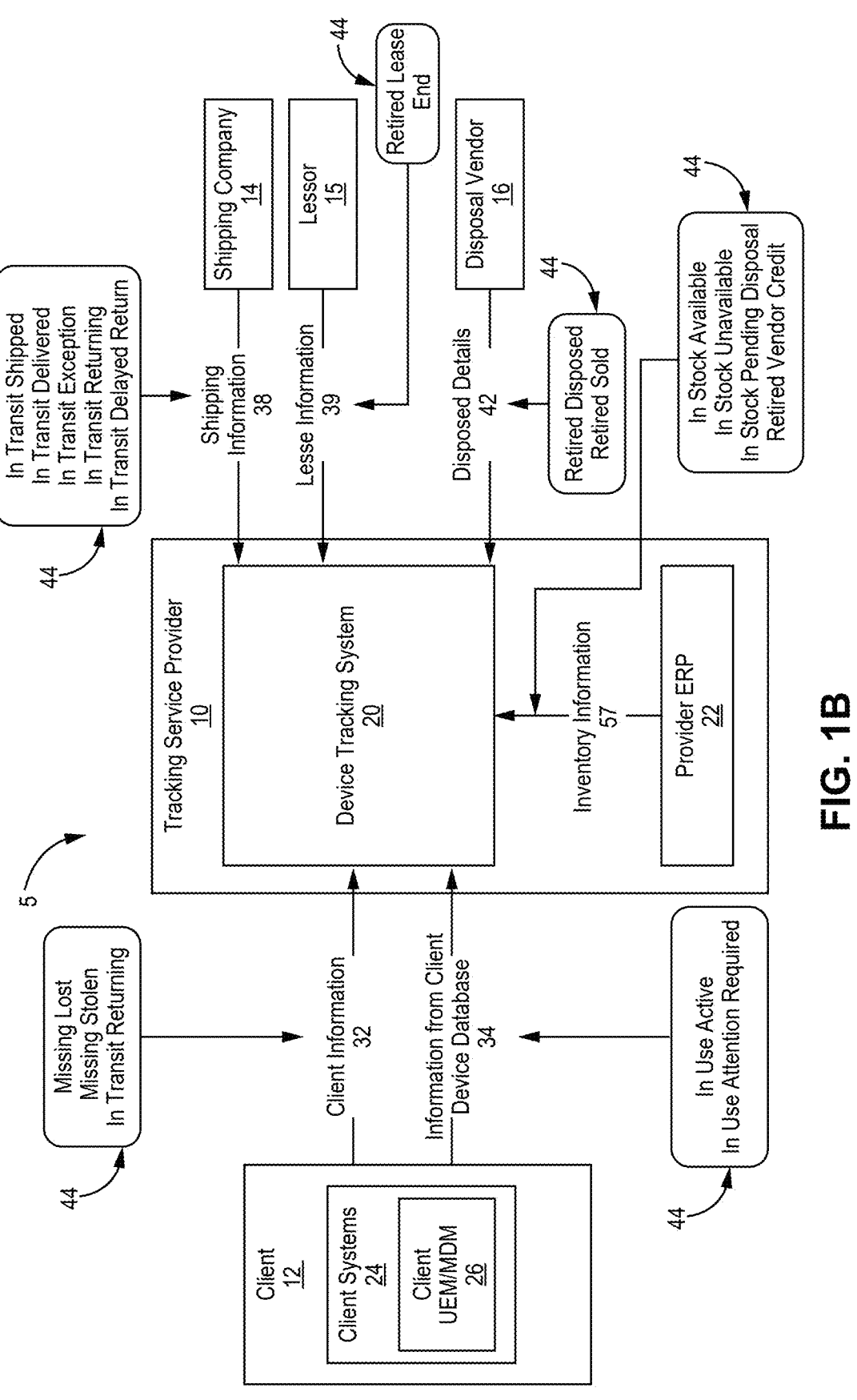
FIG. 1B is the block schematic diagram of the example environment for the device tracking system showing device statuses and the sources of the external information upon which those device statuses are based.
Figure 1C:
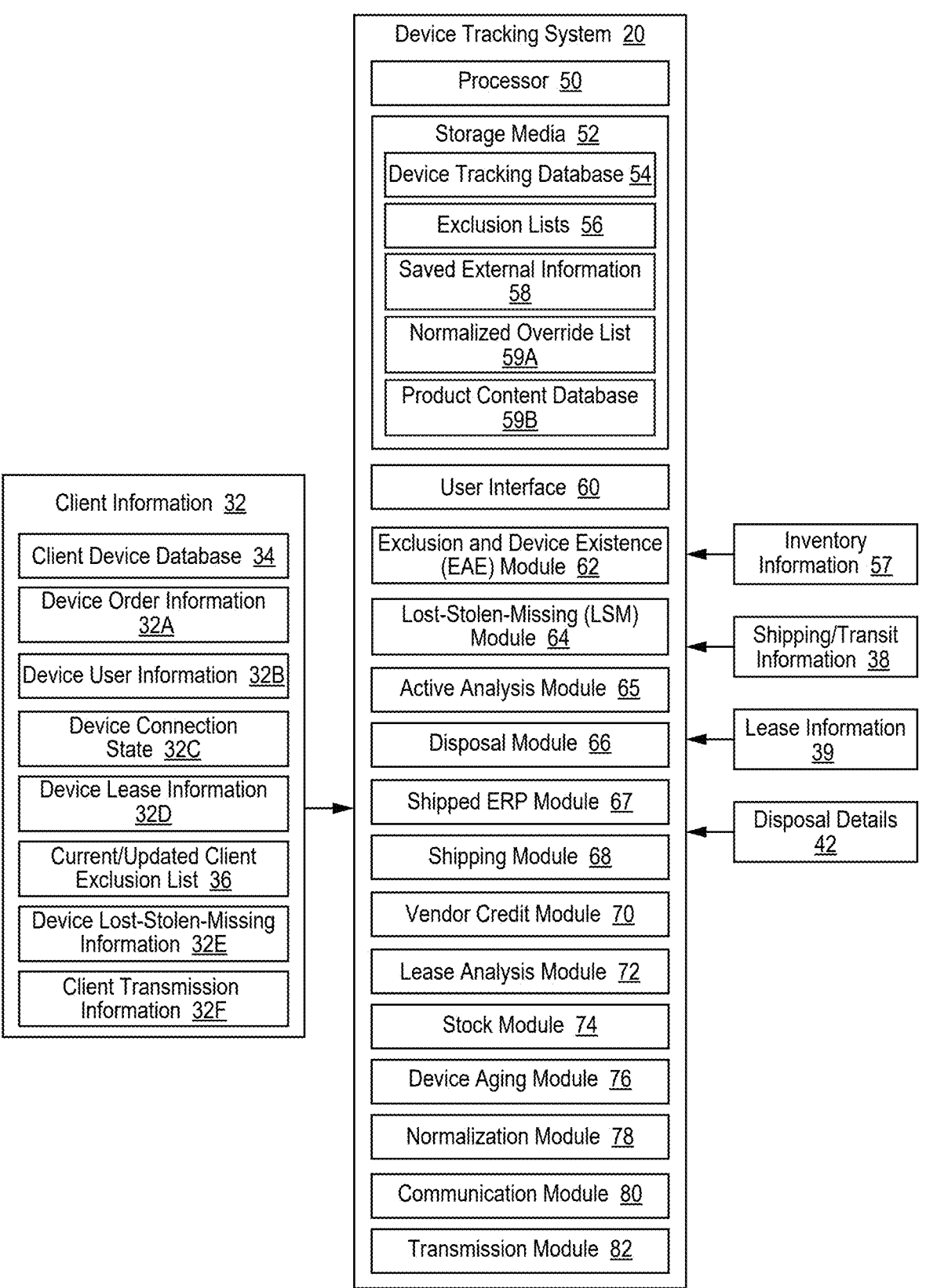
FIG. 1C is a block schematic diagram of the device tracking system and external information sources.

FIG. 1A is a block schematic diagram of example environment 5 for device tracking system 20 and related sources of external information 58 for tracking the statuses of devices of client 12. FIG. 1B is the block schematic diagram of example environment 5 for device tracking system 20 showing device statuses 44 and the sources of the external information (client information 32, connection state 32C, shipping information 38, lease information 39, disposal details 42, and/or inventory information 57) upon which those device statuses are based/derived. FIG. 1C is a block schematic diagram of device tracking system 20 and external information 58 (shown as client information 32, transit/shipping information 38, disposal details 42, and inventory information 57).

FIG. 1A shows the environment 5 within which device tracking system 20 can be used, with environment 5 including tracking service provider 10, client 12, shipping company 14, lessor 15, and disposal vendor 16. Tracking service provider 10 can include device tracking system 20 and provider ERP 22. Client 12 can include client systems 24 that have client UEM/MDM 26. Tracking service provider 10 can provide to client 12 device status information 28 and/or attachments/files 30 related to the devices.

External information 58 as described herein can include a variety of types and/or sources of information that is external to device tracking system 20. These types of external information 58 can be, but are not limited to, client information 32 (which can include information client device database 34 and/or current exclusion list 36), shipping information 38, lease information 39, disposal details 42, and inventory information 57. Client 12 can provide to tracking service provider 10 client information 32, which can include client device database 34 and/or current client exclusion list 36. Shipping company 14 can provide to tracking system provider 10 shipping information 38. Lessor 15 can provide to tracking service provider 10 lease information 39. Disposal vendor 16 can provide to tracking system provider 10 disposal details 42. Provider EPR 22 can provide to device tracking system 20 inventory information 57. This external information 58 is used by device tracking system 20 to determine/derive device statuses 44, shown in FIG. 1B.

FIG. 1B shows environment 5 and the external sources (e.g., external to device tracking system 20) that provide external information 58 from which device statuses 44 are determined, derived, dependent upon, etc. As shown in FIG. 1B, device statuses 44 of Missing Lost, Missing Stolen, and In Transit Returning can be dependent upon client information 32 accessed/obtained from client systems 24. Device statuses 44 of In Use Active and In Use Attention Required can be dependent upon external information 58 accessed/obtained from client UEM/MDM 26. Devices statuses 44 of In Stock Available, In Stock Unavailable, In Stock Pending Disposal, and Retired Vendor Credit can be dependent upon external information 58 accessed/obtained from provider ERP 22. Device status 44 of Retired Lease End can be dependent upon lease information 39 from lessor 15. Device statuses 44 of Retired Disposed and Retired Sold can be dependent upon disposal details 42 accessed/obtained from disposal vendor 16. Device statuses 44 of In Transit Shipped, In Transit Delivered, In Transit Exception, In Transit Returning, and In Transit Delayed Return can be dependent upon shipping information 38 accessed/obtained from shipping company 14.

FIG. 1C shows device tracking system 20 (also referred to herein as simply "system 20") as well as the external information 58 in the form of client information 32, shipping information 38, lease information 39, disposal details 42, and inventory information 57. Client information 32 can include information from client device database 34 (e.g., from and/or based upon UEM/MDM systems), device order information 32A, device user information 32B, device connection state 32C, device lease information 32D, current/updated client exclusion list 36, device lost-missing-stolen information 32E, and client transmission information 32F. Device tracking system 20 can include processor 50 and storage media 52 having device tracking database 54, exclusion databases/lists 56, saved external information 58, normalization override list 59A, and/or product content database 59B. System 20 can include user interface 60, exclusion and device existence module 62 (also referred to herein as "EAE module 62"), lost-stolen-missing module 64 (also referred to herein as "LSM module 64"), active analysis module 65, disposal module 66, shipped ERP module 67, shipping module 68, vendor credit module 70, lease analysis module 72, stock module 74, device aging module 76, normalization module 78, communication module 80, and/or transmission module 82. System 20 can include additional components not expressly disclosed herein, or one or multiple components can be configured to perform the tasks of other components described herein such that system 20 may not include all components shown in FIG. 1C. Thus, while shown as distinct components, the components in FIG. 1C can be incorporated into multiple components and function in conjunction with one another via shared hardware, software, etc.

FIGS. 1A-1C focus on hardware components of system 20 and the related external information sources from environment 5. FIGS. 1A-1C are provided as an illustrative example of general hardware systems for performing the capabilities discussed herein (e.g., the capabilities of system 20). The components presented in FIGS. 1A-1C, particularly including modules 62, 64, 65, 66, 68, 70, 72, 74, 76, 78, 80, and/or 82 (and associated components) can be omitted or replaced with analogous hardware and/or software in different architectures without departing from the scope and spirit of the present disclosure.

System 20 (and the processes/sub-processes described in this disclosure, such as process 100) can include other steps, components, models, modules, configurations, and/or features not expressly disclosed herein that are suitable for accessing/obtaining external information 58, determining device statuses 44, tracking those device statuses 44, and providing device status information 28 to client 12. For example, system 20 can include any number of digital/electronic storage media 52 for storing data, information, and/or executable instructions. System 20 can include any number of computer processors (e.g., processor 50) for performing tasks/instructions with regards to system 20 (and/or the processes/sub-processes described herein). Further, system 20 can allow for wired and/or wireless communication between the external sources of environment 5, between the components of system 20, and/or between other components, systems, etc. within and/or distant from system 20. System 20 is described herein as including one or multiple "modules," which can be any hardware and/or software for performing the tasks, functionalities, and/or capabilities described herein. These "modules" can be instantiated in dedicated hardware and/or software, and/or can be defined functionally and use shared hardware and/or software (e.g., processor 50). Additionally, system 20 is described herein as being used with "devices" that are electronic, but other terms, including "assets," may also be used by this disclosure to describe electronic software and/or hardware.

Additionally, system 20 can be a discrete assembly or be formed by one or more components capable of individually or collectively implementing the functionalities described herein. In some examples, system 20 can be implemented as a plurality of discrete circuitry subassemblies. In some examples, one, multiple, or all components of system 20 can include and/or be implemented at least in part on a smartphone or tablet, among other options. In some examples, one, multiple, or all components of system 20 can include and/or be implemented as downloadable software in the form of a mobile application. The mobile application can be implemented on a computing device, such as a personal computer, tablet, smartphone, and/or smartwatch, among other suitable devices. One, multiple, or all components of system 20 can be considered to form a single computing device even when distributed across multiple component computing devices, such as cloud-connected device(s). System 20 can include a configuration in which one, multiple, or all of the functions described herein are performed by different components. System 20 can include various components for performing the above functions (as well as other functions described in this disclosure), such as processor 50, storage media 52, and/or user interface 60.

As described herein, external information 58 is any information, data, etc. that is external to device tracking system 20 and is used by device tracking system 20 to perform the functions, capabilities, and/or tasks described herein. In one example, while being within/under the control of tracking service provider 10, inventory information 57 from provider ERP 22 is a type/category of external information 58 because inventory information 57 may not be within and/or otherwise associated with device tracking system 20.

As shown in FIG. 1A, tracking service provider 10 is configured to receive, access, obtain, etc. external information 58 from client 12, shipping company 14, lessor 15, disposal vendor 16, and/or provider ERP 22. These external sources can be in wired and/or wireless communication with tracking service provider 10 and/or device tracking system 20. In one example, these external sources of external information 58 send external information 58 to device tracking system 20 via electronic transmission, for example, over the internet. In another example, device tracking system 20 accesses, via wireless communication, external information 58 as stored/saved by and/or within the systems of client 12, shipping company 14, disposal vendor 16, and/or provider ERP 22. In this example, the external sources may be configured to grant and/or otherwise allow access to external information 58 by device tracking system 20. In a third example, device tracking system 20 (e.g., communication module 80) includes an API, software program, hardware, and/or another system configured to request external information from client 12, shipping company 14, lessor 15, disposal vendor 16, and/or provider ERP 22, and those external sources are configured to provide the requested external information 58 in response to the request. For example, an API functioning in conjunction with device tracking system 20 can, using a package tracking number, request a shipping update from shipping company 14 for a particular shipment of a device. The API can be configured to use an online portal and/or other program of shipping company 14 to make the request. In response, shipping company 14 can provide the shipping update as shipping information 38, which can then be used by device tracking system 20 to determine device status 44. Tracking service provider 10, device tracking system 20, and/or the external sources of external information 58 (e.g., client information 32, client device database 34, current client exclusion list 36, inventory information 57, lease information 39, shipping information 38, and/or disposal details 42) can communicate and/or access, obtain, receive, and/or otherwise use external information 58 via a variety of other processes/communications not expressly disclosed herein.

Client 12 can be an individual, system, company, and/or entity for which device status tracking and/or recordation by device tracking system 20 is desired. Client 12 can own, lease, use, and/or otherwise be in control of one or multiple devices that are tracked using device tracking system 20. While tracking by device tracking system 20 can be performed on one or a few devices, it may be most advantageous for device tracking system 20 to function with hundreds or thousands of devices to provide device status information 28 regarding these devices such that client 12 has accurate and complete information as to the statuses of all its devices. In one example, client 12 is a large company that has thousands of employees that use electronic devices to perform their employment duties. These electronic devices can include desktop and/or laptop computers, routers, modems, tablet devices, and/or mobile phones. Additionally, client 12 can include servers and/or other electronic devices that store information, allow for communication between employees and with others outside the company, and/or allow for the operation of the company. Thus, the electronic devices are not consistently at the same physical location and are often spread out across a large geographic area. Further, client 12 can rely on tracking service provider 10 and/or another company to provide, preconfigure, repair, etc. these devices such that tracking service provider 10 may be in possession of one or multiple devices when not in use by client 12. Even if client 12 does not use tracking service provider 10 as a device provider, system 20 can be configured to track devices that are provided, repaired, retired, etc. by a third-party device provider/vendor.

Client 12 may have its own electronic device management system and/or company access system, such as client systems 24 that can be and/or include client UEM/MDM 26. As described with regards to FIG. 1C below, client UEM/MDM 26 (e.g., having client device database 34) can be used by device tracking system 20 (e.g., active analysis module 65) to determine whether the device is in use by client 12 and/or the most recent use by client 12, by accessing client information 32 regarding the most recent timestamp reflecting the last time the device connected to client systems 24. Device tracking system 20 can be configured to access client systems 24 (e.g., client UEM/MDM 26) via a variety of methods, such as by having an account with login capabilities such that device tracking system 20 can automatically log in and access client information 32, such as client device database 34 and/or current client exclusion list 36, on/within client systems 24. Further, device tracking system 20 can access and/or otherwise communicate with client 12 via designated and/or predetermined connection nodes and/or endpoints. Device tracking system 20 can be configured to provide device status information 28, attachments/files 30, and/or other information to client 12 via the connection nodes and/or via other methods, such as via one or multiple emails to one or multiple representatives of client 12. In another example, client 12 may have an account and/or other privileges/access to tracking service provider 10, device tracking system 20, and/or other systems to allow client 12 to access device status information 28 and/or other relevant information.

Shipping company 14 can be one or multiple individuals, companies, and/or entities that are configured to temporarily take possession of one or multiple devices and ship those devices, for example, from tracking service provider 10 to client 12, disposal vendor 16, lessor 15, and/or any other individual, company, entity, etc. Additionally and/or alternatively, shipping company 14 can ship one or multiple devices from client 12 (e.g., a representative/employee of client 12) to tracking service provider 10. In another configuration in which the devices are purchased, leased, preconfigured, etc. by a third-party (e.g., not by tracking service provider 10), shipping company 14 can be configured to ship one or multiple devices to and/or from the third party. Shipping company 14 can be configured to collect shipping information 38, which can be information relevant/associated with one or multiple devices. Shipping information 38 can include tracking information, delivery information, device location information, and/or any other information regarding the shipment of one or multiple devices. In one example, shipping company 14 is one or multiple shipping companies that are commonly used by tracking service provider 10 with shipping information 38 being accessed/obtained/received by device tracking system 20 in a usual and known format. Shipping company 14 and device tracking system 20 can exchange information using a variety of methods, including API calls/requests as detailed above and/or using methods not expressly disclosed herein.

Lessor 15 can be one or multiple individuals, companies, and/or entities that are configured to lease devices to client 12. Lessor 15 can also be configured to sell the devices to client 12 and/or tracking service provider 10 upon expiration of the lease and/or take possession of the devices upon expiration of the lease. Lessor 15 can have lease information 39 that is accessed, provided, and/or otherwise obtained by device tracking system 20. Lease information 39 provided by lessor 15 can include, for example and for each leased device, the lease contract number, the lease start date, the lease end date, the lease length, the lease cost, the lessor, the lessee, device identification details, the lease termination cost, the lease buyout cost, and/or any other information regarding the lease. Moreover, lease information 39 can include indications that devices have been returned to lessor 15 after the lease on the device has expired/ended, thereby allowing system 20 to update the device status 44 for the device to Retired Lease End. Additionally, lease information 39 can include, while not related to the lease of the devices, any warranty information regarding the devices. Lessor 15, tracking service provider 10, and/or system 20 can use any electronic communication methods to exchange requests and/or information.

Disposal vendor 16 can be one or multiple individuals, companies, and/or entities that are configured to retire (e.g., dispose and/or sell) one or multiple devices. The disposal of the devices can include destroying the device, recycling the device, selling the device, wiping the information from the device, and/or other decommissioning processes. Disposal vendor 16 can be tracking service provider 10 if tracking service provider 10 has such capabilities. In another example, disposal vendor 16 is a third party (e.g., not tracking service provider 10 and not client 12). In this example, disposal vendor 16 can be a company that is commonly used by tracking service provider 10 and/or client 12 with disposal details 42 being accessed/obtained/received by device tracking system 20 in a usual and known format. Disposal details 42 can include any information relevant to the devices being disposed, client 12, and/or tracking service provider 10. For example, disposal details 42 can include documents certifying that the device has been wiped, documents certifying that the device has been recycled, and/or documents certifying that the device has been sold (these documents may be sent to tracking service provider 10 in the form of electronic attachments/files, which in turn can be provided to client 12). Further, disposal details 42 can include a device lot number, disposal status, condition, failure status, settlement status, comments, disposal identification number, disposal vendor stockroom information, an indication that the disposal has been performed, a date on which the disposal of the device was performed, and/or any other information. Disposal vendor 16 and device tracking system 20 can exchange information using a variety of electronic communication methods including API calls/requests as detailed above; using operator and/or automated requests and/or response; automatically providing/exchanging information in response to new information, at regularly scheduled intervals, and/or at other times; and/or via other methods not expressly disclosed herein.

Device tracking system 20 can also access, obtain, receive, and/or otherwise use inventory information 57 from provider ERP 22, which can be any software and/or hardware system that organizes, integrates, automates, manages, and/or otherwise aids tracking service provider 10 business and/or processes. Additionally and/or alternatively, provider ERP 22 can include inventory information 57 (as well as other device information) regarding any devices of client 12 that are currently in the possession of tracking service provider 10. This may be the case if/when tracking service provider 10 provides, repairs, preconfigures, and/or otherwise stores the devices of client 12 when those devices are not being used by client 12 and/or prior to those devices being sent/provided to client 12. Provider ERP 22 can also include information regarding client 12, shipping company 14, lessor 15, disposal vendor 16, devices, device tracking system 20, and/or other information useful to device tracking system 20 for accessing/obtaining external information 58, determining device statuses 44, tracking those device statuses 44, and/or providing device status information 28 to client 12. Provider ERP 22, while shown as being included in, in possession of, and/or otherwise under the control of tracking service provider 10, can be separate from tracking service provider 10 and/or at a location distant from device tracking system 20. In another configuration, provider ERP 22 and device tracking system 20 share resources (such as processor 50, storage media 52, and/or user interface 60). Provider ERP 22 and device tracking system 20 can exchange information using a variety of methods, including electronic communication/transmission over the internet and/or a local area network, communication within a particular hardware system (e.g., ERP 22 and system 20 are located on the same hardware device(s)), and/or any other type of wired and/or wireless communication.

It should be noted that device tracking system 20 can be configured to automatically request and/or automatically access, obtain, receive, and/or otherwise use external information 58 without the need for an operator/user to perform any actions/tasks. The automatic request, access, reception, etc. of information can be automatically performed in response to a variety of triggers, including on a predefined schedule, the creation and/or modification of external information 58, an operator/user triggering an update of the device status 44 determinations by device tracking system 20 (and/or other operator triggering actions), a client 12 request, and/or other events. In one example, device tracking system 20 is configured to automatically access, obtain, receive, and/or otherwise use information at a regularly schedule interval so as to determine device statuses 44 and provide device status information 28 to client 12 once per day. Thus, device tracking system 20 is configured to automatically access, obtain, receive, etc. external information 58 at least once per day before performing the device statuses 44 determinations and providing device status information 28 to client 12.

Device tracking system 20 can be owned, operated, and/or otherwise used by tracking service provider 10 as described herein for providing device tracking services to/for client 12. System 20 can be at a physical location of tracking service provider 10 (e.g., at/in/within software and/or hardware of tracking service provider 10) and/or at a physical location that is distant from tracking service provider 10 and is accessed and/or otherwise used by tracking service provider 10 via any wired and/or wireless communication. In one example, device tracking system 20 is located on/in a digital environment under the control of tracking service provider 10 and is configured to be used by one or multiple operators/users to provide tracking services of devices for client 12. As described with regards to FIG. 1C, device tracking system 20 can include multiple components for collectively accessing/obtaining external information 58, determining device statuses 44, tracking those device statuses 44, and providing device status information 28 to client 12. System 20 can be configured to perform tracking services for multiple clients 12 simultaneously and/or perform other tasks and/or have other capabilities, functionalities, and characteristics not expressly disclosed herein.

Device tracking system 20 is configured to determine device statuses 44 dependent upon external information 58 received from external sources, as shown in example environment 5 in FIG. 1B. The components/systems in environment 5 shown in FIG. 1B are the same as those in FIG. 1A, except that FIG. 1B shows from which external information 58 device statuses 44 can be determined (e.g., from which external information 58 the device statuses 44 depend). The following description with regards to FIG. 1B focuses on each device status 44 and from which external information 58 the specific device status 44 depends. Then, in FIG. 1C, the specific components of device tracking system 20 and client information 32 are discussed.

External information 58 (which can include client information 32, shipping information 38, lease information 39, disposal details 42, inventory information 57, and/or other information) can be accessed and/or used by device tracking system 20 using a variety of methods. In one example, device tracking system 20 accesses external information 58 by logging in and/or otherwise pulling information from one or more sources of external information. In another example, device tracking system 20 receives external information 58 via an unprompted communication from one or more sources of external information. In a third example, device tracking system 20 receives external information 58 in response to a request for external information 58 from device tracking system 20 to one or more sources of external information. In this example, the request can be performed by an API, which can automatically generate and communicate the request to one or more sources of external information. In a fourth example, when setting up the device tracking system processes for client 12, tracking service provider 10 can set up electronic/digital connection points, endpoints, inputs, etc. between the one or more sources of external information and device tracking system 20 so that information can be exchanged via electronic communication easily and, for example, automatically. In a fifth example, one or more sources of external information can be set up to push external information 58 to device tracking system 20 in a specified format, such as a CSV file format. One or more sources of external information and device tracking system 20 can use other methods of accessing, obtaining, and/or otherwise receiving external information 58. Additionally and/or alternatively, device tracking system 20 can be configured to access, obtain, receive, etc. external information 58 automatically, continuously, and/or periodically as needed/desired by device tracking system 20. In one example, external information 58 is accessed once per day for one, multiple, and/or all sources of external information. In another example, external information 58 is provided/sent to device tracking system 20 anytime the external information 58 changes/is updated. Other configurations of system 20 can include other schedules and/or methods for accessing/receiving external information 58.

Device tracking system 20 can determine any number of device statuses 44 for any number of devices as is necessary and/or desired for the tracking of devices of client 12. While this disclosure lists sixteen device statuses 44, other configurations of device tracking system 20 (and/or the related processes/sub-processes discussed below) can include determining more or fewer device statuses 44. Additionally and/or alternatively, device tracking system 20 may not include a determination of all device statuses 44 depending on the movement, use, etc. of each device and/or the external information 58 provided, accessed, obtained, received, and/or otherwise used by device tracking system 20. The example sixteen device statuses 44 disclosed herein and shown in FIG. 1B are In Stock Available, In Stock Unavailable, In Stock Pending Disposal, In Transit Shipped, In Transit Delivered, In Transit Exception, In Transit Returning, In Transit Delayed Return, In Use Active, In Use Attention Required, Retired Disposed, Retired Sold, Retired Lease End, Retired Vendor Credit, Missing Lost, and Missing Stolen.

It should be noted that this disclosure may use the term device "status" to collectively refer to the condition of the device having two elements: a state and a sub-state. The state of the device can be in stock, in transit, in use, retired, or missing while the sub-state of the device can be available, unavailable, pending disposal, shipped, delivered, exception, returning, delayed return, active, attention required, disposed, sold, lease end, vendor credit, lost, or stolen. However, for clarity, this disclosure will generally refer to the device condition as the device "status" and include both elements (i.e., the state and the sub-state) when describing the condition/status of the device.

Client 12 can provide, allow access to, generate, and/or otherwise have two general categories/forms of external information 58 (also described herein as "client information 32") able to be used by device tracking system 20 to determine device statuses 44, track those device statuses 44, and provide device status information 28 to client 12.

The first category of client information 32 of client 12 is information pulled from and/or otherwise found in client UEM/MDM 26, such as information from client device database 34. This information, as detailed above, can be accessed automatically by device tracking system 20 and/or can be accessed, obtained, received, and/or otherwise used by device tracking system 20 as initiated and/or performed by an operator/user. In one example, client information 32 from client UEM/MDM 26 is pulled from a client device database 34 (shown in FIG. 1C) that is within/on client UEM/MDM 26. This client information 32 from client UEM/MDM 26 can include, amongst other information, device connection state 32C that can include a most recent timestamp that details the most recent time/date that the particular device connected to client UEM/MDM 26. This device connection state 32C, potentially along with other client information 32, allows device tracking system 20 (e.g., active analysis module 65 and/or device aging module 76) to determine whether the device has a device status 44 of In Use Active or In Use Attention Required.

A device status 44 of In Use Active can indicate that the device has a device connection state 32C with a most recent timestamp that, when compared to the current date (e.g., the date of the evaluation/determination by device tracking system 20), has a difference that is less than a threshold amount. For example, a device with a device connection state 32C with a most recent timestamp that is less than thirty days in the past (or another specified amount of time) as compared to the current date can be designated/determined by active analysis module 65 to be In Use Active, whereas a device with a device connection state 32C with a most recent timestamp that is more than thirty days in the past (or another specified amount of time) as compared to the current date can be designated/determined by device aging module 76 to be In Use Attention Required. A device status 44 that is In Use Attention Required can include an alert and/or other notice to client 12 that the device, which was previously in use, has not been used for an extended period of time and may require attention.

Additionally, a device status 44 that is In Use Attention Required can arise when a device is indicated to be delivered to client 12 (i.e., an employee of client 12) as set out in shipping information 38 but has yet to be activated/used by client 12. For example, a device can be indicated to be delivered to client 12 but the device connection state 32C does not yet include a most recent timestamp since that delivery. Device tracking system 20 can determine/designate the device status as In Use Attention Required if the device was delivered to client 12, for example, more than seven days in the past (or another specified amount of time) and has yet to be used. Such a determination may use external information 58 from multiple external sources and/or may require the current device status (In Transit Delivered) to be compared to a pending status and/or compared to updated information (the device connection state 32C and/or the pending status of In Use Attention Required). The threshold amounts of time as described above can be any amount dependent upon the needs/desires of client 12 and/or tracking service provider 10. A device status 44 that is In Use Attention Required can also indicate that the information associated with the device, such as device user information 32B, is missing and/or incorrect and thus needs to be added/corrected in device tracking database 54.

As described below, the status change from the current status as listed in device tracking database 54 to the pending status as determined from external information 58 can be important to the determination and/or updating of the device status 44 (e.g., updating the current status as listed in the device tracking database 54). Thus, other client information 32, such as information from client device database 34 (e.g., information from client UEM/MDM 26), can allow device tracking system 20 to determine a previous device state 44 that was the device state prior to In Use Active or In Use Attention Required (e.g., the status as listed in device tracking database 54). Further, client information 32 from client UEM/MDM 26 can provide needed and/or useful device or user identification information.

The second category of client information 32 of client 12 is information that may not otherwise be accessed, obtained, received, etc. from client UEM/MDM 26. This client information 32 can be any client information 32 necessary and/or useful to device tracking system 20 for determining device statuses 44 and/or providing device status information 28 (and/or other information) to client 12. In the example shown in FIG. 1B, this client information 32 is shown as being accessed, obtained, received, and/or otherwise used from client systems 24 generally. This second category of client information 32 can be simply provided by client 32 via a variety of methods, including in tables and/or other visual and/or textual formats, emails, commerce platforms/programs (such as an online ordering platform), and/or other methods. Further, while FIG. 1B shows otherwise, this client information 32 may be present in client UEM/MDM 26 and accessed, obtained, received, and/or otherwise used from client UEM/MDM 26 by device tracking system 20.

A device status 44 that is Missing Lost is a determination by device tracking system 20, based upon client information 32, that the device is merely lost by client 12 (e.g., an employee of client 12). A device status 44 that is Missing Stolen is a determination by device tracking system 20, based upon client information 32, that the device has been maliciously taken. If/when the device is found, device tracking system 20 can update the device status 44 to the relevant status based upon the status of the device when found and/or shortly after the device is found. A device status 44 that is In Transit Returning is a determination by device tracking system 32, based upon client information 32, that client 12 desires to return the device to tracking service provider 10 and/or a third-party device provider. In such a case, client information 32 would indicate that client 12 desires to return the device such that the device is no longer In Use Active or In Use Attention Required. It should be noted that a device can also have a device status 44 of In Transit Returning when the device is provided to shipping company 14 by client 12 for the shipment of the device back to tracking service provider 10.

In one example, the client information 32 from client 12 generally and/or from client systems 24 generally can include device lost-stolen-missing information 32E, which details that a particular device is missing and/or has been lost or stolen. This information can be provided/accessed in one or multiple emails, stored in a table/spreadsheet, and/or otherwise denoted in client information 32 for use by device tracking database 20 to determine the device statuses 44 of Missing Lost and Missing Stolen. In another example, the client information 32 from client 12 generally and/or from client systems 24 generally can include device lease information 32D, which details that a particular device is subject to a lease and/or the terms of the lease, such as the date the lease ends (alternatively and/or additionally, this information can be in lease information 39 from lessor 15).

As described with regards to FIG. 1C below, client information 32 can include other information that may be used by device tracking system 20 to determine other device statuses 44, to determine what information to include in device status information 28 to provide to client 12, and/or to track devices. In one example, this information is in regards to any warranties associated with the devices of client 12.

Provider ERP 22 can provide, allow access to, generate, and/or otherwise include inventory information 57 available for use by device tracking system 20 to determine device statuses 44, track those device statuses 44, and provide device status information 28 to client 12. Provider ERP 22 can include inventory information 57 as well as other device information regarding any devices of client 12 that are currently in the possession of tracking service provider 10. These devices, for example, can be in stock and waiting for use by client 12, preconfigured specifically for client 12, in repair, awaiting shipment to disposal vendor 16, and/or in other situations in which the device is under the control of and/or in possession by tracking service provider 10. Inventory information 57, also known as stock information, can be used to determine whether each device has a device status 44 of In Stock Available, In Stock Unavailable, In Stock Pending Disposal, or Retired Vendor Credit.

A designation/determination by device tracking system 20 that a device status 44 is In Stock Available indicates that the device (while owned, leased, controlled, etc. by client 12) is in inventory and/or otherwise in the possession of tracking service provider 10 (and/or an affiliate of tracking service provider 10) and ready to be provided to client 12 (e.g., an employee of client 12) upon request by client 12. The devices with a device status 44 of in use available can be preconfigured according to the needs/desires of client 12, and/or each device that is In Stock Available can be configured accordingly before being provided (e.g., shipped) to client 12.

A designation/determination by device tracking system 20 that a device status 44 is In Stock Unavailable indicates that the device (while owned, leased, controlled, etc. by client 12) is in inventory and/or otherwise in the possession of tracking service provider 10 (and/or an affiliate of tracking service provider 10) but is not ready to be provided to client 12. Such devices may be in disrepair, may be awaiting and/or undergoing repair, may be too close to the lease end date to justify shipping the device to client 12, and/or otherwise may not be suitable for use by client 12.

A designation/determination by device tracking system 20 that a device status 44 is In Stock Pending Disposal indicates that the device (while owned, leased, controlled, etc. by client 12) is either in inventory and/or otherwise in the possession of tracking service provider 10 (and/or an affiliate of tracking service provider 10) and is awaiting disposal by tracking service provider 10, is awaiting shipment to a third-party disposal vendor 16, and/or is in transit from tracking service provider 10 to disposal vendor 16. Client 12 and/or tracking service provider 10 can decide to dispose of a device for a variety of reasons, including the device being obsolete, broken, at lease end and/or end-of-life (e.g., the device health score is below a threshold amount), and/or for other reasons.

A designation/determination by device tracking system 20 that a device status 44 is Retired Vendor Credit indicates that the device has been retired (no longer owned, leased, controlled, etc. by client 12) and a vendor credit has been or is yet to be issued to client 12. The vendor credit can be an amount of money credited to client 12 for the sale of the device, money back from the expiration of a lease for a device, and/or any other credit that is provided to and/or is yet to be provided to client 12 for the retirement/end-of-use of a device.

Disposal vendor 16 can provide, allow access to, generate, and/or otherwise include disposal details 42 able to be used by device tracking system 20 to determine device statuses 44, track those device statuses 44, and provide device status information 28 to client 12. Disposal details 42 can be provided to device tracking system 20 in response to, for example, a request for disposal details 42 by, for example, an API. In other examples, disposal details 42 can be accessed by device tracking system 20 using other methods. As described above, disposal details 42 can include a variety of information regarding the disposal of devices for client 12. For example, disposal details 42 can include documents certifying that the device has been wiped, documents certifying that the device has been recycled, and/or documents certifying that the device has been sold (these documents may be sent to tracking service provider 10 in the form of electronic attachments/files, which in turn can be provided to client 12). Further, disposal details 42 can include a device lot number, disposal status, condition, failure status, settlement status, comments, disposal identification number, disposal vendor stockroom information, an indication that the disposal has been performed, a date on which the disposal of the device was performed, and/or any other information. Further, while shown as being accessed/received from only one disposal vendor 16, disposal details 42 can be accessed, obtained, received, etc. from any number of disposal vendors that have information regarding at least one device of client 12. In this case, device tracking system 20 can be configured to request information from each of the disposal vendors, and the request can come automatically and/or manually and initiated by and/or performed by an operator/user and/or by device tracking system 20. Disposal details 42 can be accessed, obtained, received, etc. from disposal vendor 16 by device tracking system 20 for determining whether each device has a device status 44 of Retired Disposed or Retired Sold. Additionally, if applicable, disposal details 42 can be used by device tracking system 20 for determining whether each device has a device status 44 of Retired Vendor Credit.

A designation/determination by device tracking system 20 that a device status 44 is Retired Disposed indicates that the device has been recycled and/or otherwise disposed and is no longer owned, leased, and/or otherwise controlled by client 12. Disposal details 42 from which the Retired Disposed device status 44 depends may also include a certificate of wipe/recycling, which can in turn be provided to client 12 along with the device status information 28 (as shown in FIG. 1A as attachments/files 30). Similarly, a designation/determination by device tracking system 20 that a device status 44 is Retired Sold indicates that the device has been sold to another user and is no longer owned, leased, and/or otherwise controlled by client 12. Disposal details 42 from which the Retired Sold device status 44 depends may also include a certificate of sale, which can in turn be provided to client 12 along with the device status information 28 (as shown in FIG. 1A as attachments/files 30). In the situation where disposal details 42 do not include the proper/relevant certificates but indicate that the devices have been wiped/ recycled or sold, device tracking system 20 may be configured to generate an alert. In one example, device tracking system 20 may not generate an alert unless the amount of time from when the device was determined to be Retired Disposed or Retired Sold to the current date (e.g., the date of the evaluation/determination by device tracking system 20) is greater than a threshold amount. In this example, the threshold amount is seven days. In other words, disposal vendor 16 can be designated/specified to have seven days to provide the proper/relevant certificates after disposing of or selling the device before device tracking system 20 generates an alert that the certificate(s) have yet to be provided. However, other threshold amounts can be set depending upon the needs/desires of client 12 and/or tracking service provider 10.

Lessor 15 can provide, allow access to, generate, and/or otherwise include lease information 39 able to be used by device tracking system 20 to determine device statuses 44, track those device statuses 44, and provide device status information 28 to client 12. Lease information 39 can be provided/accessed in any format for use by device tracking database 20 to determine that device status 44 is Retired Lease End if the corresponding device is beyond the lease end date, client 12 has decided not to renew and/or otherwise remain in possession of the device, and/or the device has been returned to lessor 15.

Shipping company 14 can provide, allow access to, generate, and/or otherwise include shipping information 38 able to be used by device tracking system 20 to determine device statuses 44, track those device statuses 44, and provide device status information 28 to client 12. As detailed in an example above, shipping information 38 can be sent to device tracking system 20 in response to a request for shipping information 38 by, for example, an API. The shipping information 38 can include a variety of transit and/or shipping details, such as a package tracking number (of the package that the device is in), a date that the package/device was picked up/provided to shipping company 14, an expected date of delivery, the actual date of delivery, the delivery address, the last known location of the package/device, whether there are an delays in the shipment, whether the package/device does not include tracking number (e.g., is untraceable), and/or other information. Shipping information 38 can also include the above information (and any additional information) regarding the shipment of a return label to client 12 to be used in returning a device from client 12 to tracking service provider 10 (e.g., when the device is broken and needs repair, when the employee of client 12 finishes employment at client 12 and is required to return the device, and/or for other reasons). Shipping information 38 can be accessed, obtained, received, etc. from shipping company 14 via a variety of methods and/or formats, including in tables and/or other visual and/or textual formats, emails, commerce platforms/programs (such as an online package tracking platform), and/or other methods. Further, while shown as being accessed/received from only one shipping company 14, shipping information 38 can be accessed, obtained, received, etc. from any number of shipping companies that have information regarding at least one device of client 12. In this case, device tracking system 20 can be configured to request information from each of the shipping companies, and the request can come automatically and/or manually and initiated by and/or performed by an operator/user and/or by device tracking system 20. Shipping information 38 can be accessed, obtained, received, etc. from shipping company 14 by device tracking system 20 for determining whether each device has a device status 44 of In Transit Shipped, In Transit Delivered, In Transit Exception, In Transit Returning, or In Transit Delayed Return.

A designation/determination by device tracking system 20 that a device status 44 is In Transit Shipped indicates that the device is in transit from tracking service provider 10 (or another party in possession of one or multiple devices of client 12) to client 12 but has yet to be delivered to the destination.

A designation/determination by device tracking system 20 that a device status 44 is In Transit Delivered indicates that the package/device has been delivered to client 12 but has yet to be connected to client UEM/MDM 26 to generate a device connection state 32C associated with that particular device (so therefore does not yet have a device status 44 of In Use Active).

A designation/determination by device tracking system 20 that a device status 44 is In Transit Exception indicates that the device is in transit from tracking service provider 10 (or another party in possession of one or multiple devices of client 12) to client but has yet to be delivered to the destination. However, an In Transit Exception device status 44 indicates that the package/device may be delayed in the delivery to client 12. This determination can be based on shipping information 38; which can include timeline, estimated delivery date, and/or location information; that can expressly state or imply that the package/device is not progressing in transit to client 12 as expected.

A designation/determination by device tracking system 20 that a device status 44 is In Transit Returning indicates that the device is being returned from client 12 to tracking service provider 10 (or another party in possession of one or multiple devices of client 12). The "In Transit Returning" device status 44 is used to indicate that client 12 still possesses the device and has yet to provide the device to shipping company 14 for return to provider 10 (but has not been delayed in providing the device to shipping company 14) or that client 12 has provided the device to shipping company 14 and the device is in transit back to provider 10.

Finally, a designation/determination by device tracking system 20 that a device status 44 is In Transit Delayed Return indicates that the device has been requested to be returned, but client 12 is delayed in providing the device to shipping company 14 for shipping company 14 to return the device back to provider 10. In other words, client 12 is in possession of the device and has received a return shipping label, but client 12 has yet to provide and/or otherwise turn the package/device in to shipping company 14 for shipping company 14 to ship the package/device to tracking service provider 10. In one example, device tracking system 20 can compare the date in which the return shipping label was delivered to client 12 (which is in shipping information 38) to the current date (e.g., the date of the evaluation/determination by device tracking system 20). If this amount of time is greater than a threshold amount of time (e.g., seven days), device tracking system 20 can determine that the device status is In Transit Delayed Return because client 12 is delayed in providing the device to shipping company 14 to return to provider 10. If the amount of time between the return label delivery date and the current date is less than the threshold amount, device tracking system 20 can maintain that the device is still In Transit Returning. Essentially, the threshold amount of time is a grace period to allow for client 12 to provide the device to shipping company 14 to return the device to provider 10. An In Transit Delayed Return device status 44 determination can include an alert and/or other notice to client 12 that the device has yet to be provided to shipping company 14 for return to tracking service provider 10. In one example, the threshold amount of time from when the return shipping label was received by client 12 to the time when the device status 44 is determined to be In Transit Delayed Return is seven days. However, other threshold amounts can be set depending upon the needs/desires of client 12 and/or tracking service provider 10. Shipping information 38 may not be the sole source of information from which the above device statuses 44 are determined, and some determinations may be based upon other external information 58 from other sources.

While FIG. 1B shows generally from which external information 58 the determinations of device statuses 44 depend, the determinations of device statuses 44 may depend from other information either external to and/or internal to device tracking system 20.

FIG. 1C shows example device tracking system 20 having multiple components 50-82, as well as client information 32 having a variety of types and/or formats of information 32A-32F and 34. The discussion with regards to FIG. 1C will first describe the different types/formats of client information 32 and then describe the components of device tracking system 20.

Client information 32 can include a variety of types and/or formats of external information 58 that is able to be used by device tracking system 20. While client information 32 is shown as having information 32A-32F and 34, client information 32 can include other types and/or formats of information not expressly disclosed herein, such as device information regarding the health of the device (i.e., a device health score). Further, device tracking system 20 may not use all types/formats of client information 32 to determine device statuses 44 and/or device status information 28. For example, during one cycle of determining device statuses 44, system 20 may use only device connection state 32C, while in the next cycle of determining device statuses 44, system 20 may only use device lost-stolen-missing information 32E. Moreover, while described herein as being different types and/or formats of information, all types/formats of client information 32 (i.e., 32A-32F and 34) can be in one document, file, database, etc. and/or can be mixed/interspersed within each other. Thus, device tracking system 20 can be configured to use only some portions/types of client information 32 when needed to determine device statuses 44 and/or provide device status information 28 (which can include other information regarding the devices) to client 12. Any type and/or format of client information 32 can be accessed, obtained, received, and/or otherwise used by device tracking system 20 using any of the methods described above, including accessing client information 32 via logging into client system 24 and/or client UEM/MDM 26 and/or receiving client information 32 via access to a client endpoint by system 20 and/or client 12 providing information to an input/connector port of system 20.

Client device database 34 can include a portion or all of client information 32 that is within and/or included in client UEM/MDM 26 as shown in FIGS. 1A and 1B. Additionally and/or alternatively, other types of client information 32 can be stored and/or otherwise found in client device database 34. Client device database 34 can have any configuration, organization, format, etc. that allows for use of client information 32 by system 20. Client device database 34 can include client information 32 that is manually and/or automatically added to (and/or updated within) client device database 34 by client 12 and/or any other components, systems, etc. of client 12.

Client information 32 can include device order information 32A. Device order information 32A can include information regarding two categories of orders: an order in which client 12 purchases, leases, and/or otherwise takes control of devices, and an order in which client 12 instructs tracking service provider 10 (or another in possession of the device(s) of client 12) to send/provide particular devices from inventory/stock to client 12. In the first category of order, client 12 is onboarding a new device into device tracking system 20. In the second category of order, the device is already onboarded (e.g., is in stock and tracked via device tracking system 20) and is designated by client 12 to be sent from tracking service provider 10 (or another in possession of device) to client 12. Device order information 32A can be provided via, for example, an online ordering platform and/or another program/platform. Device order information 32A can include other information regarding the devices that are being order/designated for use, the locations/addresses to which the devices are to be sent, the employee to which the device is to be sent, and software and/or hardware identifications and/or specifications (e.g., any preconfiguration information), and/or any other relevant and/or necessary information.

Client information 32 can also include device user information 32B. Device user information 32B can be any information regarding the user/employee that is using and/or designated to use the device. Device user information 32B can include, but is not limited to, a user email address, a username and/or user identification information, a user mailing/shipping address, and/or other information to associate the user/employee with the corresponding device. Device user information 32B can include any information regarding a user and/or potential user without the need for the user/employee to be assigned and/or in possession of a device. For example, device user information 32B can be present in client device database 34, client human resources information, and/or within another system/source. System 20 can be configured to designate a device status 44 for a device that does not include the necessary device user information 32B in client information 32 and/or in device tracking database 54.

Device user information 32B may be used in associating a device and/or user with the device connection state 32C. As described above, client information 32 can include device connection state 32C that includes information regarding a device heartbeat/connection state. The heartbeat/connection state details the most recent date and time (i.e., timestamp) that the specific device connected to client system(s) 24. With each device/employee likely needing to connect to client system(s) 24 to perform employment tasks, device connection state 32C provide device tracking system 20 (e.g., active analysis module 65) with accurate information as to the most recent activity/use of the device so that active analysis module 65 and/or device aging module 76 can determine if the device is active or if, in response to the device not connecting to client system(s) 24 for an extended period of time, the device needs attention. Device connection status 32C can include other information in addition to the most recent timestamp of connectivity of the device, such as the device serial number (and/or other identification information) and the device model. This information, along with, for example, some or all of device user information 32B, allows for device tracking system 20 to determine whether the device status 44 for the particular device is In Use Active or In Use Attention Required.

Client information 32 can include device lease information 32D, which includes all information relevant to the leases and/or warranties that devices may be currently or previously under (alternatively and/or additionally, some or all of this information can be in lease information 39 from lessor 15). Device lease information 32D and/or inventory information 39 can include, but is not limited to, warranty information, leasing terms, lease contract number, lease start date, lease end date, lease cost (per month and/or total), lessee information, lessor information, remaining time left on lease, insurance information, and/or any other information regarding warranty and/or leases of any devices. As with all client information 32, device lease information 32D may be included/present in client device database 34 and/or saved at other locations and/or within other client system(s) 24.

Client information 32 can also include current/updated client exclusion list 36, which is a list, database, table, and/or other organizational format that lists any devices owned, leased, possessed, and/or otherwise under the control of client 12 that client 12 does not want to include in device status information 28. In other words, client exclusion list 36 includes a list of any devices that client 12 does not want device tracking system 20 to track (e.g., determine device statuses 44 for and/or provide device status information 28 about). As described below with regards to the sub-process set out in FIG. 6, each sub-process for determining device statuses 44 can first use client exclusion list 36 to identify if process 100 (and/or the sub-processes of process 100) should be performed on the device or if the device is on client exclusion list 36 and should be omitted from such evaluation. Client exclusion list 36 can be changed/updated by client 12 and accessed by/provided to device tracking system 20 multiple times as needed so that device tracking system 20 has a current/updated client exclusion list from which to reference in identifying whether to determine device statuses 44 for each device. As with all client information 32, client exclusion list 36 may be included/present in client device database 34, saved at another location, and/or provided to device tracking system 20 via other methods. In one example, client exclusion list 36 is set up to be pushed periodically to device tracking system 20 in a specified format, such as a CSV file format. Furthermore, client exclusion list 36 can be saved to and/or incorporated into device tracking database 54 for use by device tracking system 20.

Client information 32 can include device lost-stolen-missing information 32E, which is any information relevant to devices that are currently or were previously missing. Device lost-stolen-missing information 32E can be manually entered by client 12 and/or can be inferred, indicated, and/or otherwise determined from other client information 32. Device lost-stolen-missing information 32E can include information regarding the device, the user/employee, and/or the circumstances of the device being missing (such as the date the device went missing, the date the user identified the device was missing, etc.), or device lost-stolen-missing information 32E can merely be an indication that the device is lost or stolen. Device lost-stolen-missing information 32E can be included in client device database 34; can be a separate database, list, and/or other organizational format; can be one or multiple emails (or other textual information) indicating that one or multiple devices are lost or stolen; can be provided via a ticketing system used by client 12 to provide information to system 20, and/or can be in another format able to be used by device tracking system 20 for determining device statuses 44 and/or providing device status information 28 to client 12.

Finally, client information 32 can include client transmission information 32F, which is any information needed for device tracking system 20 to provide device status information 28 and/or attachments/files 30 to client 12. Client transmission information 32F can include email addresses, client endpoints, electronic directory addresses, and/or other location information to which device tracking system 20 sends/provides device status information 28 and attachments/files 30. Further, client transmission information 32F can include access information to allow for client 12 to access device status information 28 and/or attachments/files 30 saved at a location controlled by tracking service provider 10. Client transmission information 32F can include access, location, identification, transmission preference, and/or other information regarding the accessing, sending, and/or receiving of information by client 12.

Some or all of client information 32 can be saved and/or organized within device tracking database 54 for use by device tracking system 20. Additionally, client information 32 as saved and/or included in device tracking database 54 can be updated/changed in response to the change of client information 32 as accessed, received, and/or otherwise used by device tracking system 20.

As shown in FIG. 1C, device tracking system 20 can also use shipping information 38 (from shipping company 14), lease information 39 (from lessor 15), disposal details 42 (from disposal vendor 16), and/or inventory information 57 (from provider ERP 22) as previously discussed.

Device tracking system 20 is configured to provide device tracking services to/for client 12 with device tracking services including (but not limited to) determining device statuses 44 for each device of potentially thousands of devices under the control of client 12 and reporting/providing those device statuses 44, along with other useful information, to client 12 as device status information 28 and/or attachments/files 30. As described above, device tracking system 20 (and the processes/sub-processed described in this disclosure) can include other steps, components, models, modules, configurations, and/or features not expressly disclosed herein that are suitable for accessing/obtaining external information 58, determining device statuses 44, tracking those device statuses 44, and providing device status information 28 to client 12.

First, system 20 (and/or the components of system 20) can include one or multiple computer/data processors 50. As described herein, processor 50 can be one or multiple processors used by system 20. System 20 can use one or multiple processors 50 that are generic/general-purpose processors capable of performing any instructions, tasks, determinations, and/or evaluations described herein. Alternatively, system 20 can include multiple processors 50 that are each specifically configured to perform, for example, one or a sub-set of sub-processes of process 100 as described below. In general, processor 50 can include any or more than one of a processor, a microprocessor, a controller, a digital signal processor (DSP), an application specific integrated circuit (ASIC), a field-programmable gate array (FPGA), or other equivalent discrete or integrated logic circuitry. Processor 50 can perform instructions stored within storage media 52 (or located elsewhere), and/or processor 50 can include memory such that processor 50 is able to store instructions and perform the functions described herein. Additionally, processor 50 can perform other computing processes described herein, such as the functions performed by any of the components of system 20, and/or any other systems/components described herein.

System 20 (and/or the components of system 20) can also include storage media 52. As described herein, storage media 52 can be one or multiple electronic storage components having the same or differing configurations, capabilities, etc. Storage media 52 is configured to store information (such as device tracking database 54, exclusion databases/ lists 56, saved external information 58, normalization override list 59A, and/or product content database 59B) and, in some examples, can be described as a computer-readable storage medium, media, and/or memory. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage media 52 is temporary memory. As used herein, a temporary memory refers to a memory having a primary purpose that is not long-term storage. Storage media 52, in some examples, is described as volatile memory. As used herein, a volatile memory refers to a memory that does not maintain stored contents when power to storage media 52 is turned off. Examples of volatile memories can include random access memories (RAM), dynamic random access memories (DRAM), static random access memories (SRAM), and other forms of volatile memories. In some examples, the storage media/memory is used to store program instructions for execution by the processor. The memory, in one example, is used by software or applications running on system 20 to temporarily store information during program execution.

Storage media 52 can be configured to store larger amounts of information than volatile memory. Storage media 52 can further be configured for long-term storage of information. In some examples, storage media 52 includes non-volatile storage elements. Examples of such non-volatile storage elements can include, for example, magnetic hard discs, optical discs, floppy discs, flash memories, cloud storage media, or forms of electrically programmable memories (EPROM) or electrically erasable and programmable (EEPROM) memories. Additionally, storage media 52 can be digital/electronic storage in the "cloud" that are distant from the other components of system 20.

Device tracking database 54 can be stored within storage media 52 and can include a portion of or all information regarding client 12, the devices, the users of those devices, device statuses 44, device status changes, exclusion lists 36 and/or 56, and/or any other relevant information. Device tracking database 54 can be in any format and/or configuration for organizing the relevant information for determining device statuses 44 and providing device status information 28 to client 12. Device tracking database 54 can include one, multiple, or all previous device statuses 44 as previously determined for each device, the current device status 44 for each device, device inclusion and/or exclusion information regarding whether the device is to be included in and/or excluded from tracking, and/or other information that is used, referenced, and/or otherwise updated by system 20. For example, device tracking database 54 can include (for one, multiple, or all devices) a normalized serial number, a tracking service provider serial number, prior and/or current device statuses 44, a device tag, a tracking service provider part number, a normalized model name, a normalized model description, the manufacturer of the device, a manufacturer part category, an order number, whether the device is assigned/designated to a user, the user and user information associated with the device, a stockroom the device is in, the shipping company/carrier used to ship the device, a tracking number of the package/device, a shipping date, a ship to name, a ship to company, mailing/shipping addresses of users/employees, the order date, the client name, the name of the party the disposed device was sold to, the invoice number, the invoice date, the client unit price, the currency used in the transactions, the disposal value of the device, the device health score, the device warranty information, the device leasing information, any comments associated with the device, any certificates associated with the device (e.g., the certificate of wipe, certificate of recycling, and certificate of sale), device exclusion and/or inclusion information, and/or other information regarding the device, client 12, shipping company 14, disposal vendor 16, and/or provider ERP 22. In one example, device tracking database 54 organizes the information in rows and columns with each row corresponding to each device of the potentially thousands of devices of client 12 and each column corresponding to each category of information for each device. It should be noted that each device does not need to have information in each category such that some entries in device tracking database 54 may be blank.

Exclusion databases/lists 56 can be stored within storage media 52 of device tracking system 20 and/or can be included in device tracking database 54. As with current/ updated client exclusion list 36 of client information 32, exclusion database/lists 56 include a list, database, table, and/or other organizational format that lists any devices of client 12 that client 12 has specified to exclude from tracking and/or from device status information 28. Device tracking system 20 can be configured to store, include, and/or otherwise use prior versions of exclusion database/list 36 as defined/stored in exclusion databases/lists 56 (as well as the current/updated version of exclusion list 36 as most recently received from client 12) to identify which devices are to be excluded from device status information 28 and/or which device were previously excluded but are now specified by client 12 to be included in device status information 28. Thus, device tracking system 20, by EAE module 62, can be configured to compare the prior exclusion list to the current exclusion list to determine any devices added to and/or removed from the exclusion list. Therefore, exclusion database/lists 56, as shown in FIG. 1C, can include both prior exclusion lists as well as the current/updated exclusion list 36 most recently provided by client 12. While not included in device status information 28, the excluded devices as specified by client 12 may still be in device tracking database 54 just in case client 12 specifies, at a later time, that it desires to include those previously excluded devices in device status information 28 (and thus track the device statuses 44 of those devices).

External information 58 can be stored within storage media 52 of system 20 (denoted in FIG. 1C as "saved external information 58"). Saved external information 58 can be any and/or all external information 58 from information sources external to system 20 or other information external to device tracking database 54 and/or exclusion databases/lists 56. Saved external information 58 can be stored in any format, configuration, and/or organization for use by system 20, operators/users, and/or any other individuals and/or systems associated with tracking service provider 10 and/or system 20, including a format that is different than the format in which external information 58 was provided to system 20 by one or more sources of external information. While shown as being stored in storage media 52, device tracking database 54, exclusion databases/ lists 56, and/or saved external information 58 can be stored at any location within and/or distant from system 20 and/or can be incorporated into one file, system, database, etc., such as device tracking database 54.

Normalization override list 59A can be stored within storage media 52 of system 20 and/or at other locations for access by, for example, normalization module 78 and/or other systems performing process 100. Normalization override list 59A can be a list, database, table, CSV file, and/or other organizational format/configuration that includes normalized model names, normalized model descriptions, normalization categories (and corresponding serial numbers, client model names, provider part numbers, manufacturer part numbers, and provider model descriptions), and/or other relevant/useful information. The normalized model names are the model names that the respective devices are to be referred to in device status information 28 (and/or can also be included/associated with the devices in device tracking database 54). The normalized model descriptions are the descriptions of the devices that are potentially to be included for the respective devices in device status information 28 (and/or can also be included/associated with the devices in device tracking database 54). In device status information 28 provided to client, client 12 may have specific device model name preferences to allow for improved recognition, readability, and/or understandability of what electronic product the device is. Thus, the device model name is normalized such that the device model name as (it appears in device status information 28) can be provided from normalization override list 59A. The normalization category for each device for which the normalized model name is being provided is a category by which the device in device tracking database 54 is matched to the particular normalized model name in normalization override list 59A. For example, the normalization category can be the device serial number, so the device serial number in device tracking database 54 is compared to the serial number corresponding to the entry/normalized model name in normalization override list 59A. Other normalization categories can be the provider part number (current and past/historical), the manufacturer part number (current and past/historical), the client model name (e.g., from client UEM/MDM 26), and the provider model description (e.g., the description of the electronic product/device from provider ERP 22). Additionally and/or alternatively, normalization override list 59A can include normalization image links associated with each normalized model name that can be a link to an image of the similar product/device. This link can be, for example, a link to a webpage on the internet and/or a link to the source of the information in product content database 59B. The normalized image link can be associated with the respective device so as to be included in device tracking database 54.

Normalization override list 59A, for example, can be used/referred to by normalization module 78 and/or process 100 (as described below) to generate/associate a normalized model name with the device in device tracking database 54. For example, an Apple MacBook may have dozens or hundreds of model names as designated by the manufacturer (that can include the specifications of the product, the size of the product, and/or other information). However, client 12 may desire, for understandability and readability, that all respective versions/models of the Apple MacBook be designated to have a model name of Apple MacBook Pro (when applicable) or Apple MacBook Air (when applicable) instead of model names that can include other descriptive information (e.g., "MacBook Pro 2019 13.3 Inch Touch Bar 1.7 GHz 16 GB 512 GB SSD 2×Thuderbolt 2 Space Gray"). In another example, the device model name may not even indicate what type of electronic product the device is (e.g., "HP EX360830G11 U7-165U13"). Thus, normalization override list 59A can include more understandable model names that are representative of the corresponding devices in device status information 28.

Normalization override list 59A can include any number of entries/normalized model names having any organization. New entries/normalized model names (and/or related information) can be added to normalization override list 59A and/or existing entries/normalization model names (and/or related information) can be modified/altered by anyone associated with tracking service provider 10 and/or others via, for example, user interface 60. Normalization module 78 and/or process 100 can be configured to apply, create, generate, substitute, etc. any number of normalized model names as set out in normalization override list 59A for the applicable/corresponding devices in device tracking database 54. Normalization override list 59A can be changed/updated multiple times as needed and may be included/present in storage media 52 and/or provided to/used by normalization module 78 and/or process 100 via other methods and/or from other electronic/digital locations, such as the cloud.

Product content database 59B can be stored within storage media 52 of system 20 and/or at other locations for access by, for example, normalization module 78 and/or other systems performing process 100. Product content database 59B can be a list, database, table, CSV file, and/or other organizational format/configuration that includes a variety of electronic product information for a large number of products/devices, whether used by client 12 or not. The product information can include current manufacturer part numbers, past manufacturer part numbers, product specifications, current product model names, past product model names, product model descriptions, product images and/or links to product images, and/or any other information relevant to the electronic product. In one example, the information in product content database 59B is at least partially pulled from product databases on the internet. Product content database 59B can include information for any number of products/devices as needed/useful to system 20. Product content database 59B can allow for additions, modifications, and/or deletions by anyone associated with tracking service provider 10 and/or others. Product content database 59B can be accessible by normalization module 78 and/or process 100 via any electronic communication methods, including the methods described above with regards to normalization override list 59A and/or with regards to the other components of system 20.

System 20 can also include user interface 60. User interface 60 can be an input and/or output device and enables an operator/user to control operation, modification, view of data, etc. of any information and/or systems/components within system 20 and/or in communication with system 20. For example, user interface 60 can be configured to receive inputs, such as external information 58, from external sources and/or provide information, such as device status information 28, attachments/files 30, and/or device tracking database 54 to client 12. User interface 60 can include one or more of a sound card, a video graphics card, a speaker, a display device (e.g., a liquid crystal display (LCD), a light emitting diode (LED) display, an organic light emitting diode (OLED) display, etc.), a touchscreen, a keyboard, a mouse, a joystick, and/or other type of device for facilitating input and/or output of information in a form understandable to users and/or machines. In one example, an operator/user and/or other individual can use user interface 60 to view and/or alter any of the information associated with system 20.

Figure 2A:
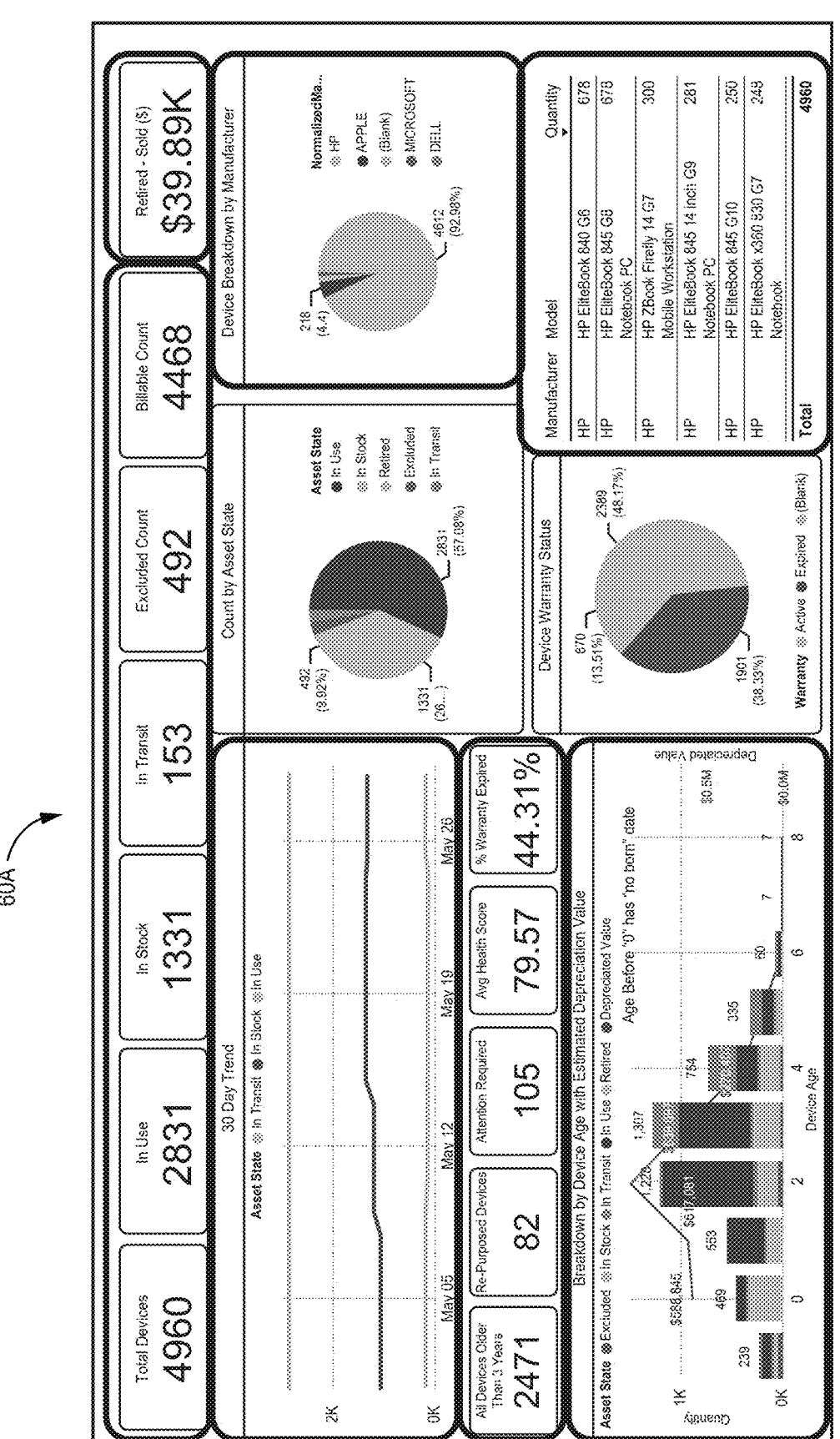
FIG. 2A is an example user interface of the device tracking system showing device statuses and related information.

FIG. 2A shows an example user interface 60A (also referred to herein as "dashboard 60A") of device tracking system 20. Dashboard 60A shows device statuses 44 as well as other trends, graphs, tables, charts, etc. System 20 can be configured to allow client 12 (and/or an operator/user of system 20) to view, use, etc. dashboard 60A to understand the information regarding the devices of client 12 and/or the device statuses 44 of those devices. Dashboard 60A can be configured to show a variety of types of information, including the total number of devices being tracked for client 12 by system 20, the number of devices having an "in use" state, an "in stock" state, an "in transit" state, an excluded state (e.g., devices on the current exclusion list 36), the total amount of money the retired devices were sold for, and/or other types of information. Dashboard 60A can be configured to show many other types of information in a variety of formats.

Figure 2B:
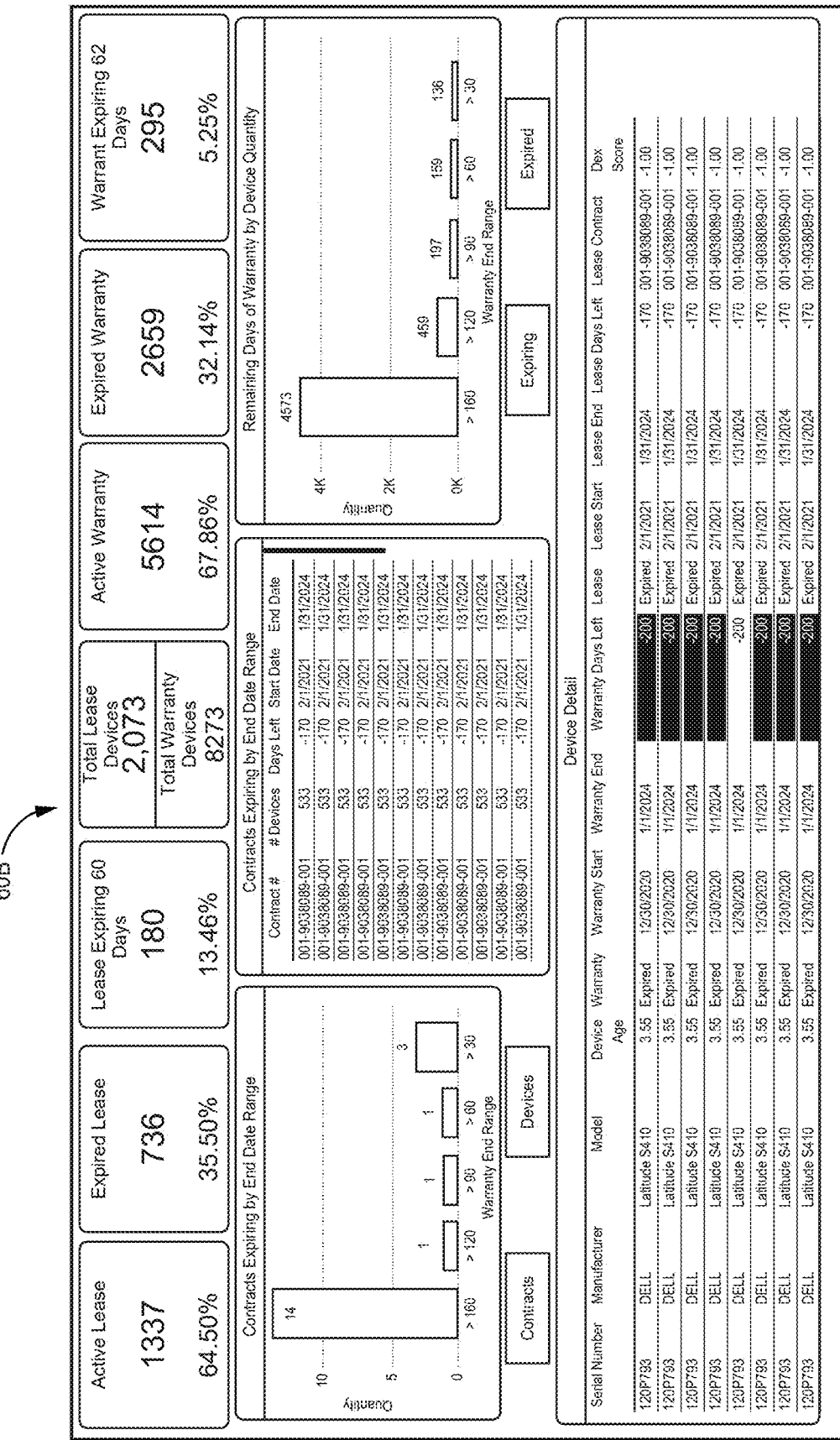
FIG. 2B is an example user interface of the device tracking system showing device leasing and warranty information.

Similarly, FIG. 2B shows another example user interface 60B (also referred to herein as "dashboard 60B") of device tracking system 20. Dashboard 60B shows information regarding leases and warranties associated with the devices of client 12. As with dashboard 60A, system 20 can be configured to allow client 12 (and/or an operator/user of system 20) to view, use, etc. dashboard 60A to understand the information regarding the devices' leases and warranties. Dashboard 60B can be configured to show a variety of types of information, including the number of devices under an active lease, the number of devices under an expired lease, the number of devices under a lease that expires soon, the total number of devices under a lease, the total number of devices under warranty, the number of devices under an active warranty, the total number of devices under an expired warranty, the number of devices under a warranty that expires soon, and/or other types of information. Dashboard 60B can be configured to show many other types of information in a variety of formats.

Figure 3:
FIG. 3 is an example table showing potential device status changes and the response of the device tracking system to those potential device status changes.

Each determination of the pending device status 44 by the components/modules of device tracking system 20 can also include a comparison of the current device status 44 as listed in the device tracking database 54 to the pending status 44 that was determined by the corresponding component/module depending on external information 58. This comparison can provide safeguards that automatically prevent status changes (i.e., a change of the device status 44 in device tracking database 54 to the pending/determined device status 44) if the device status changes are prohibited because those status changes are erroneous and/or incorrect. Further, the safeguards can include automatically generating an alert to a user/operator if the status change is unusual to prompt further review of the status change. FIG. 3 shows example table 90 showing potential device status changes and the automatic response of device tracking system 20 to those potential device status changes. System 20 (e.g., the modules/components of system 20) can compare the current device status 44 (shown on the left in table 90) as set out in device tracking database 54 to the pending device status 44 (shown on the top in table 90) as determined by the corresponding modules/components of system 20 to determine the device status change. The device status change can be categorized as one of three status changes: an allowable status change (denoted as "allowable" in table 90), a prohibited status change (denoted as "prohibited in table 90), and an unusual status change (denoted as "unusual" in table 90).

For example, a comparison of the current device status 44 of In Stock Available (along the left side near the top) to a pending device status 44 of Missing Lost (along the top near the right side) is prohibited because a device cannot go directly from being in stock in the possession of tracking service provider 10 to being Missing Lost without first being sent to client 12 (which would include at least one intervening device status, such as In Transit Shipped, In Transit Delivered, In Use Active, and In Use Attention Required). Therefore, this status change is prohibited. System 20 can be configured to generate an alert for a user/operator to further review and/or investigate the status of that device.

Depending on the status change, system 20 can allow the status change such that the current device status 44 as listed in device tracking database 54 is updated with the proposed/pending status (for an allowable status change), can prohibit/prevent the status change such that the current device status 44 as listed in the device tracking database 54 remains unchanged (for a prohibited status change), or can allow the status change to the proposed/pending status but additionally generate an alert to a user/operator that the status change is unusual and should be further reviewed (for an unusual status change). In another configuration, system 20 can notify the user/operator, client 12, and/or any others of any instances when the status change is prohibited so that the user/operator can further review the status change and potentially allow the status change if desired.

System 20 can be configured to automatically perform subsequent actions, evaluations, and/or determinations depending on the identified status change and/or the type of status change (e.g., allowable, prohibited, and unusual). For example, if a status change is prohibited during one evaluation/determination by a module of system 20 (e.g., during the evaluation/determination of the device status 44 by active analysis module 65), system 20 can automatically perform subsequent device status determinations by other modules (e.g., perform a device in stock determination/evaluation by stock module 74). In another example, system 20 can continue performing further determinations/evaluations of a device status for a device (e.g., can continue performing process 100) after updating the status in device tracking database 54 in response to an unusual status change. Additionally and/or alternatively, system 20 can automatically prompt an operator/user to make decisions and/or review actions in response to the identified status change. Furthermore, if a status change is unusual and/or prohibited, system 20 can automatically access external information 58 to ensure that the information upon which the unusual and/or prohibited status change depends is correct and/or has been updated. System 20 can then automatically reperform the determination/evaluation. Thus, system 20 can be configured to perform, either automatically and/or manually, subsequent actions, evaluations, and/or determinations depending upon status determinations and/or the identification of status changes.

System 20 can include one or multiple modules 62-82 for performing the tasks/sub-processes described herein. One, multiple, and/or all components/modules 62-82 can use and/or work in conjunction with processor 50, storage media 52, user interface 60, and/or the other components of system 20. The components/modules of system 20 can access, obtain, receive, and/or otherwise use external information 58 from any external sources and can use a variety of electronic communications/transmissions to access, send, and/or receive information. Additionally, one, multiple, or all modules/components of system 20 described herein can perform tasks automatically as initiated/trigger by any events, such as by the completion of a prior sub-process/step, according to a schedule, by the access to and/or reception of new and/or updated external information 58, and/or in response to any other events. Further, the tasks performed by the components of system 20 can be initiated manually. In another example, one, multiple, or all modules/components of system 20 can perform tasks manually by an operator/user as desired/necessary. While described and shown herein as separate components, modules 62-82 are examples and the tasks of system 20 can be performed by one, multiple, or all of the components (e.g., modules 62-82) without deviating from this disclosure. Thus, in one example, system 20 can include processor 50 (and/or multiple processors) that performs all tasks described herein as being performed by modules 62-82. Moreover, modules 62-82 can include and/or work in conjunction with storage media 52 to save any information, instructions, etc. that are needed to perform tasks by modules 62-82 and/or that result from the performance of tasks by modules 62-82.

Figure 6:
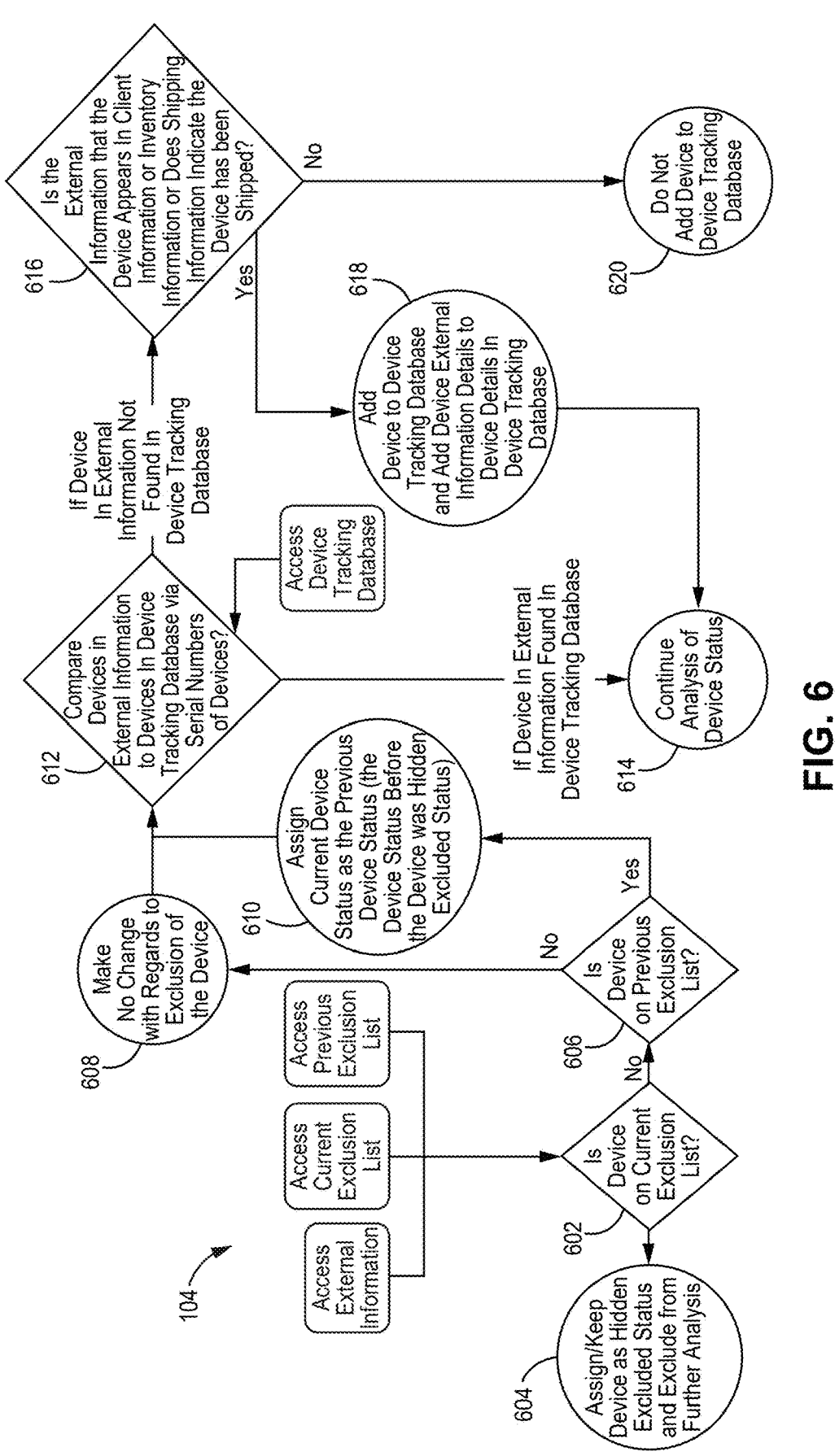
FIG. 6 is an example sub-process for determining whether the devices are excluded from and/or correctly listed in the tracking process.

Exclusion and device existence (EAE) module 62 can be configured, for example, to perform the sub-process shown in FIG. 6 for identifying whether the device is to be included in the tracking analysis performed by system 20 and/or in device status information 28. Further, EAE module 62 can be configured to identify whether the device is and/or should be included in device tracking database 54 for tracking by system 20. EAE module 62 can use external information 58, such as updated client exclusion list 36 and/or prior exclusion databases/lists 56, to identify the devices that are to be included in tracking, further analysis, and/or device status information 28 provided to client 12. EAE module 62 can be configured to compare updated client exclusion list 36 to the most recent prior exclusion list 56 to add devices to the exclusion list 56 and/or remove devices from the exclusion list 56. In response to a device being added to the exclusion list 56, EAE module 62 can designate that device as being excluded in device tracking database 54 and, in response to a device being removed from the exclusion list 56 (e.g., as indicated in client exclusion list 36), EAE module 62 can remove the excluded device designation from that device in device tracking database 54 and set the current device status 44 for the device as the most recent prior device status 44 as listed in device tracking database 54. Then, system 20 can proceed with the determination of the device statuses 44 for all devices that are not on the current exclusion list 56. EAE module 62 can perform an exclusion list check by comparing the device to the exclusion list 56 and determining if the device is listed in the exclusion list 56. In one example, EAE module 62 performs an exclusion list check for each device as external information 58 associated with that device is accessed/received. Thereafter, the other modules of system 20 determine the device status 44 for each device.

EAE module 62 can also use/evaluate external information 58 to ensure the device is included in device tracking database 54 so that system 20 determines the device status 44 for each device. In response to the device not being in device tracking database 54, EAE module 62 can evaluate from which external source the external information 58 that includes the new devices is from to determine if the device is a new device that should be added to device tracking database 54 (and thus the device statuses 44 for that device are determined) or if the device is not new but rather has incorrect device identification information. If, after EAE module 62 performs these checks (as described in greater detail with regards to FIG. 6), EAE module 62 can be configured to add the device to device tracking database 54 and populate the associated device details/information in device tracking database 54 for subsequent use in determining device statuses 44 (and/or in providing that information to client 12) or generate an alert for an operator/user to investigate the device information further. EAE module 62 can have other configurations, capabilities, and/or functions than those expressly described herein, including those described with regards to the sub-process in FIG. 6.

Figure 7:
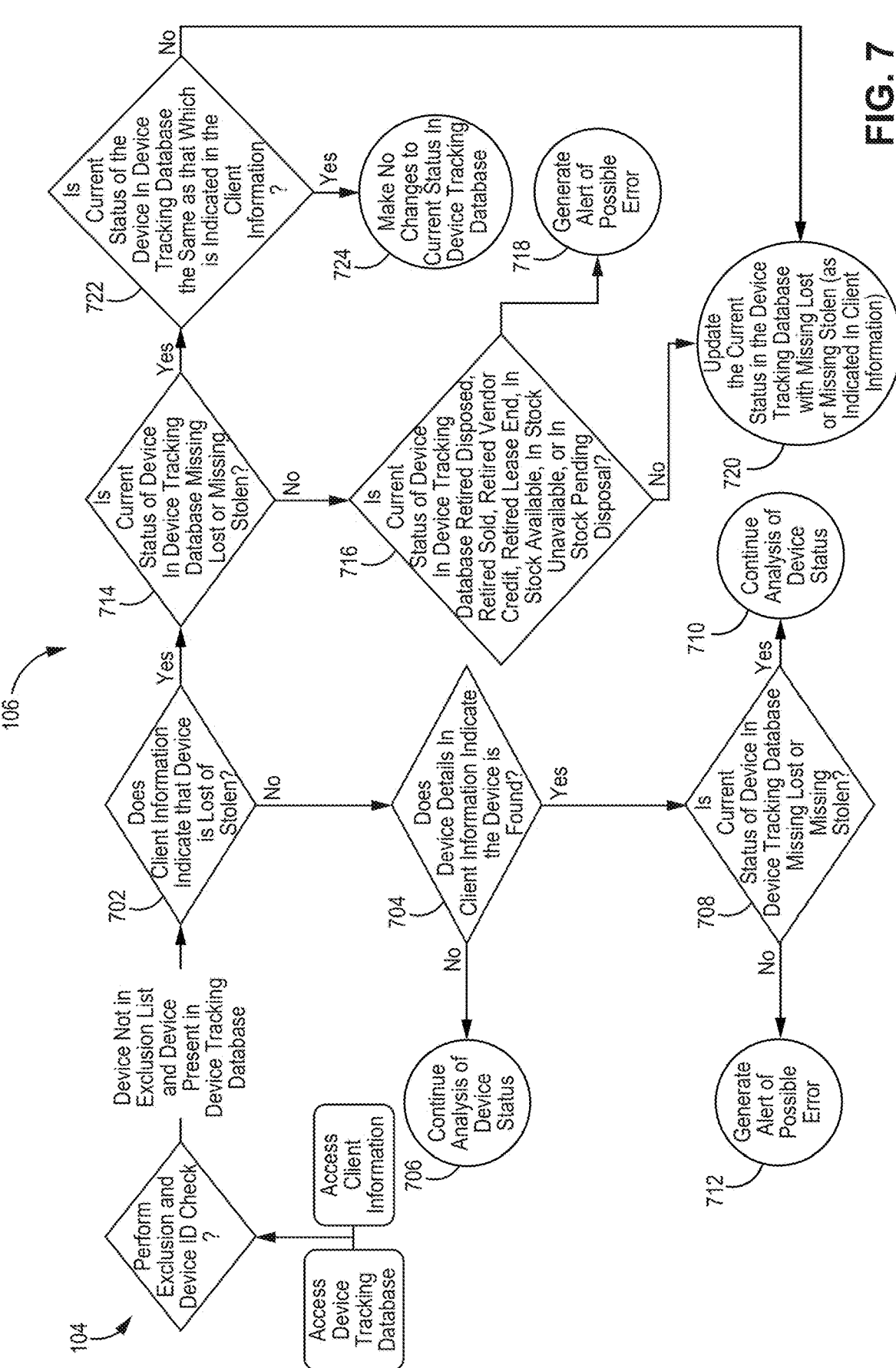
FIG. 7 is an example sub-process for determining the device statuses with regards to devices that may be lost, stolen, and/or found.

Lost-stolen-missing (LSM) module 64 can be configured to perform the sub-process shown in FIG. 7 for determining whether the device (and/or multiple devices) has a device status 44 of Missing Lost or Missing Stolen and/or whether the device that was previously designated as Missing Lost or Missing Stolen has been found and thus requires further analysis by system 20 to determine an updated/current device status 44. LSM module 64 can use external information 58, such as client information 32, regarding any devices that may be lost or stolen. LSM module 64 can access and/or update/modify device tracking database 54 to update device statuses 44 depending upon external information 58. In one example, external information 58, such as client information 32, is accessed (e.g., received) from client 12 indicating that a device has been lost. Such indication can be an email stating that the device has been lost, a designation in client device database 34 and/or another list that the device has been lost, and/or inferences made by LSM module 64 that the device has not been in use for a period of time, the employee has been assigned the device but requested another device, and/or other information. LSM module 64 can compare the pending device status 44 (as determined to be Missing Lost or Missing Stolen) to the current device status 44 as listed in device tracking database 54 to determine if the status change is an allowable status change, a prohibited status change, or an unusual status change. LSM module 64 can then determine whether to allow the status change, prevent the status change, and/or allow the status change while also generating an alert. LSM module 64 can be configured to perform tasks (e.g., determine device statuses 44) each time external information 58 is accessed/received, only when the external information 58 includes an indication that at least one device has been/is missing (e.g., lost or stolen), and/or only when at least one device that was previously lost or stolen has been/is indicated/inferred to be found. LSM module 64 can have other configurations, capabilities, and/or functions than those expressly described herein, including those described with regards to the sub-process in FIG. 7.

Figure 8:
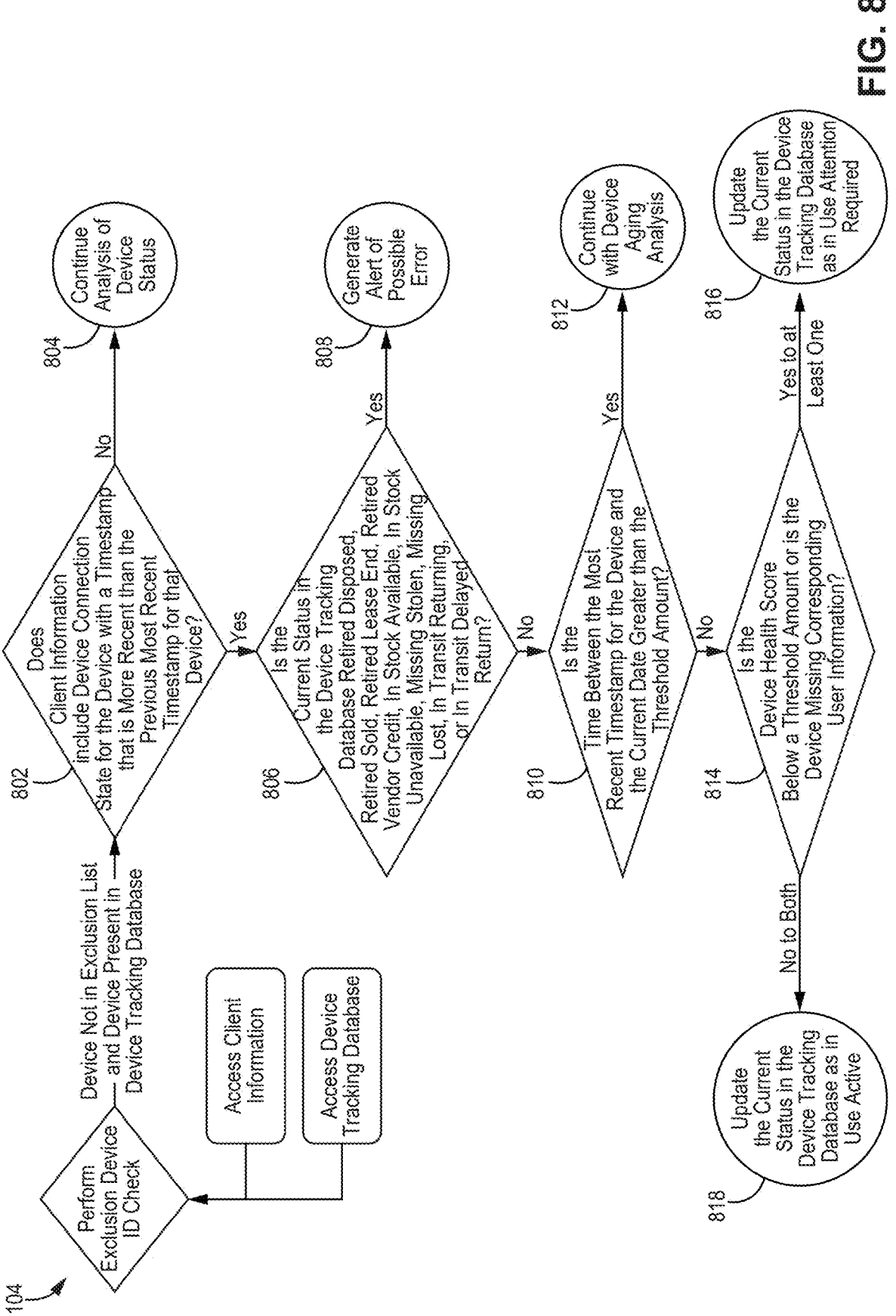
FIG. 8 is an example sub-process for determining the device statuses with regards to devices that are actively in use by the client.

Active analysis module 65 can be configured, for example, to perform a portion of or all of the sub-process shown in FIG. 8 for determining whether the device (and/or multiple devices) has a device status 44 of In Use Active. Active analysis module 65 can use client information 32, such as device user information 32B and device connection state 32C. Active analysis module 65 can identify, from device connection state 32C, whether the device has a timestamp that indicates that the device has connected to client UEM/MDM 26 (and/or another client system 24) within the threshold amount of time. Active analysis module 65 can determine if the most recent timestamp is different than the previous timestamp for the device (and thus the device has connected to client UEM/MDM 26 since the last evaluation/determination by system 20) and/or whether the amount of time between the most recent timestamp and the current date of the determination is less than the threshold amount (e.g., thirty days). If the amount of time is less than the threshold amount, active analysis module 65 can determine that the device is actively in use and set the device status 44 as In Use Active. If the amount of time is greater than the threshold amount (which can be determined in conjunction with device aging module 76 as described below), system 20 (e.g., device aging module 76) can determine that the device is not actively in use and set the device status 44 as In Use Attention Required.

Further, active analysis module 65 can review device user information 32B to ensure that all necessary information is present and, if not, determine that the device status 44 is In Use Attention Required to notify a user/operator, client 12, and/or others that device user information 32B needs to be provided and/or updated. Active analysis module 65 can perform the determination on one, multiple, or all devices that have associated device connection states 32C including connection timestamps (as set out in client information 32). Active analysis module 65 can compare the pending device status 44 (as determined to be In Use Active or In Use Attention Required) to the current device status 44 as listed in device tracking database 54 to determine if the status change is an allowable status change, a prohibited status change, or an unusual status change and make updates, prevent updates, and/or generate alerts as necessary. Active analysis module 65 can have other configurations, capabilities, and/or functions than those expressly described herein, including those described with regards to the sub-process in FIG. 8.

Figure 9:
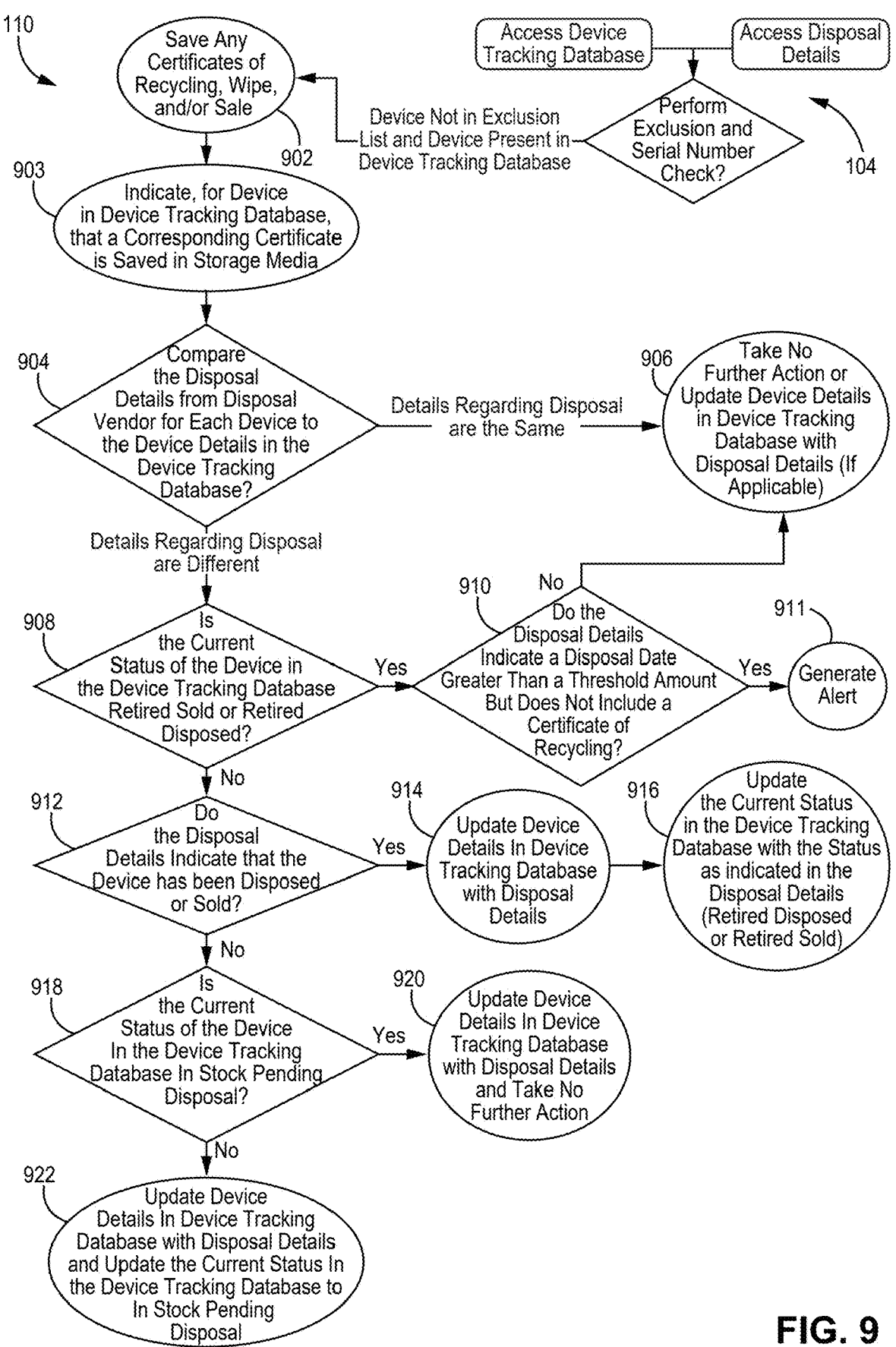
FIG. 9 is an example sub-process for determining the device statuses with regards to devices that may be disposed/sold and/or waiting disposal/sale.

Disposal module 66 can be configured, for example, to perform the sub-process shown in FIG. 9 for determining whether the device (and/or multiple devices) has a device status 44 that is Retired Disposed or Retired Sold and/or for retrieving, accessing, receiving, and/or otherwise saving any certificates regarding the wipe, recycling, and/or sale of retired devices (e.g., attachments/files 30). Disposal module 66 can work in conjunction with communication module 80 to solicit disposal details 42 from disposal vendor 16. In one example, communication is set up between disposal module 66 and disposal vendor 16 such that disposal vendor 16 generates a CSV file with disposal details 42 and the CSV file including the disposal details 42 is automatically provided to a connection point (e.g., connector node) of system 20 such that disposal module 66 receives disposal details 42 in response to disposal vendor 16 pushing disposal details 42 out. In another example, communication can be set up between disposal module 66 and disposal vendor 16 such that disposal vendor 16 generates the CSV file with disposal details 42 and system 20 pulls the CSV file (e.g., accesses and/or saves the CSV file to storage media 52) as opposed to the previous example in which disposal vendor 16 pushes the information to system 20. Disposal module 66, and system 20 generally, can use other methods for accessing, receiving, etc. disposal details 42.

Disposal module 66 can be configured to access and/or update/modify device statuses 44 and/or other relevant information in device tracking database 54 depending upon disposal details 42. Disposal module 66 can be configured to change device status 44 as listed in device tracking database 54 to one of Retired Disposed or Retired Sold and/or change device status information 28 (and/or other information associated with devices in device tracking database 54) to include a portion of and/or all of disposal details 42 to provide information as to the disposal and/or sale of the devices. This information can be any of the information described with regards to disposal details 42 and/or other information. Disposal module 66 can compare the pending device status 44 (as determined to be Retired Disposed or Retired Sold) to the current device status 44 as listed in device tracking database 54 to determine if the status change is an allowable status change, a prohibited status change, or an unusual status change and make updates, prevent updates, and/or generate alerts as necessary. Disposal module 66 can have other configurations, capabilities, and/or functions than those expressly described herein, including those described with regards to the sub-process in FIG. 9.

Figure 10:
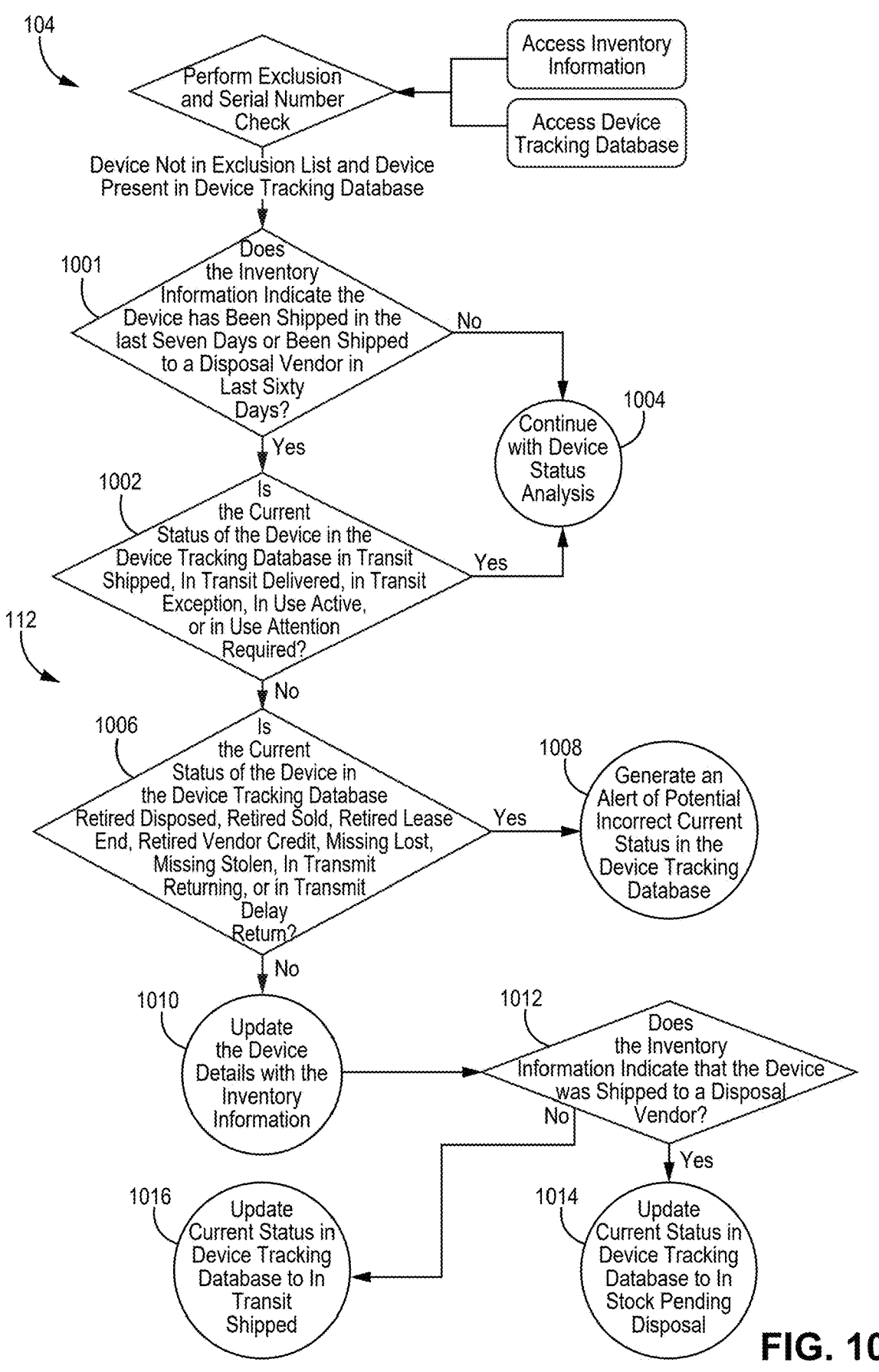
FIG. 10 is an example sub-process for determining the device statuses with regards to devices that may be in transit to and/or from the client and/or another vendor.

Shipped ERP module 67 can be configured, for example, to perform at least a portion and/or all of the sub-process shown in FIG. 10 for determining device statuses 44 regarding devices that are indicated as recently being shipped in provider ERP 22 (e.g., inventory information 57). Shipped ERP module 67 can be configured to access, receive, and/or otherwise use inventory information 57 from provider ERP 22. Shipped ERP module 67 can be configured to determine device statuses 44 and/or update/modify device statuses 44 and/or other information in device tracking database 54 for a portion of all devices, only those listed in device tracking database 54, and/or for only those devices that are indicated in inventory information 57 as being shipped in the most recent designated number of days. For example, the most recent designated number of days can be seven days for all devices and sixty days for those devices indicated as shipped to disposal vendor 16. In one example, shipped ERP module 67 receives/accesses inventory information 57 regarding multiple devices and performs the determination of device statuses 44 only for those devices listed/indicated as being shipped in the last designated number of days (e.g., the last seven days overall and/or sixty days to disposal vendors). Moreover, shipped ERP module 67 can be configured to, even if the device status 44 remains unchanged, add to and/or update device status information 28 and/or other relevant information in device tracking database 54 with a portion of or all of the associated information in inventory information 57. The pending device statuses 44 as determined by shipped ERP module 67 depending upon inventory information 57 can be compared to the current device statuses 44 in device tracking database 54 to determine if the status change is an allowable status change, a prohibited status change, or an unusual status change and make updates, prevent updates, and/or generate alerts as necessary. Shipped ERP module 67 can have other configurations, capabilities, and/or functions than those described herein, including those described with regards to the sub-process in FIG. 10.

Shipping module 68 can be configured, for example, to perform at least a portion of and/or all of the sub-processes shown in FIGS. 14A-14D for determining device statuses 44 regarding the shipment of the devices to client 12, the shipment of return labels to client 12 for return of the devices, and/or the return of the devices from client 12 to device tracking provider 10 (or another provider tasked with managing devices for client 12). Shipping module 68 can be configured to access, receive, and/or otherwise use shipping information via any methods described in this disclosure, including those detailed with regards to disposal module 66 and disposal vendor 16. Shipping module 68 can be configured to determine device statuses 44 and/or update/modify devices statuses 44 and/or other information in device tracking database 54 for a portion or all devices, only those listed in device tracking database 54, and/or for only those devices that are present in shipping information 38. In one example, shipping module 68 receives shipping information 38 regarding multiple devices and performs the determination of device statuses 44 for just those devices listed/present in shipping information 38. In another example, shipping module 68 performs the determination of device statuses 44 (both current device statuses 44 as listed in device tracking database 54 and pending device statuses 44 as indicated in shipping information 38) with regards to the following device statuses 44 for all devices listed in device tracking database 54 and/or indicated in shipping/tracking information 38: In Transit Shipped, In Transit Delivered, In Transit Exception, In Transit Returning, and In Transit Delayed Return. Moreover, shipping module 68 can be configured to, even if the device status 44 remains unchanged, add to and/or update device status information 28 and/or other relevant information in device tracking database 54 with a portion of or all of the associated information in shipping information 38, such as the information described with regards to shipping information 38 above (e.g., a device tracking number). The pending device statuses 44 as determined by shipping module 68 depending upon shipping information 38 can be compared to the current device statuses 44 in device tracking database 54 to determine if the status change is an allowable status change, a prohibited status change, or an unusual status change and make updates, prevent updates, and/or generate alerts as necessary. Shipping module 68 can have other configurations, capabilities, and/or functions than those described herein, including those described with regards to the sub-processes in FIGS. 14A-14D.

Figure 11:
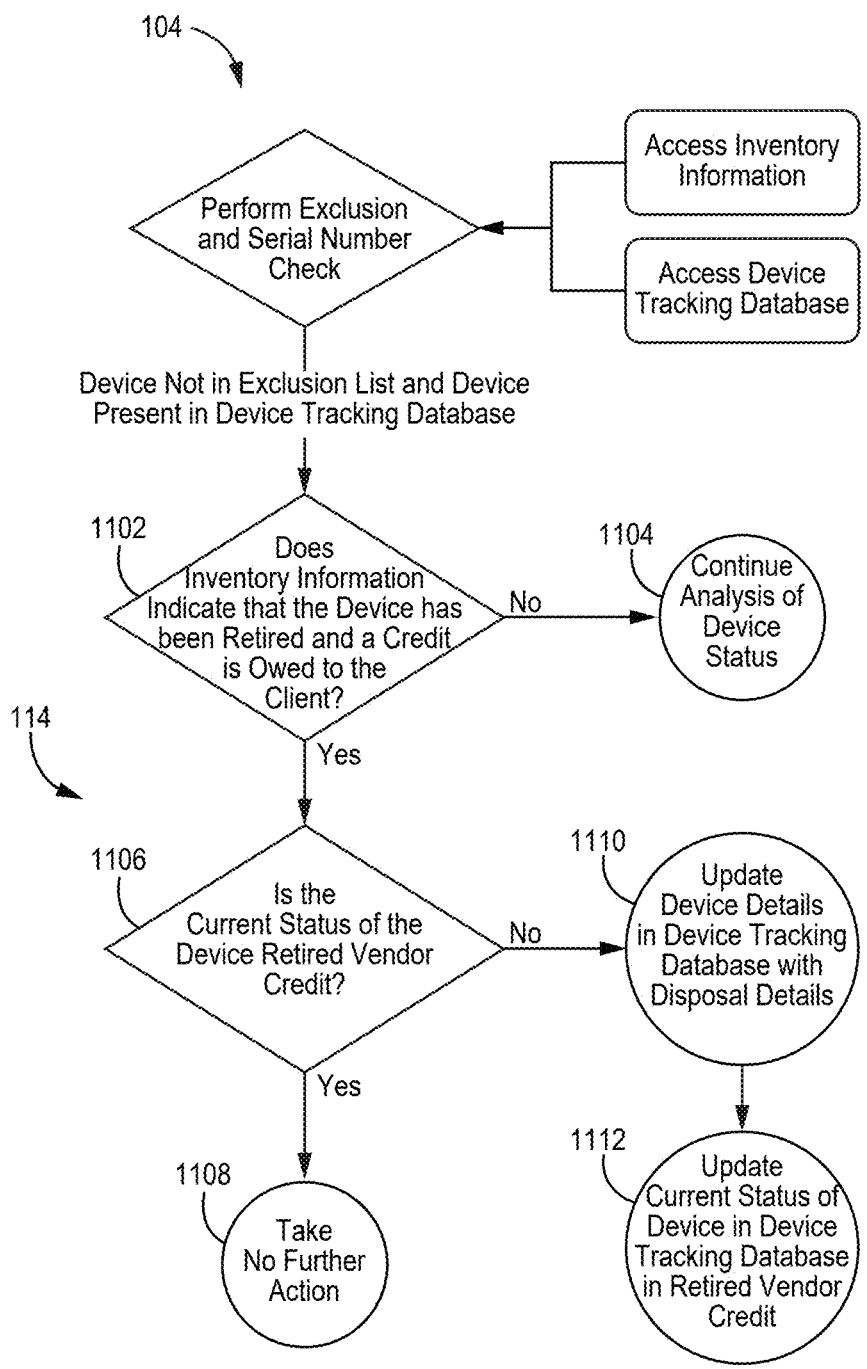
FIG. 11 is an example sub-process for determining the device statuses with regards to devices that are retired and for which a vendor credit applies.

Vendor credit module 70 can be configured, for example, to perform the sub-process shown in FIG. 11 for determining whether client 12 will be and/or has been issued a vendor credit for any disposed, sold, and/or otherwise retired devices. The determination by vendor credit module 70 can be based upon inventory information 57 and/or any other external information 58 regarding the crediting of money to client 12. In one example, the vendor credit information is included inventory information 57 as accessed, received, and/or otherwise used from provider ERP 22 and is related to any devices that are to be decommissioned by tracking service provider 10. For example, client 12 may wish to sell twenty devices back to tracking service provider 10. This would be indicated in inventory information 57, and vendor credit module 70 can be configured to access that information and, depending on that information, determine that the status change for those ten devices is retired vendor credit. Vendor credit module 70 can access, receive, etc. external information 58 via any methods described in this disclosure. Vendor credit module 70 can, depending on inventory information 57 (and/or other external information 58, such as decommissioning information from a third-party device provider), determine whether a vendor credit should be and/or has been issued. Vendor credit module 70 can have access to device tracking database 54 and update the device statuses 44 to be Retired Vendor Credit, when applicable, and/or add to and/or modify other relevant information in device tracking database 54 depending upon inventory information 57. This information can be any information associated with the device and/or the retirement and/or vendor credit of the device. Vendor credit module 70 can compare the pending device status 44 (as determined to be Retired Vendor Credit) to the current device status 44 as listed in device tracking database 54 to determine if the status change is an allowable status change, a prohibited status change, or an unusual statue change and make updates, prevent updates, and/or generate alerts as necessary. Further, vendor credit module 70 can be configured to calculate and/or otherwise determine the amount of vendor credit owed client 12 and, for example, credit that amount to client 12 and/or otherwise note that amount for subsequent use/application. Vendor credit module 70 can have other configurations, capabilities, and/or functions than those expressly described herein, including those described with regards to the sub-process in FIG. 11.

Figure 12:
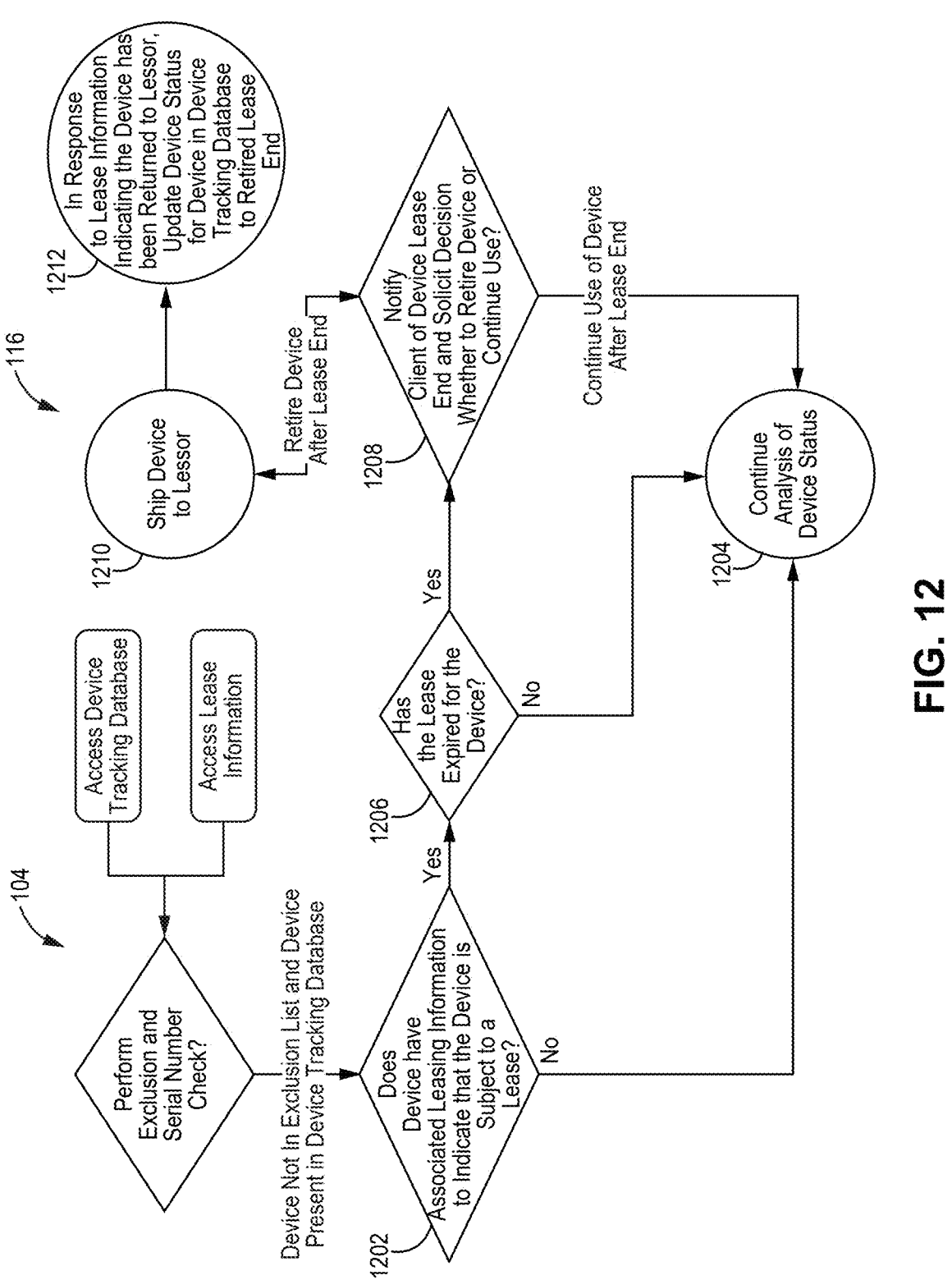
FIG. 12 is an example sub-process for determining the device statuses with regards to devices that may be associated with a lease.

Lease analysis module 72 can be configured, for example, to perform the sub-process shown in FIG. 12 for determining whether devices are to be retired due to the lease expiring/ending, for identifying warranty information regarding each relevant device, and/or for adding to and/or updating/modifying the device statuses 44 and/or other relevant information in device tracking database 54 (and/or any dashboards 60A and/or 60B regarding lease and warranty information). Lease analysis module 72 can, depending lease information 39 having information regarding any leases and/or warranties on the devices, identify whether a lease on a device has expired and, for example, automatically begin the process of retiring the device. This process can include alerting client 12 of the expiring or expired lease, sending a return label to client 12 to aid client 12 in returning the device to lessor 15 and/or tracking service provider 10, and (if returned to tracking service provider 10) send the device to lessor 15 and/or disposal vendor 16 for disposal and/or sale of the device. If the device is in stock and/or otherwise in possession by tracking service provider 10, the process can include sending the device to lessor 15 and/or disposal vendor 16 (or performing other retirement processes). The process can additionally include providing a different device to client 12 to replace the device. Lease analysis module 72 can generate an alert regarding devices on which the lease and/or warranty is ending soon and/or has already ended as well as solicit a decision from client 12 as to whether client 12 desires to retire the device and/or continue use of the device after the lease and/or warranty has expired/ended. Moreover, lease end module 72 can determine pending device statuses 44 depending upon lease information 39 from lessor 15 (e.g., that lessor 15 has received the device upon which the lease has ended such that the pending device status 44 is Retired Lease End) and compare the pending device statuses 44 to the current device statuses 44 listed in device tracking database to determine if the status change is an allowable status change, a prohibited status change, or an unusual status change and make updates, prevent updates, and/or generate alerts if necessary. In one example, lease end module 72 can work in conjunction with other modules, such as shipping module 68, to track the device as the device is returned to lessor 15. Lease analysis module 72 can access, receive, and/or otherwise use lease information 39 via any methods described herein, including accessing lease and warranty information as set out in client device database 34 and/or in inventory information 57 from provider ERP 22. Lease analysis module 72 can have other configurations, capabilities, and/or functions than those described herein, including those described with regards to the sub-process in FIG. 12.

Figure 13:
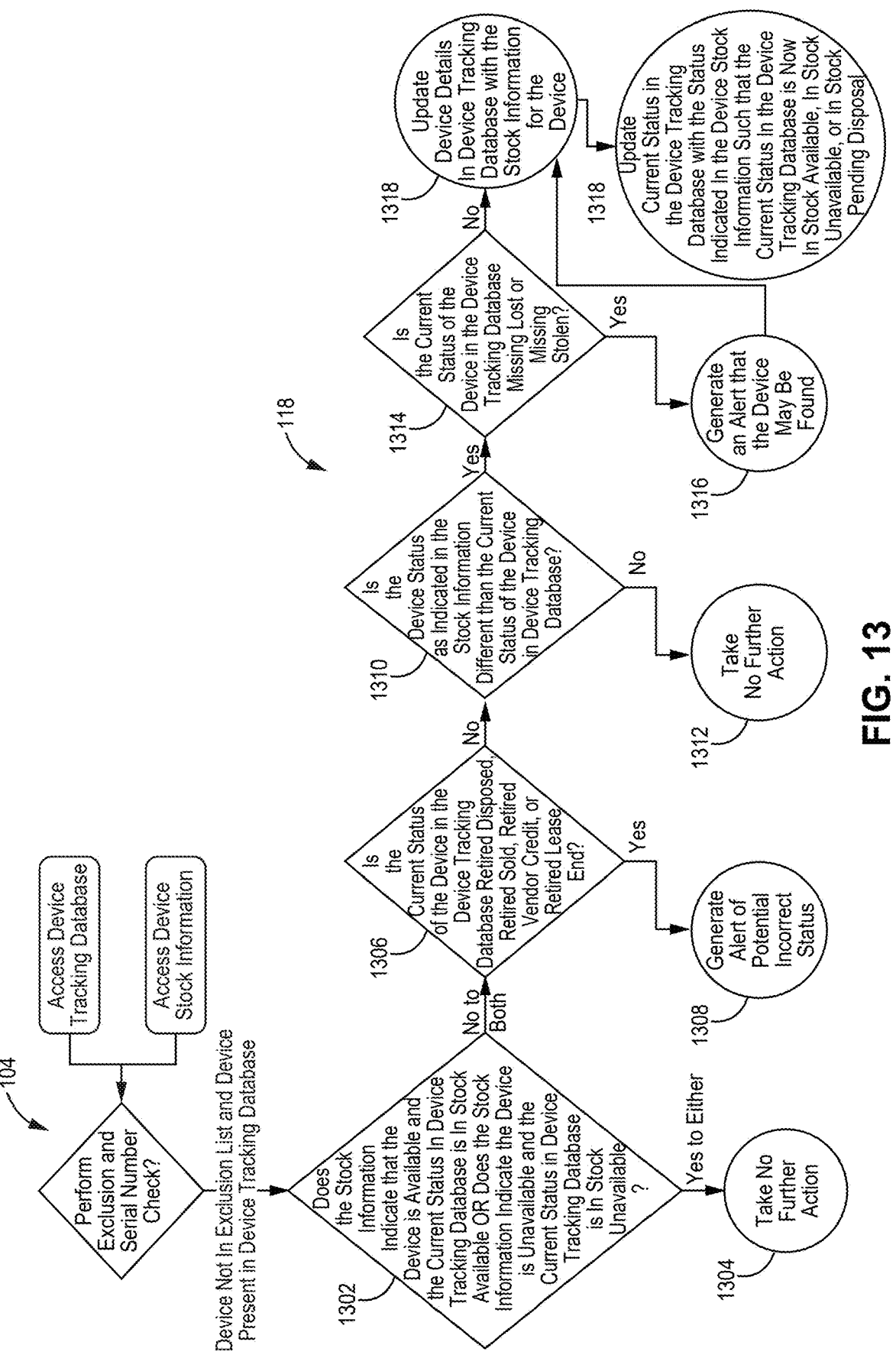
FIG. 13 is an example sub-process for determining the device statuses with regards to devices that are in stock and/or within the possession of the tracking service provider or another vendor.

Stock module 74 can be configured, for example, to perform a portion of or all of the sub-process shown in FIG. 13 for determining whether the device has a device status 44 of In Stock Available, In Stock Unavailable, and/or In Stock Pending Disposal and/or whether a device that was previously Missing Lost or Missing Stolen has been found. These determinations by stock module 74 can be dependent upon, for example, inventory information 57, client information 32, and/or information from a third-party device provider and/or another source. As with any of the other modules of system 20, stock module 72 can be configured to perform the device status 44 determinations for only those devices listed as in stock, for all devices listed in device tracking database 54, and/or for any other devices of client 12. Stock module 74 can be configured to determine and/or identify the pending device status 44 as indicated in inventory information 57 regarding device stock information. Stock module 74 can compare the pending device status 44 to the current device status 44 as listed in device tracking database 54 to determine if the status change is an allowable status change, a prohibited status change, or an unusual status change and make updates, prevent updates, and/or generate alerts if necessary. Moreover, stock module 74 can be configured to update/modify device statuses 44 and/or any relevant information in device tracking database 54. Stock module 72 can have other configurations, capabilities, and/or functions than those described herein, including those described with regards to the sub-process in FIG. 13.

Figure 15:
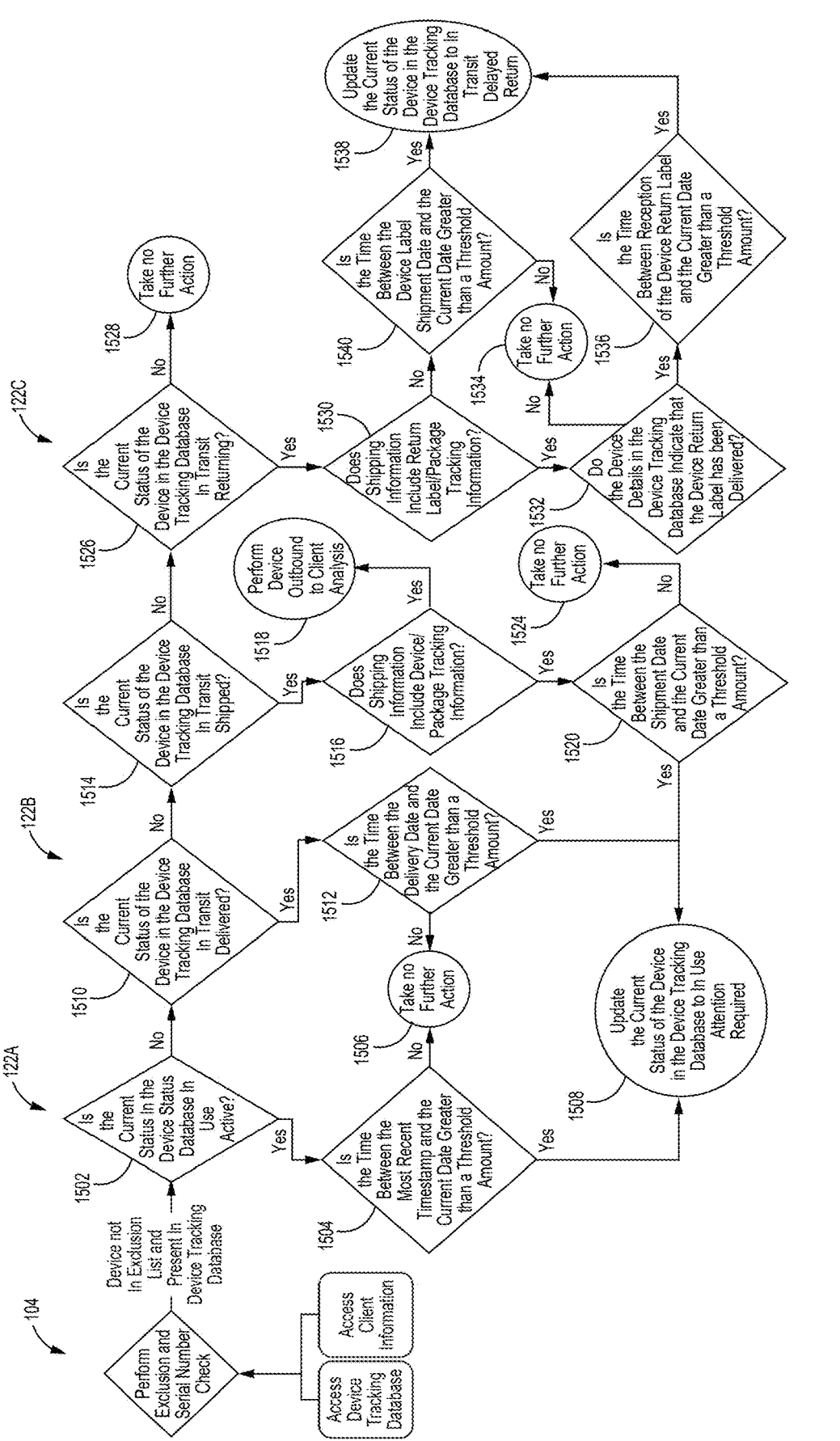
FIG. 15 is an example sub-process for determining the device statuses with regards to devices that may not be in use, may be delayed in being shipped to or returned from the client, and/or may experience other situations of nonuse.

Device aging module 76 can be configured, for example, to perform a portion of or all of the sub-process shown in FIG. 15 for determining whether the device has a device status of In Use Attention Required, In Transit Exception, In Transit Delayed Return, and/or other device statuses 44. As detailed above, device aging module 76 can work in conjunction with active analysis module 65 to determine if an amount of time from a timestamp of connectivity in device connection state 32C to the current date is greater than a threshold amount. Device aging module 76 can evaluate whether the amount of time that has passed from the current date to the date of the most recent update of the device status 44 (and/or a reconfirmation of the device status) is greater than a threshold amount of time. If greater than the specified threshold amount of time, device aging module 76 can determine that the device is not being used, is delayed in shipping to client 12 and/or from client 12 to tracking service provider 10 (or a third-party device provider), and/or is experiencing another issue.

In a first example, device aging module 76 can be configured to, depending on device connection state 32C of client information 32, determine if the device status 44 is In Use Attention Required. For a device with a current device status 44 of In Use Active in device tracking database 54, device aging module 76 (and/or active analysis module 65) can compare the current date/time (e.g., the time at which device aging module 76 performs the determination) to the most recent timestamp as set out in device connection state 32C. If that amount of time is greater than a threshold amount, such as thirty days, device aging module 76 (and/or active analysis module 65) can determine that the device has an issue and thus can update device status 44 in device tracking database 54 to be In Use Attention Required. Device aging module 76 can also generate an alert to notify provider 10 and/or client 12 that the device has not been used for an extended period of time. If the amount of time from the current date/time to the most recent timestamp is less than the threshold amount, such as thirty days, device aging module 76 (and/or active analysis module 65) can determine that the device is still In Use Active and take no further action regarding the device status 44 as listed in device tracking database 54. These threshold amounts can be any amounts of time as defined by client 12.

In a second example, device aging module 76 can be configured to, depending on shipping information 38, determine if device status 44 is In Use Attention Required. For a device with a current device status 44 of In Transit Delivered in device tracking database 54, device aging module 76 can compare the current date/time (e.g., the time at which the device aging module 76 performs the determination) to the delivered date as set out in shipping information 38. If that amount of time is greater than a threshold amount, such as seven days, device aging module 76 can determine that the device was delivered to client 12 but has yet to be actively used by client 12 and thus update device status 44 in device tracking database 54 to be In Use Attention Required. Device aging module 76 can also generate an alert to notify provider 10 and/or client 12 that the device has not been used since being delivered to client 12. If the amount of time from the current date/time to the delivered date is less than the threshold amount, such as seven days, device aging module 76 can give client 12 more time to actively use the device and take no further action regarding the device status 44 as listed in device tracking database 54 (so thus device status 44 remains as In Transit Delivered). This threshold amount can be any amount of time as defined by client 12.

In a third example, device aging module 76 can be configured to, depending on shipping information 38, determine if device status 44 is In Transit Exception. For a device with a current device status 44 of In Transit Shipped in device tracking database 54 and the shipping information 38 does not include package tracking information/capabilities (which can be indicated in device tracking database 54), device aging module 76 can compare the current date/time (e.g., the time at which the device aging module 76 performs the determination) to the shipping date as set out in shipping information 38. If that amount of time is greater than a threshold amount, such as five days for priority, next-day, or two-day shipping and ten days for other shipping methods, device aging module 76 can determine that shipment of the device has been delayed and/or otherwise experienced an abnormal shipping situation and thus update device status 44 in device tracking database 54 to be In Transit Exception. Device aging module 76 can also generate an alert to notify provider 10 and/or client 12 that shipping of the device is experiencing delays/issues. If the amount of time from the current date/time to the shipping date is less than the threshold amount, device aging module 76 can give shipping company 14 more time to complete shipment of the device and thus can take no further action regarding the device status 44 as listed in device tracking database 54 (so thus device status 44 remains as In Transit Shipped). These threshold amounts can be any amounts of time as defined by client 12.

In a fourth example, device aging module 76 can be configured to, depending on shipping information 38, determine if device status 44 is In Transit Delayed Return. For a device that is intended to be returned by client 12 to tracking service provider 10 (and/or another third-party device provider) such that the device has a device status in device tracking database 54 of In Transit Returning and the shipping information 38 indicates that the device return label has been delivered to client 12, device aging module 76 can compare the current date/time (e.g., the time at which the device aging module 76 performs the determination) to the delivered date of the device return label as set out in shipping information 38. If that amount of time is greater than a threshold amount, such as seven days, device aging module 76 can determine that client 12 has yet provide the device to shipping company 14 for return to tracking service provider 10 (and/or another third-party provider). Device aging module 76 can update device status 44 in device tracking database 54 to be In Transit Delayed Return and/or generate an alert to notify provider 10 and/or client 12 that client 12 has yet to begin the return of the device. If the amount of time from the current date/time to the delivered date of the device return label is less than the threshold amount, device aging module 76 can give client 12 more time to provide the device to shipping company 14 and thus take no further action regarding the device status 44 as listed in device tracking database 54 (so thus device status 44 remains as In Transit Returning). This threshold amount can be any amount of time as defined by client 12. This example/ capability of device aging module 76 can be configured to accommodate the situation in which the device return label does not have corresponding tracking information such that shipping information 38 does not indicate that the device return label has been delivered. In this example/situation, the comparison can be from the current date/time to the shipping date/time of the device return label and the threshold amount of time can be, for example, twelve days if the shipping method for the return label is priority, next-day, or two-day shipping (the seven day grace period for client 12 to get the device to shipping company 14 plus the five day allowance for the priority, next-day, or two-day shipment) and seven-teen days for other shipping methods (the seven day grace period for client 12 to get the device to shipping company 14 plus the ten day allowance for other shipping methods).

Additionally, device aging module 76 can compare the pending device status 44 as determined by device aging module 76 to the current device status 44 as listed in device tracking database 44 to determine if the status change is an allowable status change, a prohibited status change, or an unusual status change and make updates, prevent updates, and/or generate alerts if necessary. Moreover, device aging module 76 can be configured to update/modify device statuses 44 and/or any relevant information in device tracking database 54. Further, device aging module 76 can be configured to work in conjunction with any of the other modules of system 20, such as active analysis module 65. Device aging module 76 can have other configurations, capabilities, and/or functions than those described herein, including those described with regards to the sub-process in FIG. 15.

Normalization module 78 can be configured, for example, to perform device model name and model description nor-malization to ensure the device information as included in device tracking database 54 and/or device status information 28 has a model name and/or model description that is preferred by client 12. In reporting device status information 28 to client 12, the client may have specific device model name preferences to increase readability and/or understand-ability (and/or to match current client systems). While this information can be populated from the device manufacturer, the device provider (e.g., tracking service provider 10), and/or from other locations, the model name is often altered such that the exact same electronic product/device may have dozens of different names. For example, an Apple MacBook may have dozens or hundreds of model names as designated by the manufacturer (that can include the specifications of the product, the size of the product, and/or other informa-tion). However, client 12 may desire, for understandability and readability, that all respective versions/models of the Apple MacBook be designated to have a model name of Apple MacBook Pro (when applicable) or Apple MacBook Air (when applicable) instead of model names that can include other descriptive information (e.g., "MacBook Pro 2019 13.3 Inch Touch Bar 1.7 GHZ 16 GB 512 GB SSD 2×Thuderbolt 2 Space Gray"). In another example, the device model name may not even indicate what type of electronic product the device is (e.g., "HP EX360830G11 U7-165U13"). Thus, normalization module 78 can greatly increase the understanding and readability of device status information 28 to help client 12 make more accurate deci-sions regarding the devices. Normalization module 78 can be configured to perform one or more phases (described with regards to FIGS. 16A-16D as phases 1-9) to generate/replace the model name with a normalized model name for each device.

The determination/creation of the normalized model name (and/or the normalized model description) by normal-ization module 78 can be based upon normalization override list 59A, product content database 59B, and/or other external information 58 from other sources. For example, the deter-mination/creation of the normalized model name by nor-malization module 78 can be based upon the client model name from client information 32 (from client 12) and the current provider part number, current manufacturer part number, the previous provider part numbers, and/or the previous manufacturer part numbers from, for example, inventory information 57 (from provider ERP 22). However, this information (e.g., client model name, provider part numbers, manufacturer part numbers) may be in device tracking database 54 and associated with each device (e.g., that information is added to device tracking database 54 upon access/reception of client information 32, inventory information 57, etc. by system 20).

Normalization module 78 can be configured to access, request, receive, and/or otherwise obtain the necessary external information 58 via any communication methods, including those methods described in this disclosure. Addi-tionally, normalization module 78 can be configured to perform information pulls and add that information to device tracking database 54 automatically in response to, for example, performance of any of the steps of the sub-processes shown in FIGS. 16A-16D. For example, if the respective phase/step/sub-process requires the use of the previous provider part numbers, normalization module 78 (e.g., in conjunction with communication module 8) can be configured to access provider ERP 22 to obtain the previous provider part numbers. Normalization module 78 can then include that information for the respective device in device tracking database 54 for later reference/use. Normalization module 78 can be configured to perform the device model normalization analysis automatically for any number of devices concurrently and/or over a short period of time. For example, normalization module 78 is configured to perform the analysis daily on all devices in device tracking database 54. In another example, normalization module 78 is config-ured to perform the analysis before device status information 28 is provided to client 12, so if device status information 28 is provided to client 12 once per week, normalization module 78 can be configured to perform the analysis at least one per week.

Normalization module 78 and/or user interface 60 can be configured to allow an operator/user (and/or others) to edit normalization override list 59A and/or product content data-base 59B. For example, a salesperson and/or others that work closely with client 12 may have the ability to modify normalization override list 59A to add/modify the normal-ized model names and/or normalized model descriptions to match/meet the preferences of client 12. Similarly, normal-ization module 78 can be configured to allow for product content database 59B to be updated, modified, and/or replaced with product information from any designated source, such as product specification databases, webpages, etc. on the internet. Normalization module 78 can have other configurations, capabilities, and/or functions than those described herein, including those described with regards to the sub-processes in FIGS. 16A-16D.

Communication module 80 can be configured to, for example, allow for communication between device tracking system 20 and any external information sources, such as client 12, shipping company 14, disposal vendor 16, and/or provider ERP 22. Communication module 80 can be configured to allow system 20 to access, obtain, receive, retrieve, and/or otherwise use external information 58, such as client information 32, shipping information 38, disposal details 42, inventory information 57, and/or any other external information 58. Communication module 80 can work in conjunction with any of the other components/modules of system 20. Communication module 80 can include and/or use any of the communication methods/components described throughout this disclosure, such as an API that requests external information 58, configuration of an endpoint and/or another connection node for external information sources to allow for direct and/or automatic electronic communication therebetween, and/or other electronic/digital communication methods, such as the internet. In another example, communication module 80 can pull information from external information sources, set up processes for allowing external information sources to push information to system 20, set up processes for allowing external information sources to format the information to allow for export to system 20, and/or other methods.

Additionally and/or alternatively, communication module 80 can allow for external information sources to email information to system 20, and communication module 20 can be configured to automatically parse the information in the emails and extract the relevant external information 58 that can then be used by system 20 to perform the tasks described herein (such as determinations of device statuses 44). In this example, communication module 80 can have a designated email address to which external sources can send information that is then automatically parsed and/or extracted for use by system 20. Communication module 80 can receive external information 58 via similar methods to email, such as via an electronic messaging system (that designates communication module 80 and/or system 20 generally as the recipient).

Similarly, communication module 80 can be configured to save, organize, and/or reconfigure any external information 58 (such as information received in an email) to storage media 52, device tracking database 54, and/or other locations. Communication module 80 can work in conjunction with any components of system 20 to update device statuses in device tracking database 54 dependent upon an external information 58 accessed, received, used, etc. by communication module 80. Communication module 80 can also be configured to generate alerts in response to, for example, the determination/identification of prohibited status changes and/or unusual status changes. The alerts can be directed to tracking service provider 10, client 12, one or multiple users/operators of system 20, and/or others as designated/desired.

Figure 17:
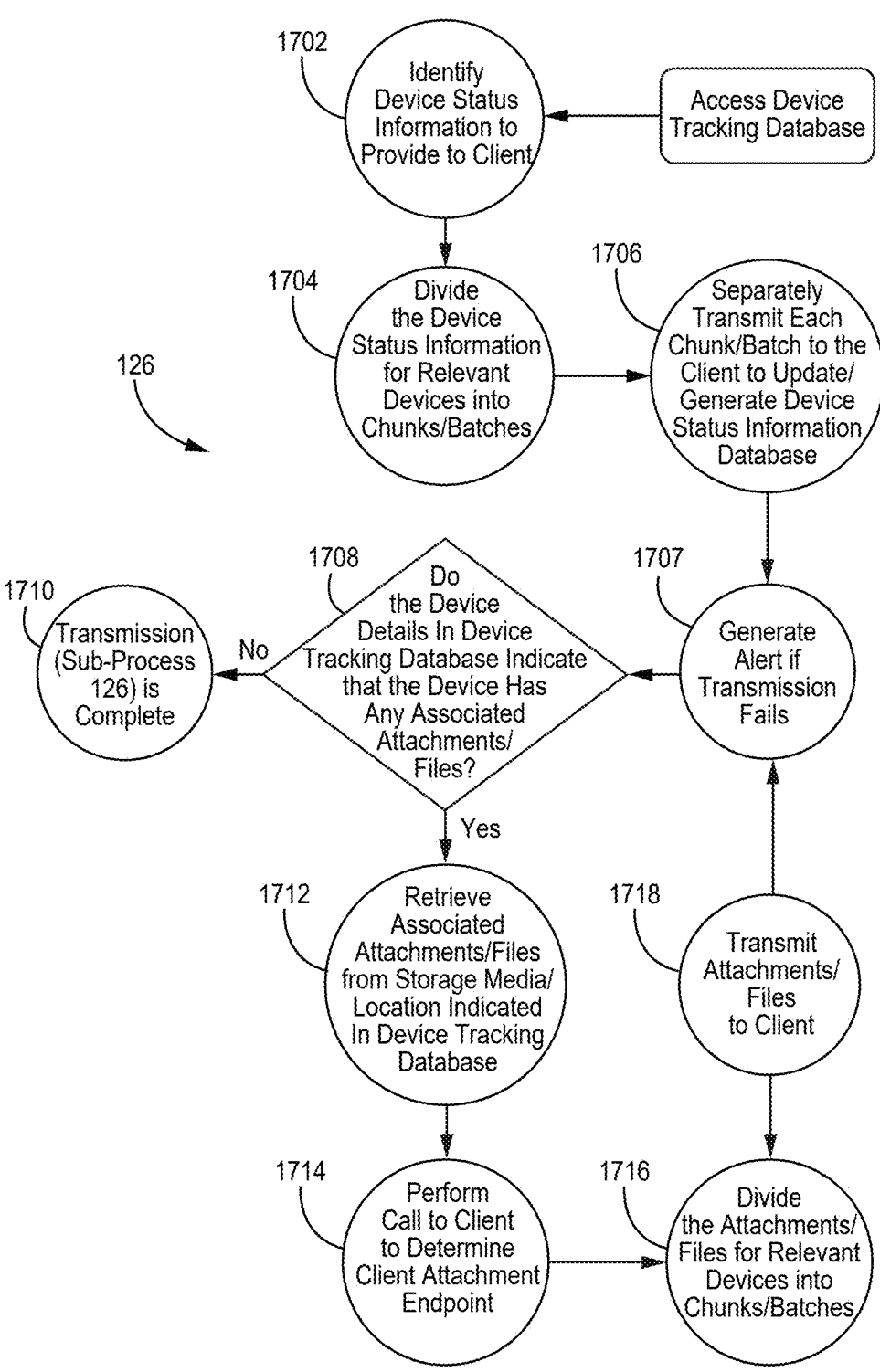
FIG. 17 is an example sub-process for providing and/or otherwise allowing access to the device statuses and related information by the client.

Transmission module 82 can be configured, for example, to perform the sub-process shown in FIG. 17 for providing device status information 28 and/or attachments/files 30 to client 12. Transmission module 82 can have access to device tracking database 54 and can identify the device statuses 44 and associated information that are to be included in device status information 28 provided to client 12. In one example, transmission module 82 can provide all device statuses 44 and associated information as set out in device tracking database 54 to client 12. In another example, transmission module 82 can provide only the device statuses 44 and associated information for which the device status 44 has changed since the last time device status information 28 was provided to client 12. In a third example, transmission module 82 can provide another subset of device status information 28. Transmission module 82 can be configured to determine an electronic/digital location to which the device status information 28 is provided and/or determine a communication method by which transmission module 82 provides device status information 28 to client 12. In one example, transmission module 82 can send device status information 28 (and/or attachments/files 30) to client 12 via email. This electronic transmission can include the device status information 28 in the body of the email, can include the device status information 28 and/or attachments/files 30 as attachments to the email, and/or can include the device status information 28 and/or attachments/files 30 via other methods, such as a link to allow access to the information as stored/located at another electronic/digital location. In another example, transmission module 28 can provide access to device status information 28 and/or attachments/files 30 via a link, login, and/or other access mode. Further, transmission module 82 can provide access to device status information 44 and/or other information by client 12 via user interface 60.

In providing device status information 28 to client 12, transmission module 82 can be configured to divide device status information 28 into discrete batches/chunks (with each batch/chunk including device status information and associated information for multiple devices) and provide the batches in separate transmissions/communications to client 12. Similarly, transmission module can be configured to divide attachments/files 30 into discrete batches/chunks (with each batch/chunk including attachments/files 30 for multiple devices) and provide the batches in separate transmission/communications to client 12 either along with the associated device status information 28 and/or in communications separate from the device status information 28. The batches/chunks can include, for example, device status information 28, attachments/files 30, and/or other relevant information with regards to any number of devices, such as fifty devices. Transmission module 82 can automatically generate the batches depending on, for example, the available transmission size, the size of the device status information 28 and/or attachments/files 30, and/or other factors. Further, transmission module 82 can be configured to automatically transmit/communicate the desired information to client 12 in response to, for example, the completion of the determinations of device statuses 44 by the other components of system 20. In other configurations, transmission module 82 can transmit the desired information in response to other events, such as according to a transmission schedule (at designated and/or periodic intervals), as requested by client 12, and/or upon the completion of other tasks. Transmission module 82 can include other capabilities, such as the ability to generate an alert if one, multiple, or all transmissions/communications fail and/or change the designation location(s) of the transmissions/communications as desired and/or specified by client 12. Transmission module 82 can have other configurations, capabilities, and/or functions than those described herein, including those described with regards to the sub-process in FIG. 17.

Figure 4:
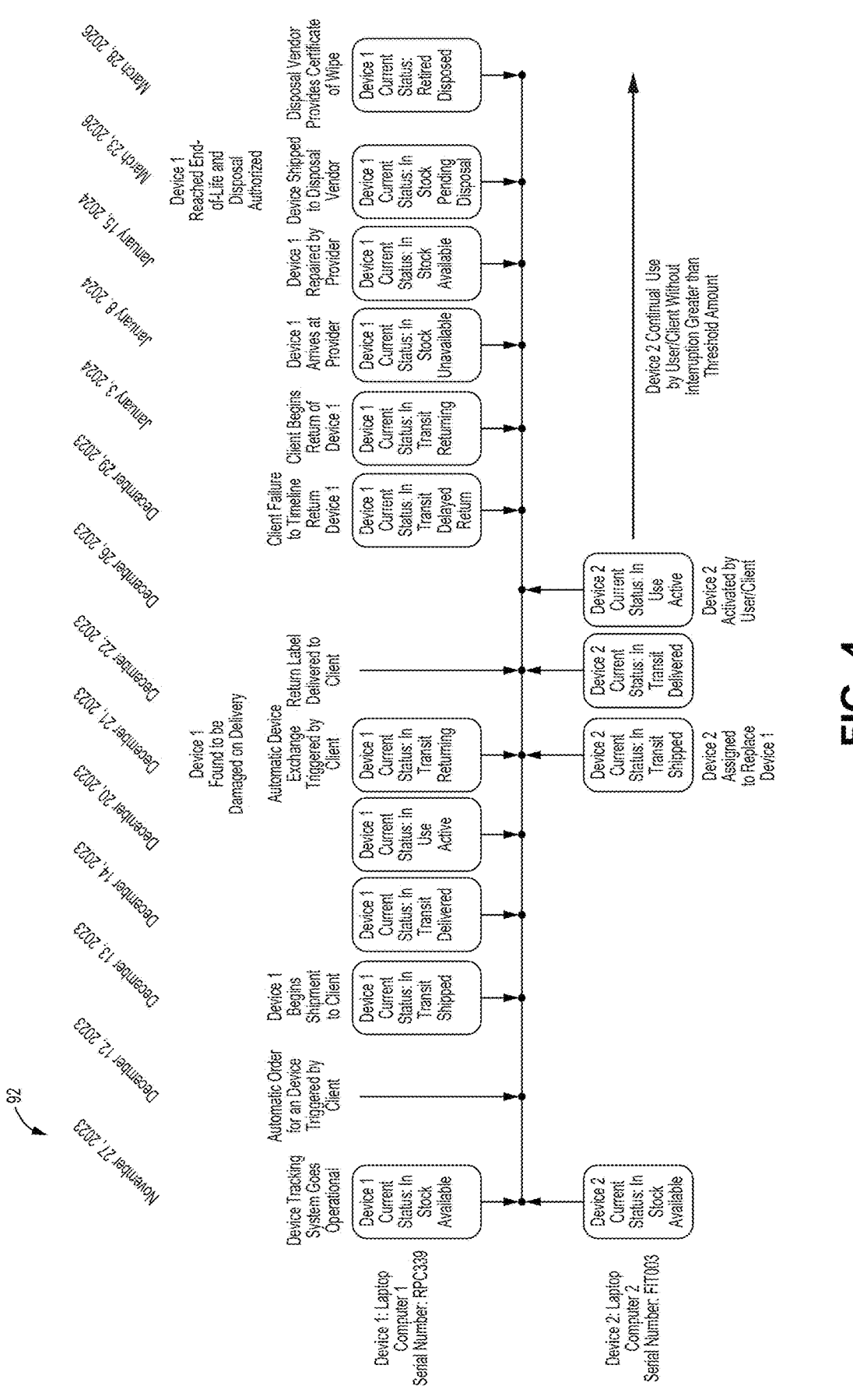
FIG. 4 is an example device status tracking timeline for two devices.

FIG. 4 is an example timeline 92 showing two devices having changing/updating device statuses 44 as the two devices are designated for use by client 12, used by client 12, returned to tracking service provider 10, put back into inventory/stock, and/or disposed by disposal vendor 16. Timeline 92 is shown and described herein to show an example of how device tracking system 20 and/or the processes/sub-processes described herein function to determine/track the device statuses 44 of example device 1 (laptop computer 1 having a serial number of RPC339) and example device 2 (laptop computer 2 having a serial number of FIT003). This timeline 92 is presented only as an example, and the configurations, capabilities, and/or functions of system 20 and/or the processes of FIG. 5 can be in addition to and/or different from those shown and disclosed with regards to timeline 92. Further, while described with regards to tracking service provider 10, client 12, and device tracking system 20, timeline 92 can be applicable to any systems for tracking the statuses of devices.

Timeline 92 begins when device tracking system 20 goes operational for the client that owns, leases, and/or otherwise controls device 1 and device 2, which in this example is Nov. 27, 2023. Alternatively, timeline 92 can begin when device 1 and device 2 are added into device tracking system 20. At this time, device 1 and device 2 are determined by stock module 74 of system 20, depending on inventory information 57 from provider ERP 22, as currently having device statuses 44 of In Stock Available, meaning that the devices are in the possession of tracking service provider 10 or another third-party device provider and are ready and waiting to be sent out to client 12 for use. Devices 1 and 2 can be in inventory designated solely for client 12 with the desired, specified software programs preconfigured on the devices.

Next, client 12 places an order/request for a laptop computer to be delivered to client 12 (e.g., an employee of client 12) on Dec. 12, 2023. An ordering platform can be used to accept the order/request and/or designate device 1 as a product that can fulfill the order/request. In another example, client 12 can place the order/request via an email, a phone call, and/or other methods. In this example, the order/request is indicated in provider ERP 22.

In response to the order/request, tracking service provider 10 and/or another third-party device provider prepares, packages, and provides device 1 to shipping company 14 on Dec. 13, 2023. Upon receipt of device 1 by shipping company 14, device tracking system 20 (e.g., shipping module 68) accesses/receiving shipping information 38 indicating that device 1 is in the possession of shipping company 14 and is in transit to client 12. Thus, shipping module 68 of system 20 determines that device status 44 of device 1 is In Transit Shipped and updates the device status 44 in device tracking database 54 accordingly (because the status change from In Stock Available to In Transit Shipped is an allowable status change).

Next, shipping information 38 from shipping company 14 indicates that device 1 has been delivered to client 12. This shipping information 38 is accessed/received on the same day as delivery, Dec. 14, 2023, and shipping module 68 of system 20 updates device status 44 for device 1 in device tracking database 54 to be In Transit Delivered to identify that device 1 is now in the possession of client 12 (because the status change from In Transit Shipped to In Transit Delivered is an allowable status change).

Six days after device 1 was delivered to client 12, client 12 connects device 1 to, for example, client UEM/MDM 26 such that device 1 provides/establishes device connection state 32C having a timestamp of Dec. 20, 2023. The device connection state 32C of device 1 is accessed/received by system 20 and, depending upon that information, active analysis module 65 determines that device 1 now has a device status 44 of In Use Active because client 12 is now using device 1 to at least connect to client UEM/MDM 26 (and because the status change from In Transit Delivered to In Use Active is an allowable status change).

The next day, Dec. 21, 2023, client 12 reports that device 1 is damaged and an automatic device exchange is triggered by client 12. In another configuration, client 12 can contact tracking service provider 10 or another third-party device provider regarding device 1 being damaged, and provider 10 can initiate a return of device 1 and an order/request for a replacement device. In the example timeline 92, the replacement device is device 2. Upon the report/information from client 12 to system 20 (in the form of client information 32) that device 1 is damaged, device tracking system 20 (e.g., shipping module 68) determines that device 1 is to be returned to tracking service provider 10 and updates device status 44 for device 1 in device tracking database 54 to be In Transit Returning (because the status change from In Use Active to In Transit Returning is an allowable status change). Further, device tracking system 20 can be configured to automatically generate and provide a return label to client 12 to aid client 12 in returning device 1 to provider 10. The return label can be provided to client 12 via a variety of methods, including via an email to client 12, providing the return label in a package shipped and delivered to client 12 (with the package being configured for device 1 to contain device 1 on its return trip back to provider 10), and/or via other methods. In example timeline 92, the return label for device 1 is provided in the same package as replacement device 2. Thus, upon delivery of device 2, the return label for device 1 is also delivered. Such a situation can be noted in device tracking database 54 such that system 20 can update device status 44 for device 1 upon the reception of device 2 by client 12.

In response to the order/request for a replacement laptop computer, device 2 is prepared, packaged, and provided to shipping company 14 to ship to client 12. Similar to device 1 above, upon receipt of device 2 by shipping company 14, device tracking system 20 (e.g., shipping module 68) accesses/receiving shipping information 38 indicating that device 2 is in the possession of shipping company 14 and is in transit to client 12. Thus, shipping module 68 determines that device status 44 of device 2 is In Transit Shipped and updates the device status 44 in device tracking database 54 as such (because the status change from In Stock Available to In Transit Shipped is an allowable status change).

The next day, Dec. 22, 2023, shipping information 38 from shipping company 14 indicates that device 2 has been delivered to client 12. This shipping information 38 is accessed/received on the same day as delivery, Dec. 22, 2023, and system 20 (e.g., shipping module 68) updates device status 44 for device 2 in device tracking database 54 to be In Transit Delivered to identify that device 2 is now in the possession of client 12 (because the status change from In Transit Shipped to In Transit Delivered is an allowable status change). Either with separate shipping information 38 (e.g., a separate tracking number) and/or the same information as with device 2, the return label for device 1 is indicated to be delivered. Since the delivery is only of the return label and device 1 is still in the possession of client 12, the return label being delivered to client 12 does not change the device status 44 for device 1. However, the details regarding the delivery of the return label to client 12, such as the delivery date of the return label, are added to device tracking database 54 for device 1.

Four days later, on Dec. 26, 2023, client 12 connects device 2 to, for example, client UEM/MDM 26 such that device 2 provides/establishes device connection state 32C having a most recent timestamp of Dec. 26, 2023. The device connection state 32C of device 2 is accessed/received by system 20 and, depending upon that information, active analysis module 65 of system 20 determines that device 2 now has a device status 44 of In Use Active because client 12 is now using device 2 to at least connect to client UEM/MDM 26 (because the status change from In Transit Delivered to In Use Active is an allowable status change). In example timeline 92, device 2 functions as expected for client 12 and is In Use Active for the remainder of timeline 92. Thus, device 2 connects to client UEM/MDM 26 at least periodically such that the most recent timestamp of device connection state 32C for device 2 as compared to the current time (e.g., the time of the determinations of device statuses 44 for device 2) is never greater than the threshold amount of time (e.g., thirty days) for device aging module 76 of system 20 to determine that device 2 is not in use. Therefore, the device status 44 of device 2 remains as In Use Active.

Seven days after the delivery of the return label for device 1 to client 12, client 12 has yet to provide device 1 to shipping company 14 for return to tracking service provider 10 (as is indicated in shipping information 38 from shipping company 14). Device aging module 76 of system 20 can compare the date of delivery of the return label to the present/current date and determine that the amount of time since the date of delivery of the return label is greater than the threshold amount of time (e.g., seven days). Thus, device aging module 76 of system 20 can update device status 44 for device 1 to be In Transit Delayed Return to reflect the delay in providing device 1 to shipping company 14 for returning device 1 back to provider 10 (because the device change from In Transit Returning to In Transit Delayed Return is an allowable status change).

Next, on Jan. 3, 2024, client 12 provides device 1 (with the return label affixed to device 1 and/or the package that device 1 is in) to shipping company 14 for shipping company 14 to ship device 1 back to provider 10 and/or another third-party device provider. The possession of device 1 by shipping company 14 is detailed in shipping information 38 accessed/received by system 20. Depending on this information, shipping module 68 of system 20 determines that the device status 44 of device 1 is In Transit Returning, which reflects that device 1 is in transit on its way back to provider 10 (because the status change from In Transit Delayed Return to In Transit Returning is an allowable status change).

Five days later, on Jan. 8, 2024, device 1 is delivered to tracking service provider 10. This can be noted in two forms of information: 1) in shipping information 38 from shipping company 14 that indicates that device 1 has been delivered to its destination (tracking service provider 10); and 2) in inventory information 57 from provider ERP 22, which indicates that device 1 is now in the possession of tracking service provider 10. Additionally, inventory information 57 from provider ERP 22 can indicate that device 1 is indeed damaged and needs repair. From inventory information 57 (and/or other types/sources of external information 58), stock module 74 of device tracking system 20 determines that device status 44 is In Stock Unavailable to reflect that (because the status change from In Transit Returning to In Stock Unavailable is an allowable status change). Device 1 is back in the possession of tracking service provider 10, but device 1 is currently unavailable to be sent back out to client 12 and instead needs to be repaired before being made available again for use by client 12.

In example timeline 92. tracking service provider 10 is capable of repairing device 1. However, in other configurations, damaged devices may be repaired by a third-party vendor. In such a situation, the devices can be tracked similarly to how the devices are tracked when shipped to client 12 and can be returned after repair similarly to how client 12 returns devices to tracking service provider 10. In example timeline 92, the repairs of device 1 are finished on January 15 and device 1 is placed back in stock. The receipt of device 1 in stock is indicated in inventory information 57 from provider ERP 22. Depending on this information, stock module 74 of device tracking system 20 determines that the device status 44 of device 1 is In Stock Available, which reflects that device 1 is ready and waiting to be sent out to client 12 for use (because the status change of In Stock Unavailable to In Stock Available is an allowable status change). As with the other device statuses 44 determined throughout timeline 92, system 20 (e.g., stock module 74) updates the device status 44 in device tracking database 54 to reflect the new/current device status 44. Device tracking database 54 can also be configured to save/store one, multiple, or all prior device statuses 44 of the devices.

In this example, device 1 does not satisfy any orders/requests by client 12, so device 1 sits in stock (with device status 44 of In Stock Available) until it reaches its end of life on Mar. 23, 2026. The end of life of device 1 can be determined using a variety of methods, such as a specified amount of time since purchase of device 1, an end of the lease on device 1, an end of the warranty period for device 1, a health score of device 1 that drops below a specified threshold health score, and/or other factors/reasons. At the end of life, device tracking database 54, tracking service provider 10, and/or another system can generate an alert or another notice. Client 12 can decide what to do with device 1 and, in this example, authorizes the disposal of device 1. The authorization can be indicated in client information 32 that is accessed/received by device tracking system 20. Depending on this information, stock module 74 of device tracking system 20 can determine that the device status 44 of In Stock Pending Disposal and update device tracking database 54 accordingly (because the status change from In Stock Available to In Stock Pending Disposal is an allowable status change). After the disposal authorization, tracking service provider 10 and/or another third-party device provider can package and ship device 1 to disposal vendor 16. During this time, the device status 44 of device 1 remains unchanged as In Stock Pending Disposal.

Five days later, on Mar. 28, 2026, device 1 has been delivered to disposal vendor 16 (at some point during the intervening five days) and is disposed of by disposal vendor 16. In example timeline 92, the disposal of device 1 includes wiping the electronic device and then taking the necessary steps to properly dispose of device 1. Disposal vendor 16 generates a certificate of wipe/recycling to record the details regarding the wipe and/or disposal of device 1. This information is set out in disposal details 42 and accessed/received by device tracking system 20 on March 28. Depending on disposal details 42 regarding device 1, device tracking system 20 (e.g., disposal module 66) determines that device status 44 of device 1 is Retired Disposed and updates device tracking database 54 accordingly (because a status change from In Stock Pending Disposal to Retired Disposed is an allowable status change). Because device 1 is now decommissioned, the device status 44 of device 1 in device tracking database 44 will remain as Retired Disposed. Thus, when the next report of device status information 44 is provided to client 12, device 1 will be denoted as being Retired Disposed and attachments/files 28 will include the certificate of wipe/recycling.

Device tracking system 20 can be configured to remove devices from device tracking database 54 and/or omit devices from device status information 28 that is provided to client 12 if the device has a device status 44 of Retired Disposed, Retired Sold, Retired Lease End, or Retired Vendor Credit and the device status 44 has already been reported/provided to client 12 in a prior device status information 28 report. Such capabilities may be desired to prevent device tracking database 54 and/or device status information 28 from having many entries of devices that have been retired/decommissioned such that the devices will never be in use again by client 12, their statuses will no longer change, and client 12 may not be interested in each device's information/status.

As described above, timeline 92 is provided as an example of system 20 tracking the movement, use, and retirement of devices of client 12. As described herein, system 20 can determine other device statuses 44 than those determined in regards to timeline 92 and can have other configurations, capabilities, and functions than those described with regards to FIG. 4.

FIG. 5 is example process 100 for tracking device statuses of multiple devices and for reporting those device statuses to client 12 in device status information 28. All steps/sub-processes of process 100 can be performed for each device, or only one or some of the steps/sub-processes of process 100 (and/or steps within each sub-process) can be performed for each device depending on the device status 44 of that device, the external information 58 available for that device, and/or other factors. In one example, one, multiple, or all steps/sub-processes of process 100 are performed subsequently for each device before process 100 is performed for another device. In another example, each step/sub-process of process 100 is performed for a portion of or all devices concurrently (or over a short amount of time, such as thirty minutes) before moving on to perform the next step/sub-process of process 100 for a portion of or all devices. One, multiple, or all steps of process 100 as shown in FIG. 5 can be described herein as being "sub-processes," such as those that are described and shown in detail with regards to FIGS. 6-17. Thus, any reference to a "step" can also be understood as being a "sub-process" and vice versa.

While process 100 is described herein as being used with regards to device tracking system 20, process 100 can be performed by any systems having any components, capabilities, configurations, and/or functionalities suitable for performing process 100. Additionally, process 100 can include other steps/sub-processes not expressly disclosed herein and/or can include performing the disclosed steps/sub-processes in any order and/or multiple times. Moreover, not all steps/sub-processes of process 100 (and/or steps within each sub-process) must be performed, and process 100 can be performed partially and/or entirely in a digital environment by and/or within, for example, the systems/components set out in this disclosure, such as device tracking system 20. FIGS. 6-17 are described below in conjunction with process 100 and FIG. 5. As such, each of FIGS. 6-17 show a separate example step/sub-process.

One, multiple, or all steps/sub-processes of process 100 (and/or steps within each sub-process) can be performed automatically as triggered by a variety of events (such as the completion of the prior step/sub-process, the determination of a device status, and the identification of a status change), can be performed concurrently (such that one, multiple, or all steps/sub-processes are performed at the same time or over a short period of time for the evaluation of device statuses for multiple devices), and/or can be performed in sequence (such that one, multiple, or all steps/sub-processes are performed in series for each device and/or for all devices). In one example, each step/sub-process is performed for all relevant devices concurrently or over a short amount of time, such as thirty minutes. Then, once the previous step/sub-process is complete, the next step/sub-process can performed for all devices concurrently or over a short amount of time. Thus, in this example, one step/sub-process is performed for all devices concurrently but the performance of process 100 from step-to-step can be in series/sequentially.

The steps/sub-processes of process 100 can include accessing any necessary information, including any type/sources of external information 58 and/or device tracking database 54. The information needed to perform the steps/sub-processes of process 100 are evident by reviewing the below disclosure.

Process 100 can include step 102, which is to access, receive, and/or otherwise obtain external information 58, device tracking database 54, and/or any other information relevant and/or necessary to the device status determinations performed by device tracking system 20. The variety of methods for performing step 102 is detailed above to access/receive external information 58 from client 12 (as client information 32), shipping company 14 (as shipping information 38), disposal vendor 16 (as disposal details 42), and from provider ERP 22 (as inventory information 57). Device tracking database 54 can be saved in, for example, storage media 52 and can be accessed, received, and/or otherwise used by any systems performing process 100. Any other information relevant and/or necessary to the performance of process 100 can be accessed via any communication methods, including via digital/electronic communication.

Sub-process 104 of process 100 includes performing an exclusion evaluation and/or device identification (e.g., serial number) check. Sub-process 104 can be performed, for example, on one, multiple, or all devices found in external information 58, current exclusion list 36, and/or previous exclusion lists 56. Sub-process 104 is shown in FIG. 6, which is an example sub-process for determining whether the devices are excluded from the tracking process, are present in the tracking process (e.g., device tracking database 54), and/or, if not present, should be added to the tracking process (e.g., device tracking database 54). Sub-process 104 can be configured to be performed before the one, multiple, or all sub-processes 106-126 of process 100. In one example process, the exclusion and/or device identification evaluation/check is performed before each sub-process 106-126 to ensure the determinations in each sub-process 106-126 are performed only on those properly identified devices and/or those devices that are desired to be included in device status information 28. In another example process, a portion of or all of sub-process 104 is performed once near the beginning of process 100 and then sub-processes 106-126 are performed thereafter. While described herein as being performed by EAE module 62, sub-process 104 can be performed by any systems, components, and/or modules capable of performing the disclosed tasks.

The exclusion evaluation of sub-process 104 is performed using external information 58, such as current client exclusion list 36 from client 12 and the preceding exclusion list 56 as stored/used by device tracking system 20. Additionally and/or alternatively, device tracking database 54 may be used, which can include information regarding the devices that were previously listed as being excluded from the device tracking process. The first step of sub-process 104 is step 602, which is determining whether the device is on current exclusion list 36. If the device is on current exclusion list 36, then the exclusion evaluation includes step 604, which is to assign or keep the device in a hidden excluded state in device tracking database 54 and exclude the device from further analysis, including excluding the device from inclusion in device status information 28. If the device is not on current exclusion list 36, then the exclusion evaluation includes step 606, which is determining if the device is on the previous exclusion list 56 as found in, for example, storage media 52 and/or as detailed in device tracking database 54 (which can include that the device was in a hidden excluded state so thus was on the previous exclusion list 56). If the device is/was not on the previous exclusion list 56 (and/or was not previously in a hidden excluded state in device tracking database 54), sub-process 104 proceeds to step 608, which is to make no change to the device exclusion state (thus the device continues to be included in the device status evaluation) and proceed with sub-process 104 to perform the device ID check.

If the device is/was on the previous exclusion list 56 (and/or was previously in a hidden excluded state in device tracking database 54), sub-process 104 proceeds to step 610, which is to remove the hidden excluded state from the device and change the device status of the device in device tracking database 54 to be the preceding device status. For example, the device previously had an In Stock Available device status but was then put in a hidden excluded state (i.e., included in/on the exclusion list 56 as desired by client 12) and was removed from the subsequent device status determinations. Thereafter, the device was removed from the current exclusion list 36 because client 12 desires to have the device status determined and included in device status information 28 again. Because the device is not on the current exclusion list 36 but was on the preceding exclusion list 56, sub-process 104 includes assigning/reinstating the device status for device as In Stock Available. Then, process 100 is performed for that device to determine whether the device status is still In Stock Available or if the device has a different device status. Step 610 provides for a reentrance device status for the device so that process 100 can be performed to then establish the proper device status. After step 610, sub-process 104 proceeds to the device identification check, if necessary/desired.

Step 612 of sub-process 104 includes comparing the devices in external information 58 to the devices in device tracking database 54 via the serial numbers and/or any other identification information for each device. This ensures that the devices in external information 58 are present in device tracking database 54 so that system 20 is prepared to determine the device statuses in subsequent steps/sub-processes. If the device in external information 58 is found in device tracking database 54, sub-process 104 is completed and proceeds to step 614, which is to continue process 100 to analyze/determine the device status. Thus, the device identification check ensures that the information regarding the device in external information 58 can be associated with the device in device tracking database 54 so that process 100 can continue and determine the device status.

If the device as detailed in external information 58 is not found in device tracking database 54 (i.e., the device serial number and/or other identification information in external information 58 does not match device information and/or is not present in device tracking database 54), sub-process 104 can include proceeding to step 616.

Step 616 can include determining whether the external information 58 that the device appears in is client information 32, inventory information 57, or shipping information 39. These information sources are considered by process 100 and/or system 20 to be reliable sources of information regarding new devices. Thus, if the device, which does not appear in device tracking database 54, is/comes from client information 32 (e.g., client UEM/MDM 26) or inventory information 57 (from provider ERP 22), sub-process 104 can proceed to step 618, which is to add the device to device tracking database 54 and add any information associated with the device in external information 58 to device tracking database 54. If the device first appears in shipping information 38 and is indicated in the shipping information to have been shipped (to client 12, for example), sub-process 104 can also proceed to step 618 to add the device to device tracking database 54. After step 618, the device is now included/present in device tracking database 54 for further evaluation during process 100, which is shown in sub-process 104 as step 614.

If the external information 58 that the "new" device appears in is not client information 32 or inventory information 57 or, if first appears in shipping information 38, is not indicated to be shipped (e.g., is in other shipping information 38, lease information 39, or disposal information 42), sub-process 104 proceeds to step 620, which is to generate an alert to notify an operator/user to investigate the device. In this situation, the device may be correctly identified and may be a new device that needs to be added to device tracking database 54. However, this would be unusual so an alert is generated.

As with the steps of process 100 generally, the steps of the sub-processes (e.g., steps 602-628) can be performed in a variety of orders, can be performed concurrently and/or sequentially, and/or can have other configurations not expressly described herein. Further, the sub-processes (e.g., sub-process 104-126) can include configurations in which one, multiple, or all steps (e.g., steps 602-620) are not performed and/or are performed multiple times during each performance of process 100 and/or the sub-processes.

After sub-process 104, process 100 can include sub-process 106, which is performing a lost-stolen-missing analysis to determine if the devices each have a device status of Missing Lost or Missing Stolen and/or to determine if a previously lost or stolen device is now found. Sub-process 106 is shown in FIG. 7, which is an example sub-process for determining the device status with regards to devices that may be lost, stolen, and/or found. Sub-process 106 can be performed at any time with regards to the other steps/sub-processes of process 100. However, in one example/configuration, sub-process 106 is performed before sub-processes 108-126. While described herein as being performed by LSM module 64, sub-process 106 can be performed by any systems, components, and/or modules capable of performing the disclosed tasks.

Sub-process 106 can be performed, for example, on/for one, multiple, or all devices that are found in client information 32 and/or only those devices that are indicated as being lost or stolen in client information 32. Thus, sub-process 106 can use client information 32 and/or other external information 58. Sub-process 106 can first include step 702, which is determining whether client information 32 indicates that the device is lost or stolen. However, this can be indicated in client information 32 and/or in any other type/source of external information 58. In one example, client 12 can indicate in client device database 34 that the device is lost or stolen. In another example, client 12 can provide the information/indication in an email and/or in another form. Step 702 (along with step 704 below) ensures that performance of sub-process 106 with regards to the device is applicable. Without the device being indicated as lost or stolen (or found as detailed in step 704), sub-process 106 is not applicable to the device and the determination/evaluation in sub-process 106 is quick/truncated.

If client information 32 does not indicate that the device is lost or stolen, sub-process 106 continues to step 704, which is determining whether client information 32 indicates that the device, which was previously Missing Lost or Missing Stolen, has been found. The indication in client information 32 can be explicit in that client 12 notes that the device was previously missing has now been found, or the indication can be implicit in that the device now appears in client information 32 another way, such as the device has a recent timestamp in connection state 32C and/or appears in other forms in external information 58. Step 704 can include reviewing any device in device tracking database 54 that has a device status of Missing Lost or Missing Stolen and evaluating all external information 58 to identify whether any updated/new device information for that device is present. If the device is not indicated to be found in step 704, then the LSM evaluation in sub-process 106 is not applicable (because the device is not lost, stolen, or found) and sub-process 106 includes step 706, which is to continue process 100 to evaluate/determine the device status.

If the device is determined to be found in step 704, then step 708 is performed to determine if the current status of the device in device tracking database 54 is Missing Lost or Missing Stolen. If the current status is Missing Lost or Missing Stolen (step 708) and the device is indicated as being found (step 704), then sub-process 106 includes step 710, which is continuing the evaluation/determination of the device status in process 100 because the device is no longer lost or stolen and thus a new/updated device status can be determined from external information 58. If the current status is not Missing Lost or Missing Stolen (step 708) but the device is indicated as being found (step 704), then sub-process 106 can include generating an alert (step 712) because there may be a potential error in external information 58 indicating that the device is found when the device status in device tracking database 54 does not reflect that the device was missing (either Missing Lost or Missing Stolen).

Back to step 702, if client information 32 indicates that the device is lost or stolen, sub-process 106 can include step 714, which is determining whether the current status of the device as listed in device tracking database 54 is Missing Lost or Missing Stolen. If not, the evaluation continues with step 716, which is determining if the current status of the device in device tracking database 54 is Retired Disposed, Retired Sold, Retired Vendor Credit, Retired Lease End, In Stock Available, In Stock Unavailable, or In Stock Pending Disposal. Step 714 can be a safeguard to ensure that any inconsistencies in client information 32 and/or device tracking database 54 with regards to the device are brought to the attention of an operator/user. Therefore, if the current status of the device is Retired Disposed, Retired Sold, In Stock Available, In Stock Unavailable, or In Stock Pending Disposal, sub-process 106 can include generating an alert of possible error (step 718) because the device should not be indicated as lost or stolen by client 12 if the device was previously retired or in the possession of tracking service provider 10 (so was previously Retired Disposed, Retired Sold, Retired Vendor Credit, Retired Lease End, In Stock Available, In Stock Unavailable, or In Stock Pending Disposal). Such a situation notifies the operator/user to further review client information 32 and/or device tracking database 54. Step 716 is essentially the determination of the status change and whether the status change is an allowable status change, a prohibited status change, or an unusual status change. In this case, the status change is prohibited so sub-process 106 prevents the device status change from any of Retired Disposed, Retired Sold, Retired Vendor Credit, Retired Lease End, In Stock Available, In Stock Unavailable, and In Stock Pending Disposal to Missing Lost or Missing Stolen and generates an alert in step 718.

If the current status of the device is not Retired Disposed, Retired Sold, Retired Vendor Credit, Retired Lease End, In Stock Available, In Stock Unavailable, or In Stock Pending Disposal, sub-process 106 includes step 720, which is updating the current device status in device tracking database 54 with Missing Lost or Missing Stolen as indicated in client information 32 (because this status change is an allowable status change). For the devices upon which step 720 is performed, the device status evaluation is complete and all sub-processes of process 100 may not need to be performed.

Back to step 714, if the current status of the device in device tracking database 54 is Missing Lost or Missing Stolen, sub-process 106 further includes step 722 to determine if the current status in device tracking database is the same as the device status indicated in client information 32 (i.e., is the device status in device tracking database 54 Missing Lost when client information 32 indicates that the device is lost or is the device status in device tracking database 54 Missing Stolen when the client information indicates that the device is stolen). If the status in device tracking database 54 is the same as that which is indicated in client information 32, then the device status in device tracking database 54 is correct and sub-process 106 includes step 724, which is to make no change to the device status as listed in device tracking database 54. If the status in device tracking database 54 is different than that which is indicated in client information 32 (e.g., the device status is Missing Lost and client information 32 indicates that the device is actually stolen and vice versa), then sub-process 106 proceeds to step 720 so that the device status in device tracking database 54 is updated with the status as indicated in client information 32. As described above, for the devices upon which step 720 is performed, the device status evaluation is complete and all sub-processes of process 100 may not need to be performed.

Process 100 can include sub-process 108, which is performing an activity analysis to determine whether the devices are actively in use by client 12. Sub-process 108 is shown in FIG. 8, which is an example sub-process for determining whether the device is In Use Active or, along with sub-process 122, In Use Attention Required. Sub-process 108 can be performed at any time with regards to the other steps/sub-processes of process 100. However, in one example/configuration, sub-process 108 is at least partially performed before sub-processes 110-126. While described herein as being performed by active analysis module 65, sub-process 108 can be performed by any systems, components, and/or modules capable of performing the disclosed tasks. Additionally, sub-process 108 may be performed at least partially by device aging module 76.

Sub-process 108 can be performed, for example, on/for one, multiple, or all devices that are found in and/or have a device connection state 32C in client information 32. Sub-process 108 can first include step 802, which is determining whether client information 32 includes a device connection state 32C with a digital/electronic connection timestamp indicating that the device has previously connected to client systems 24 (e.g., client UEM/MDM 26) and that the timestamp is more recent than the previous most recent timestamp for that device as listed in, for example, device tracking database 54. Step 802 is an evaluation whether the device has had any updated use/activity since the last time sub-process 108 was performed (so thus since the previous most recent timestamp was used and recorded in device tracking database 54). If the device connection state 32C (e.g., the timestamp) has not been updated (so thus is not different from the previously used most recent timestamp), sub-process 108 is not applicable for that device and proceeds to step 804, which is to continue process 100 for that device. If client information 32 includes device connection state 32C having a new timestamp (such that the device is being used for the first time) or a timestamp that is different/more recent than the previous most recent timestamp listed in, for example, device tracking database 54, sub-process 108 is applicable to the device and continues to step 806.

Step 806 can include identifying whether the current status of the device as listed in device tracking database 54 is Retired Disposed, Retired Sold, Retired Lease End, Retired Vendor Credit, In Stock Available, In Stock Unavailable, Missing Stolen, Missing Lost, In Transit Returning, or In Transit Delayed Return. If so, sub-process 108 can include step 808, which is generating an alert of a possible error because the device should not be shown as active (and thus having a recent timestamp of connection to client systems 24) if the device has been retired, is in stock (so thus has yet to be shipped to client 12), is missing (without first being determined to be found), or is in transit on its way back from client 12 to tracking service provider 10. Such a situation notifies the operator/user to further review client information 32 and/or device tracking database 32. Step 806 is essentially the determination of the status change and whether the status change is an allowable status change, a prohibited status change, or an unusual status change. In this case, the status change is prohibited so sub-process 108 prevents the device status change from any of Retired Disposed, Retired Sold, Retired Lease End, Retired Vendor Credit, In Stock Available, In Stock Unavailable, Missing Stolen, Missing Lost, In Transit Returning, and In Transit Delayed Return to In Use Active and generates an alert in step 808.

If the current status of the device is not Retired Disposed, Retired Sold, Retired Lease End, Retired Vendor Credit, In Stock Available, In Stock Unavailable, Missing Stolen, Missing Lost, In Transit Returning, or In Transit Delayed Return (so thus is an allowable status change), sub-process 108 includes step 810, which is comparing the time between the most recent timestamp in device connection state 32C of client information 32 and the current date (e.g., the time at which sub-process 108 is performed) to the threshold amount of time (e.g., thirty days). This is essentially a device aging evaluation to determine if the device has been actively used within the last, for example, thirty days so that the device use has not exceeded the threshold amount of time that is specified for the device to continue to be categorized as actively in use. If the time since the last use of the device (as reflected in the timestamp information in device connection state 32C) is greater than the threshold amount of time, sub-process 108 proceeds to step 812, which is to continue with device aging analysis/sub-process 122. If the time since the last use of the device is less than the threshold amount of time, the device is categorized as being actively in use and sub-process 108 continues to step 814.

Step 814 is a check on whether the device has sufficient health score and includes the necessary device/user details such that the device does not need repair and/or further attention. Thus, step 814 includes determining if the device health score; which can be indicated in, calculated from, or dependent upon client information 32 (such as in client device database 34); is below a threshold amount/health score as designated by client 12, tracking service provider 14, another third-party device provider, and/or any others involved in process 100. Step 814 can also include determining if the device, as listed in device tracking database 54, is missing any corresponding user information 32B that is necessary for process 100 to be performed on the device.

If either situation is present (so thus the health score is below the threshold or at least a portion of device user information 32B is missing), sub-process 108 can include assigning/updating the current status of the device in device tracking database 54 as In Use Attention Required (step 816). Because the status is In Use Attention Required, client 12 and/or others involved in process 100 can be notified that the device needs further evaluation to determine if the device should be repaired and/or retired (if the health score is too low) or if device user information 32B should be associated with the device in device tracking database 54.

If both situations are not present (so thus the health score is above the threshold and the device user information in device tracking database 54 is sufficient), sub-process 108 can include assigning/updating the current status of the device in device tracking database 54 as In Use Active (step 818). This designation reflects that the device is actively in use by client 12 and the device has no health issues. For the devices upon which steps 816 and 818 are performed, the device status evaluation is complete and all sub-processes of process 100 may not need to be performed.

Process 100 can include sub-process 110, which is performing a device disposal analysis to determine if the device is retired and/or pending disposal. Sub-process 110 is shown in FIG. 9, which is an example sub-process for determining the device statuses with regards to devices that may be disposed/sold and/or waiting disposal/sale. Sub-process 110 can be performed at any time with regards to the other steps/sub-processes of process 100. However, in one example/configuration, sub-process 110 is performed before sub-processes 112-126. While described herein as being performed by disposal module 66, sub-process 110 can be performed by any systems, components, and/or modules capable of performing the disclosed tasks.

Sub-process 110 can be performed, for example, on/for one, multiple, or all device that are found in disposal details 42 from disposal vendor 14. Sub-process 110 can include step 902, which is saving any certificates of wipe, recycling, and/or sale of the device as generated by disposal vendor 16 and provided in/along with disposal details 42. The certificates can be saved to, for example, storage media 52 and/or device tracking database 54. The certificates saved in step 902 can later be provided to client 12 in step 126 as attachments/files 30. If no certificates are generated by disposal vendor 16, than sub-process 110 may not include step 902. If sub-process 110 includes step 902 (in that disposal details 42 include certificate(s) and those certificate(s) are saved to, for example, storage media 52), sub-process 110 can include step 903.

Step 903 can include indicating, for the device in device tracking database 54, that a corresponding certificate is saved to system 20. The indication can, for example, include populating a line, box, cell, etc. in device tracking database 54 for the device detailing the date the certificate was saved, the attachment/file filename, and/or the location at which the certificate is saved so that, in sub-process 126, the certificate can be located and provided to client 12. Step 903 can include performing other tasks to associate the certificate with the corresponding device. If no certificates are included in disposal details 42 and/or otherwise obtained from disposal vendor 16, sub-process 110 may not perform steps 902 and/or 903 and can proceed to step 904.

Step 904 of sub-process 110 is comparing disposal details 42 from disposal vendor 16 for each device to the device details/information in device tracking database 54. These types/categories of disposal details are described above with regards to disposal details 42 in FIGS. 1A-1C. The device information in device tracking database 54 should be up-to-date and reflect the disposal details 42 from disposal vendor 16. If disposal details 42 for the device are the same as the device details in device tracking database 54, no further action needs to be taken (step 906) because the device status and disposal information in device tracking database 54 is up-t-date. If disposal details 42 from disposal vendor 16 are different from the corresponding device details/information in device tracking database 54, sub-process 110 can continue with step 908.

Step 908 includes identifying whether the current status of the device in device tracking database 54 is Retired Sold or Retired Disposed. If so, sub-process 110 continues with step 910, which is determining whether the disposal date for the device (as listed in disposal details 42) is further in the past than a threshold amount and determining whether the disposal details 42 do not include a certificate of wipe/recycling. If the disposal date is further in the past than the threshold amount and no certificate of wipe/recycling is provided, step 910 can include generating an alert to client 12 and/or an operator/user that disposal vendor 16 has yet to provide the proper certificate (even when giving a grace period/threshold amount of time, such as seven to ten days), which is shown as step 911. If disposal details 42 indicate that the disposal has been performed more recently than the threshold amount of time or a certificate of wipe/recycling is provided, sub-process 110 proceeds to step 906, which is to take no further action and/or update the device details/information in device tracking database 54 with any new/updated disposal detail 42 from disposal vendor 16.

Back to step 908, if the current status of the device in device tracking database 54 is not Retired Sold or Retired Disposed, step 912 is performed to determine if disposal details 42 indicate that the device has been disposed or sold. If the disposal details 42 indicate that the device has been disposed or sold, sub-process 110 can continue to steps 914 and 916. Step 914 includes updating the device details/information in device tracking database 54 with any new/updated/different details set out in disposal details 42 from disposal vendor 16, and step 916 includes updating the current status of the device in device tracking database 54 with the status as indicated in disposal details 42, which is Retired Disposed (if the device was disposed) and Retired Sold (if the device was sold).

If the disposal details 42 indicate that the device has not yet been disposed or sold in step 912, sub-process 110 can proceed to step 918, which is determining whether the current status of the device in device tracking database 54 is In Stock Pending Disposal. If so, step 920 can be performed to update the device details/information in device tracking database 54 with any new/updated details as set out in disposal details 42 and take no further action regarding the device status (so thus the device status remains as In Stock Pending Disposal). If the current status is not In Stock Pending Disposal in step 918, step 922 can be performed to update the device details/information in device tracking database 54 with any new/updated details as set out in disposal details 42 and update the current status in device tracking database 54 to In Stock Pending Disposal, which is the device status designated for the device until the device is disposed, sold, and/or otherwise retired. For the devices upon which sub-process 110 is performed (e.g., the devices that are include in disposal details 42), the device status evaluation is complete and all sub-processes of process 100 may not need to be performed.

Process 100 can include sub-process 112, which is performing a device-shipped-in-provider-ERP analysis to determine if the device that is indicated as shipped in inventory information 57 is In Stock Pending Disposal or In Transit Shipped. Sub-process 112 is shown in FIG. 10, which is an example sub-process for determining the device statuses with regards to devices that may be in transit to and/or from client 12 and/or disposal vendor 16. Sub-process 112 can be performed at any time with regards to the other steps/sub-processes of process 100. However, in one example/configuration, sub-process 112 is performed before sub-processes 114-126. While described herein as being performed by shipped ERP module 67, sub-process 112 can be performed by any systems, components, and/or modules capable of performing the disclosed tasks.

Sub-process 112 can be performed, for example, on/for one, multiple, or all devices found in inventory information 57. However, as set out in step 1001, example sub-process 112 can be limited to devices indicated in inventory information 57 to have been shipped in the most recent designated number of days, such as devices that were indicated to have been shipped in the last seven days to client 12 or another party or devices that were indicated to have been shipped to disposal vendor 16 in the last sixty days. Thus, step 1001 determines/identifies whether the device is indicated to have been shipped in the last seven days or have been shipped to disposal vendor 16 in the last sixty days. If the device is not indicated to have been shipped to client 12 or another vendor in the last seven days (or another designated number of days) or to have been shipped to disposal vendor 16 in the last sixty days (or another designated number of days), sub-process 112 proceeds to step 1004. which is to continue with process 100 to further determine/analyze the device status because sub-process 112 is not applicable to the particular device.

Sub-process 112 can include step 1002 to determine whether the current status of the device in device tracking database 54 is In Transit Shipped, In Transit Delivered, In Transit Exception, In Use Active, or In Use Attention Required. If so, sub-process 112 can proceed to step 1004, which is to continue with process 100 to further determine/analyze the device status because sub-process 112 is not applicable to the particular device. If, in step 1002, the current status is not In Transit Shipped, In Transit Delivered, In Transit Exception, In Use Active, or In Use Attention Required, sub-process 112 can continue to step 1006.

Step 1006 is determining whether the current status of the device in device tracking database 54 Retired Disposed, Retired Sold, Retired Lease End, Retired Vendor Credit, Missing Lost, Missing Stolen, In Transit Returning, or In Transit Delayed Return. If so, sub-process 112 proceeds to step 1008, which is generating an alert to notify the operator/user of a potential incorrect current status of the device in device tracking database 54 and to further review shipping information 38 and device tracking database 54.

If, in step 1006, the current status is not Retired Disposed, Retired Sold, Retired Lease End, Retired Vendor Credit, Missing Lost, Missing Stolen, In Transit Returning, or In Transit Delayed Return, sub-process 112 can include step 1010. Step 1010 includes updating the device details/information associated with the device in device tracking database 54 with the corresponding inventory information 57, which can include information regarding the shipment of the device to client 12 and/or other vendors.

Then, after step 1010, sub-process 112 can include performing step 1012, which is determining if inventory information 57 regarding the device indicates that the device is associated with disposal vendor 16. If so, step 1014 is performed to update the current status of the device in device tracking database 54 to In Stock Pending Disposal to reflect that the device is in transit to disposal vendor 16 but has yet to be disposed or sold by disposal vendor 16. If not, step 1016 is performed to update the current status in device tracking database 54 to In Transit Shipped to reflect that the device is in transit to client 12 but has yet to be delivered by shipping company 14. The determination that the device status is In Transit Shipped is allowed because the other potential device statuses are eliminated in steps 1002 and 1006 such that a device that is indicated as shipped in inventory information 57 in the last seven days (or listed as shipped to disposal vendor 16 in the last sixty days) but does not meet the requirements in steps 1002, 1006, and 1012 is thus designated as In Transit Shipped. For the devices upon which steps 1012, 1014, and/or 1016 are performed, the device status evaluation is complete and all sub-processes of process 100 may not need to be performed.

Process 100 can include sub-process 114, which is performing a vendor credit analysis to determine if a vendor credit has been or needs to be issued to client 12. Sub-process 114 is shown in FIG. 11, which is an example sub-process for determining the device statuses with regards to devices that are retired and for which a vendor credit applies. Sub-process 114 can be performed at any time with regards to the other steps/sub-processes of process 100. However, in one example/configuration, sub-process 114 is performed before sub-processes 116-126. While described herein as being performed by vendor credit module 70, sub-process 114 can be performed by any systems, components, and/or modules capable of performing the disclosed tasks.

Sub-process 114 can be performed on one, multiple, or all devices in inventory information 57 and/or the devices in inventory information 57 that are indicated to be returned by client 12 and/or subject to a credit from tracking service provider 10 to client 12. Sub-process 114 can include step 1102 to determine whether inventory information 57 indicates that the device has been retired (e.g., designated for return by client 12 and/or that client 12 no longer wishes to own, control, etc. the device) and client 12 is owed a credit for costs/rebates regarding the device. If not, sub-process 114 is not applicable to the device and proceeds to step 1104, which is to take no further action and continue process 100 to determine/analyze the device status for this device. If inventory information 57 does indicate that the device has been retired and/or designated for retirement (e.g., returned by client 12) and client 12 is owed a credit, sub-process 114 can include step 1106.

Step 1106 includes determining whether the current status of the device in device tracking database 54 is Retired Vendor Credit. If so, device tracking database 54 already correctly reflects the device status so sub-process 114 proceeds to step 1108, which is to take no further action. If the current status of the device in device tracking database 54 is not Retired Vendor Credit, steps 1110 and 1112 can be performed. Step 1110 includes updating the device details/information for the device in device tracking database 54 with the corresponding information for the device in inventory information 57. Step 112 includes updating the current status of the device in device tracking database 54 to Retired Vendor Credit to reflect that tracking service provider 10 has already issued and/or intends to issue a vendor credit to client 12 and/or a third-party. For the devices upon which steps 1106, 1108, 1110, and/or 1112 of sub-process 114 are performed, the device status evaluation is complete and all sub-processes of process 100 may not need to be performed.

Process 100 can include sub-process 116, which is performing a device lease analysis to determine if any devices are subject to a lease, whether that lease has ended/expired, and whether the device status is Retired Lease End. Sub-process 116 is shown in FIG. 12, which is an example sub-process for determining the device statuses with regards to devices that may be associated with a lease. Sub-process 116 can be performed at any time with regards to the other steps/sub-processes of process 100. However, in one example/configuration, sub-process 116 is performed before sub-processes 118-126. In another example, sub-process 116 is performed after sub-process 106 (lost-stolen-missing analysis) and before sub-process 108 (device activity analysis). While described herein as being performed by lease analysis module 72, sub-process 116 can be performed by any systems, components, and/or modules capable of performing the disclosed tasks.

Sub-process 116 can be performed, for example, on/for one, multiple, or all devices and/or only on those devices in lease information 39 and/or that include information regarding a lease in device tracking database 54. Thus, Step 1202 of sub-process 116 can include determining whether the device has any associated leasing information to indicate that the device is or has been subject to a lease. This leasing information can be from and/or included in lease information 39 and/or information in device tracking database 54. In one example, the leasing information is in client information 32 (device lease information 32D). In another example, the leasing information is in inventory information 57 and/or other information from provider ERP 22 as the device is leased by or from tracking service provider 10 (thus, provider 10 is a lessor). If the device does not have associated leasing information, sub-process 116 is not applicable to the device and proceeds to step 1204, which is to take no further action and continue process 100 to determine/analyze the device status for this device.

If the device does have associated leasing information and/or is included in lease information 39 in step 1202, sub-process 116 can include step 1206. Step 1206 is determining whether the lease has expired/ended for the device. If the lease has not expired, sub-process 116 is complete for the device and proceeds to step 1204, which is to continue process 100 to determine/analyze the device status for this device. If lease information 39 (and/or information in device tracking database 54) indicates that the lease has expired/ended for the device, sub-process 116 can proceed to step 1208.

Step 1208 can include notifying client 12 of the lease end/expiration of the device. Additionally, step 1208 can include soliciting a decision from client 12 regarding whether to continue use of the device after lease end or retire the device. The notification to client 12 can be included in a separate communication with client 12 and/or in device status information 28 provided to client 12 as described in this disclosure. If client 12 desires to continue use of the device, step 1204 is performed such that sub-process 116 is complete and process 100 continues to determine/analyze the device status for the device. If the client desires to retire the device such that the device should stop being used by client 12, sub-process 100 can continue with step 1210.

Step 1210 can include shipping and/or otherwise returning the device to lessor 15. For example, if the device is In Stock Available or In Stock Unavailable, the device can be shipped from tracking service provider 10 to lessor 15. In another example, if the device is In Use Active, In Use Attention Required, or in transit to client 12, the device can be shipped from client 12 to lessor 15. Other steps/processes can be performed to provide/return the device to lessor 15. After the device is returned to lessor 15, sub-process 116 can include step 1212.

Step 1212 includes, in response to lease information 39 from lessor 15 indicating that the device has been returned to lessor 15 (i.e., the device is in the possession of lessor 15), updating the device status to Retired Lease End for the device in device tracking database 54. Step 1212 can also include comparing the pending status (Retired Lease End) to the current status as listed in device tracking database 54 to ensure that the status change is an allowable and/or unusual status change. If the status change is a prohibited status change, the current status in device tracking database 54 may not be updated to Retired Lease End and an alert can be generated that the lease end/retirement information is incorrect or the previous/current device status is incorrect. The alert can notify an operator/user to further review. For devices upon which step 1204 and/or step 1210 is performed, the device status evaluation may not be complete and process 100 may need to be performed/reperformed for the device. Moreover, one, multiple, or all steps necessary to effectuate the retirement of the device (e.g., shipping the device to lessor 15 and/or otherwise retiring the device) can be performed and/or initiated automatically.

Process 100 can include sub-process 118, which is performing a device in stock analysis to determine if the devices are In Stock Available, In Stock Unavailable, or In Stock Pending Disposal. Sub-process 118 is shown in FIG. 13, which is an example sub-process for determining device statuses with regards to devices that are in stock and/or in the possession of tracking service provider 10 or another third-party device provider. Sub-process 118 can be performed at any time with regards to the other steps/sub-processes of process 100. However, in one example/configuration, sub-process 118 is performed before sub-processes 120-126. While described herein as being performed by stock module 74, sub-process 118 can be performed by any systems, components, and/or modules capable of performing the disclosed tasks.

Sub-process 118 can be performed, for example, on/for one, multiple, or all devices regarding client 12 found in inventory information 57 from provider ERP 22, which can reflect that the devices are in the possession of tracking service provider 10 (referred to herein as "stock information" and/or "stocking information"). Sub-process 118 can include step 1302, which is identifying whether the stock information indicates that the device is available and the device status of the device in device tracking database 54 is In Stock Available. If so, sub-process 118 is complete and proceeds to step 1304, which is to take no further action as the device status in device tracking database 54 correctly identifies/represents the status of the device. Further, step 1302 can also include identifying whether the stock information indicates that the device is unavailable and the device status of the device in device tracking database 54 is In Stock Unavailable. If so, sub-process 118 is complete and proceeds to step 1304, which is to take no further action as the device status in device tracking database 54 correctly identifies/represents the status of the device. If, in step 1302, the stock information indicates a different status than that which is set out for the device in device tracking database 54, sub-process 118 can proceed to step 1306.

Step 1306 can include determining whether the current status of the device in device tracking database 54 is Retired Disposed, Retired Sold, Retired Vendor Credit, or Retired Lease End. Step 1306 can be a safeguard to ensure that any inconsistencies in inventory information 57 and/or device tracking database 54 with regards to the device are brought to the attention of the operator/user. Thus, if the current status as determined in step 1306 is Retired Disposed, Retired Sold, Retired Vendor Credit, or Retired Lease End, sub-process 118 generates an alert (step 1308) of a potential incorrect status in device tracking database 54 and/or incorrect inventory information 57 in/from provider ERP 22. The device should not appear in inventory information 57 (and thus should not be in possession by tracking service provider 10) if the device was previously retired. Step 1306 is essentially the determination of the status change and whether the status change is an allowable status change, a prohibited status change, or an unusual status change. In this case, the status change is prohibited so sub-process 118 prevents the device status change from Retired Disposed, Retired Sold, Retired Vendor Credit, or Retired Lease End to In Stock Available, In Stock Unavailable, or In Stock Pending Disposal and generates an alert in step 1308.

If, in step 1306, the current status is not Retired Disposed, Retired Sold, Retired Vendor Credit, or Retired Lease End, sub-process 118 can proceed to step 1310. Step 1310 can include determining whether the status of the device as indicated in inventory information 57 is different than the device status in device tracking database 54. If not (i.e., no differences), sub-process 118 is complete and proceeds to step 1312, which is to take no further action as the device status in device tracking database 54 correctly identifies/represents the status of the device. If, in step 1310, inventory information 57 indicates a different status than that which is set out for the device in device tracking database 54, sub-process 118 can proceed to step 1314.

Step 1314 can include identifying whether the current status of the device in device tracking database 54 is Missing Lost or Missing Stolen. Similar to step 1306 above, step 1314 can be a safeguard to ensure that any inconsistencies in inventory information 57 and/or device tracking database 54 with regards to the device are brought to the attention of an operator/user. In this situation, if the device is listed as being Missing Lost or Missing Stolen in device tracking database 54, the appears of the device in inventory information 57 may indicate that the device has been found. Thus, if the device status is Missing Lost or Missing Stolen in device tracking database 54, sub-process 118 can include generating an alert (step 1316) to notify the operator/user than the device may be found and warrants further review. In one example, this can represent a prohibited status change from Missing Lost or Missing Stolen to In Stock Available, In Stock Unavailable, or In Stock Pending Disposal and sub-process 118 can prevent the status change. In another example, this can represent an unusual status change and sub-process 118 allow the status change from Missing Lost or Missing Stolen to In Stock Available, In Stock Unavailable, or In Stock Pending Disposal (as well as generates the alert in step 1316). Example sub-process 118 as shown in FIG. 13 categorizes this status change as an unusual status change. Thus, after generating the alert in step 1316, sub-process 118 includes steps 1318 and 1320. Step 1318 is updating the device details/information in device tracking database 54 with inventory information 57 regarding the device, and step 1320 is updating the current status for the device in device tracking database 54 with the status as indicated in inventory information 57, which is one of In Stock Available, In Stock Unavailable, or In Stock Pending Disposal.

Back to step 1314, if the current status of the device in device tracking database 54 is not Missing Lost or Missing Stolen, the status change is an allowable status change so sub-process 118 continues to steps 1318 and 1320 as detailed above. For the devices upon which sub-process 118 is performed, the device status evaluation is complete and all sub-processes of process 100 may not need to be performed.

Figure 14A:
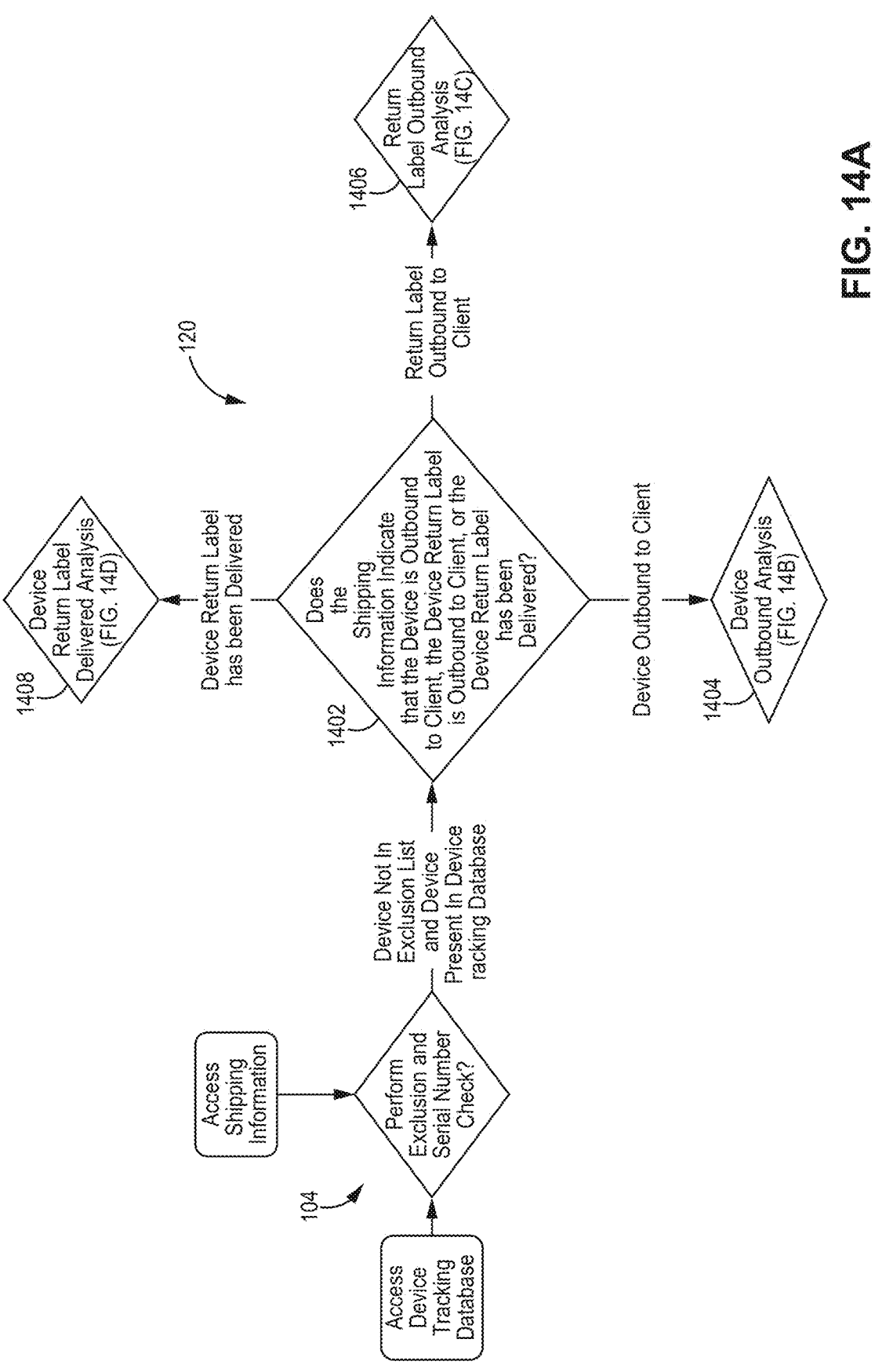
FIG. 14A is an overview of an example sub-process for determining the device statuses with regards to devices that may be shipped to the client and/or may be returned by the client to the tracking service provider and/or another vendor.
Figure 14B:
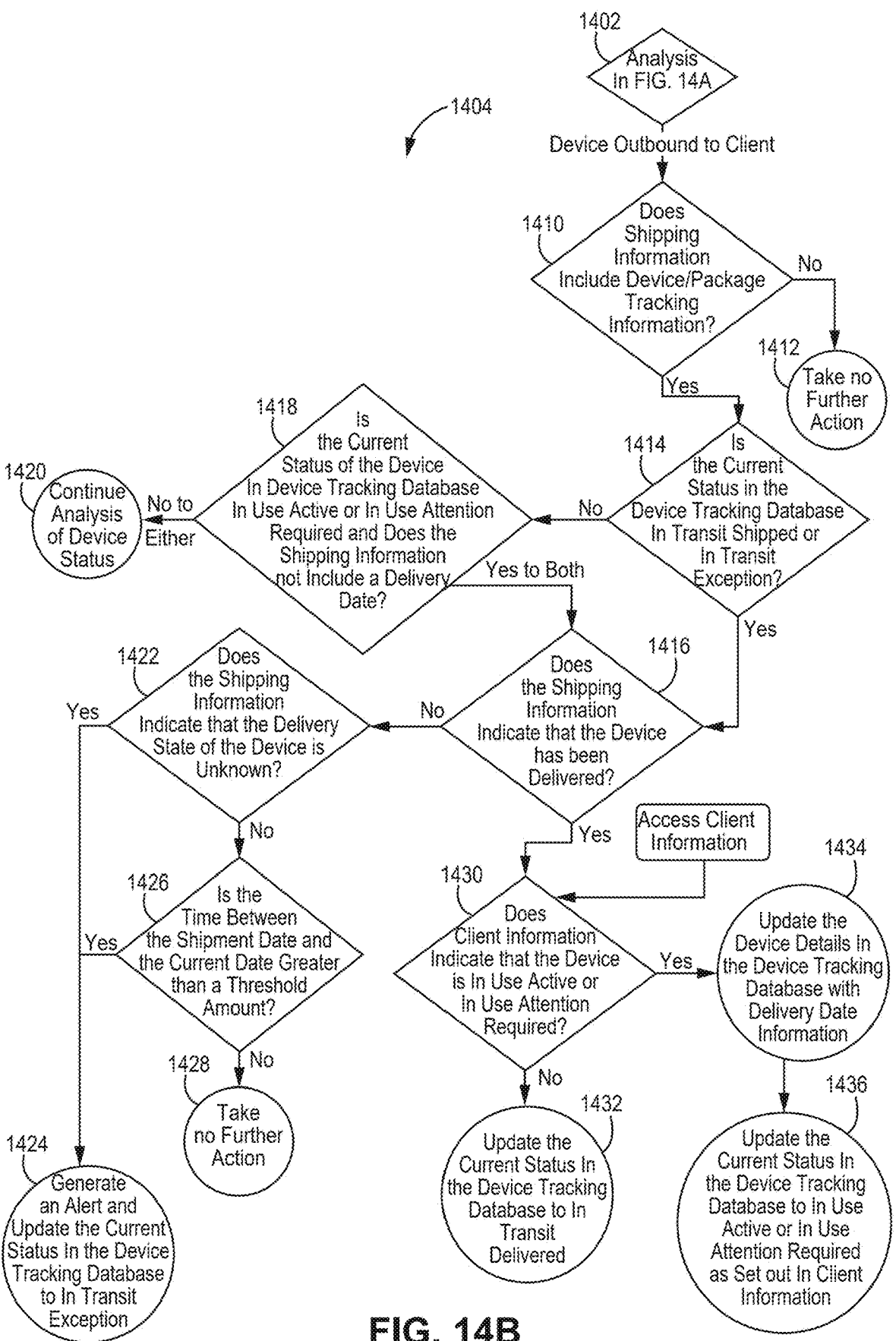
FIG. 14B is an example sub-process for determining the device statuses with regards to devices that may be shipped from the tracking service provider to the client.
Figure 14C:
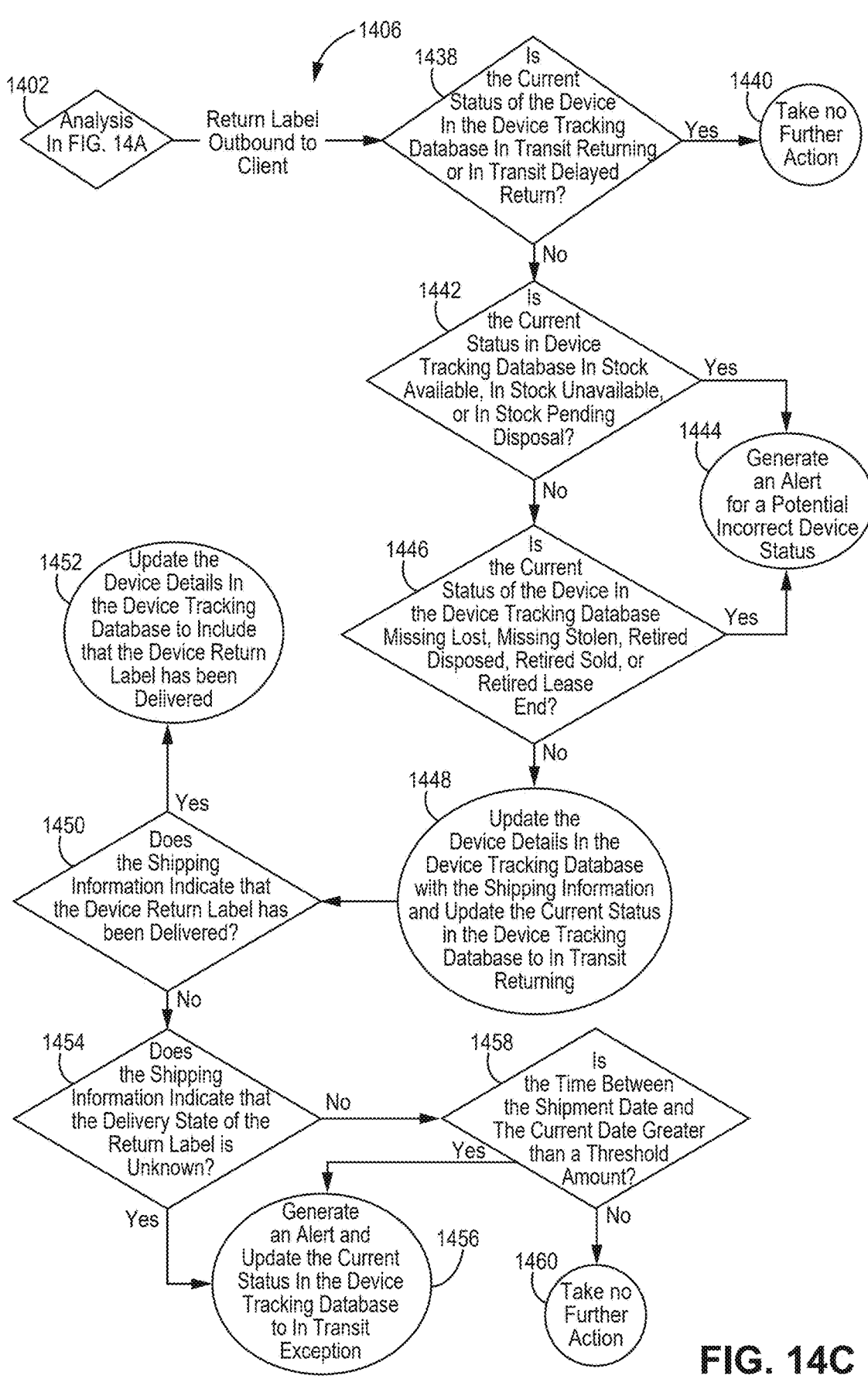
FIG. 14C is an example sub-process for determining the device statuses with regards to return labels for devices that are to-be-returned by the client to the tracking service provider.
Figure 14D:
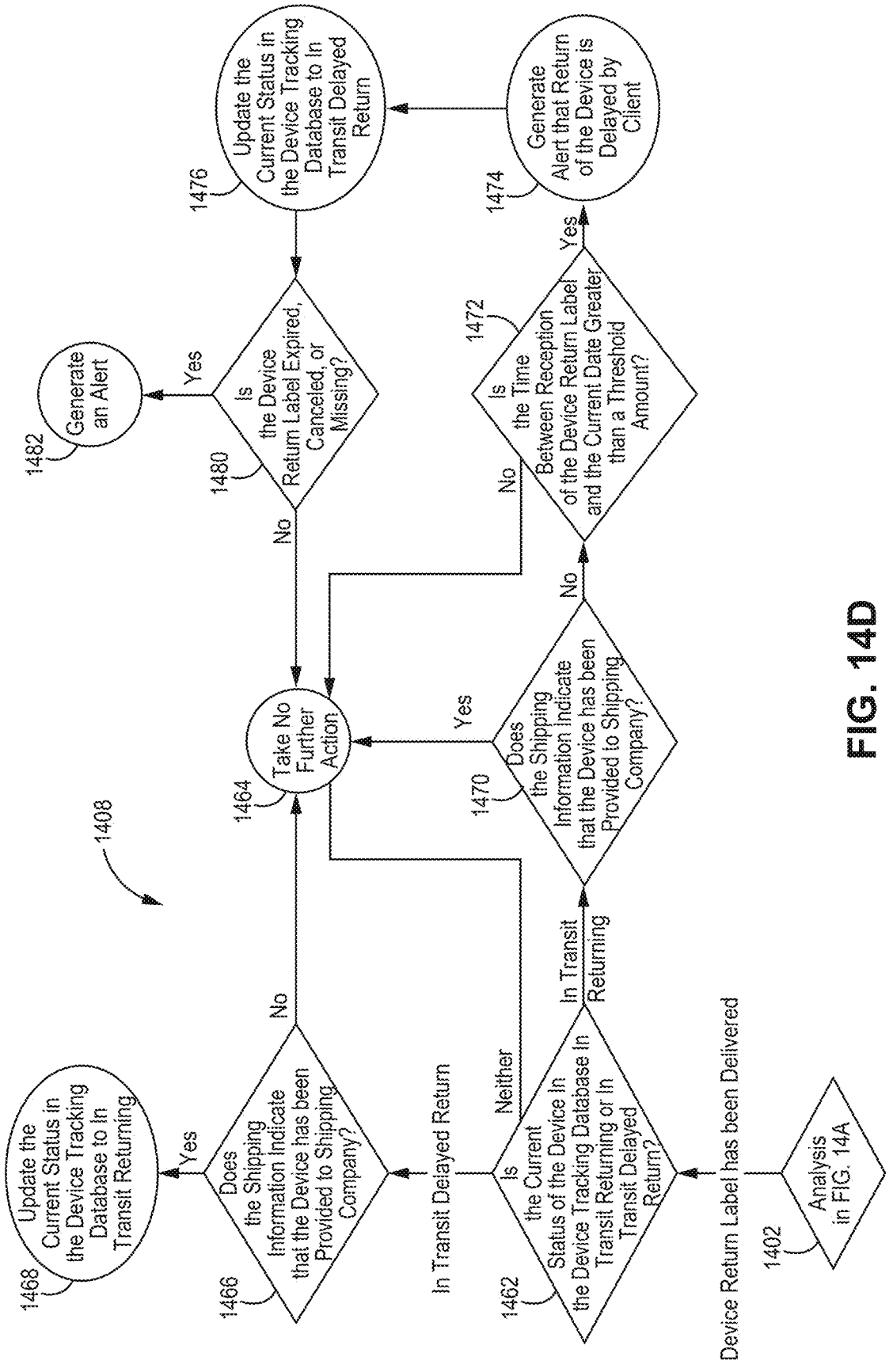
FIG. 14D is an example sub-process for determining the device statuses with regards to devices that are to-be-returned and/or may be in the process of being returned from the client to the tracking service provider.

Process 100 can include sub-process 120, which is performing a device shipping analysis to determine if the device is In Transit Shipped, In Transit Delivered, In Transit Exception, or In Transit Returning. Sub-process 120 is shown in FIGS. 14A-14D, which is an example sub-process for determining the device statuses with regards to devices that are being shipped to and/or returned by client 12. Specifically, FIG. 14A is an overview of an example sub-process for determining the device statuses with regards to devices that may be shipped to client 12 and/or may be returned by client 12 to tracking service provider 10 and/or another vendor, FIG. 14B is an example sub-process for determining the device statuses with regards to devices that may be shipped from tracking service provider 10 to client 12, FIG. 14C is an example sub-process for determining the device statuses with regards return labels for devices that are to-be-returned by client 12 to tracking service provider 10, and FIG. 14D is an example sub-process for determining the device statuses with regards to devices that are to-be-returned and/or may be shipped from client 12 to tracking service provider 10. Sub-process 120 can be performed at any time with regards to the other steps/sub-processes of process 100. However, in one example/configuration, sub-process 120 is performed before sub-processes 122-126. While described herein as being performed by shipping module 68, sub-process 120 can be performed by any systems, components, and/or modules capable of performing the disclosed tasks.

Sub-process 120 can be performed, for example, on/for one, multiple, or all devices found in shipping information 38. Sub-process 120 can include step 1402, which is determining whether shipping information 38 indicates that the device is outbound to client 12, the return label for the device is outbound to client 12, or the return label for the device has been delivered to client 12. Depending on this analysis, sub-process 120 can continue to step 1404 (device is outbound to client 12, shown in FIG. 14B), step 1406 (return label is outbound to client 12, shown in FIG. 14C), or step 1408 (return label has been delivered to client 12, shown in FIG. 14D).

Sub-process 120 can include step 1404 if, in step 1402, shipping information 38 indicates that the device is outbound from tracking service provider 10 to client 12. Sub-process 120 can then include step 1410. Step 1410 can be determining whether the shipping information 38 for the device includes device/package tracking information, such as a tracking number. If not, sub-process 120 can proceed to step 1412, which is to take no further action because the device status in device tracking database cannot be further updated (because there is no updated shipment tracking information). Thus, for this device, the device status remains at In Transit Shipped. The next update to the device status in this situation will be when the device is connected to client systems 24 and the device status changes to In Use Active or if/when client 12 indicates that it wants to return the device to tracking service provider 10. After step 1412, sub-process 120 is complete for those devices for which tracking information is not available.

If shipping information 38 for the device includes device/packaging tracking information, sub-process 120 can proceed to step 1414. Step 1414 can include determining whether the current status of the device in device tracking database 54 is In Transit Shipped or In Transit Exception. If so, the next step (step 1416) is determining if shipping information 38 indicates that the device has been delivered to client 12.

Back to step 1414, if the current status of the device in device tracking database 54 is not In Transit Shipped or In Transit Exception, sub-process 120 can proceed to step 1418, which is determining whether the current status of the device in device tracking database 54 is In Use Active or In Use Attention Required and whether shipping information 38 does not include a delivery date of the device. If one of these is not satisfied (e.g., if the current device status is not either In Use Active or In Use Attention Required or if shipping information 38 includes a deliver date of the device), sub-process 120 is complete for this device and proceeds to step 1420, which is to continue the determination/analysis of the device status of the device. If both the current status in device tracking database 54 is In Use Active or In Use Attention Required and shipping information 38 does not include a delivery date for the device, sub-process 120 can proceed to step 1416.

Step 1416 can include determining if shipping information 38 indicates that the device has been delivered to client 12. This information can be provided by tracking the device/package using the capabilities of shipping company 14. If shipping information 38 does not indicate that the device has been delivered to client 12 (or indicates that the device has not yet been delivered), sub-process 120 proceeds to step 1422. Step 1422 can include determining whether shipping information 38 indicates that the delivery state/status of the device is unknown. If the delivery state/status in shipping information 38 is indicated to be unknown, sub-process 120 can further include step 1424. Step 1424 can include generating an alert and updating the current status of the device in device tracking database 54 to In Transit Exception. The alert can notify an operator/user that the device may have been lost by shipping company 14 while in transit to client 12 so operator/user can further review/investigate. If shipping information 38 does not indicate that the delivery state/status is unknown, sub-process 120 can proceed to step 1426. Step 1426 is a device shipment aging analysis that compares the amount of time between the shipment date (e.g., the date on which the device is provided to shipping company 14) and the current date (e.g., the date on which the determination/evaluation is performed) to a threshold amount of time to determine if the device is taking longer than expected to be delivered to client 12. The threshold amount can be any amount of time defined by client 12, tracking service provider 10, and/or others involved in process 100. In one example, for priority, next-day, and two-day shipments of devices, the threshold amount of time is five days. In another example, for other shipment methods of devices, the threshold amount of time is ten days. If, in step 1426, the time between the shipment date and the current date is greater than the threshold amount of time, sub-process 120 proceeds to step 1424, which is generating an alert and updating the current status of the device in device tracking database 54 to In Transit Exception. If the time between the shipment date and the current date is less than the threshold amount of time, sub-process 120 is complete and continues to step 1428, which is to take no further action with regards to the device such that the device status remains as In Transit Shipped.

Back to step 1416, if shipping information 38 indicates that the device has been delivered, sub-process 120 can proceed to step 1430. Step 1430, which can use client information 32 (e.g., device connection state 32C and/or other client information 32), can include determining whether client information 32 indicates that the device status is In Use Active or In Use Attention Required. If not, the current status of the device in device tracking database 54 can be updated to In Transit Delivered (step 1432) as determined in step 1416. If client information 32 indicates that the device is In Use Active or In Use Attention Required, sub-process 120 can proceed to steps 1434 and 1436. Step 1434 can include updating the device details/ information in device tracking database 54 with the delivery information (e.g., date of delivery), and step 1436 can include updating the current status of the device in device tracking database 54 to In Use Active or In Use Attention Required as set out in client information 32 and/or as determined by sub-process 108.

Back to step 1402, sub-process 120 can include step 1406 if, in step 1402, shipping information 38 indicates that the return label for the device is outbound from tracking service provider 10 to client 12 (to aid client 12 in returning the device to tracking service provider 10). Sub-process 120 can then include step 1438, which includes determining whether the current status of the device in device tracking database 54 is In Transit Returning or In Transit Delayed Return. If so, sub-process 120 is complete for this device and proceeds to step 1440, which is to take no further action because a device status of In Transit Returning or In Transit Delayed Return reflects that the return label for the device has already been delivered to client 12 and, for In Transit Returning, actions/tasks regarding the return of the device are within the grace period (i.e., within the threshold amount of time) or client 12 has provided the device to shipping company 14 to return the device to tracking service provider 10. In the case of the device status being In Transit Delayed Return, client 12 has received the return label but has been delayed (i.e., taken a greater amount of time than the threshold amount, for example, seven days) in providing the device to shipping company 14 for the return of the device to tracking service provider 10.

If, in step 1438, the current status is not In Transit Returning or In Transit Delayed Return, sub-process 120 proceeds to step 1442, which is determining if the current status of the device in device tracking database 54 is In Stock Available, In Stock Unavailable, or In Stock Pending Disposal. Step 1442 is essentially the determination of the status change and whether the status change is an allowable status change, a prohibited status change, or an unusual status change.

If the current status is In Stock Available, In Stock Unavailable, or In Stock Pending Disposal, sub-process 120 can include step 1444, which is to generate an alert to notify the operator/user of a potential incorrect device status. Such a situation may arise because the device usually cannot go directly from being in the possession of client 12 to being in the possession of tracking service provider 10 without first being in transit (and thus in the possession of shipping company 14). This type of status change may be an unusual status change (so allowed but an alert is generated) or a prohibited status change (so prevented from being changed and potentially an alert is generated).

If, in step 1442, the current status in device tracking database 54 is not In Stock Available, In Stock Unavailable, or In Stock Pending Disposal, sub-process 120 can include step 1446, which is identifying whether the current status of the device in device tracking database 54 is Missing Lost, Missing Stolen, Retired Disposed, Retired Sold, or Retired Lease End. Step 1446 is essentially the determination of the status change and whether the status change is an allowable status change, a prohibited status change, or an unusual status change.

If the current status is not Missing Lost, Missing Stolen, Retired Disposed, Retired Sold, or Retired Lease End, sub-process 120 can include step 1444 as detailed above, which is to generate an alert of a potential issue in the status change. As with the previous step, such a situation may arise because the device usually cannot go directly from being in the possession of client 12 and being desired to be returned by client 12 to being lost, stolen, or retired. This type of status change may be an unusual status change (so allowed but an alert is generated) or a prohibited status change (so prevented from being changed and potentially an alert is generated).

If, in step 1446, the current status is not Missing Lost, Missing Stolen, Retired Disposed, Retired Sold, or Retired Lease End, sub-process 120 can include step 1448, which is to update the device details/information in device tracking database 54 with the corresponding shipping information 38 and update the current status of the device in device tracking database 54 to In Transit Returning. Then, sub-process 120 can include step 1450 for determining whether shipping information 38 indicates that the return label for the device has been delivered. If so, step 1452 can be performed to update the device details/information in device tracking database 54 to include that the device return label has been delivered (as well as including other information, such as the date of delivery of the return label).

If, in step 1450, shipping information 38 does not indicate that the return label has been delivered, step 1454 can be performed to determine whether shipping information 38 indicates that the delivery state/status of the return label is unknown. If the delivery state/status is unknown, step 1456 can be performed to generate an alert to notify the operator/ user of the potential issue with shipping company 14 and update the current status of the device in device tracking database 54 to In Transit Exception. If shipping information 38 does not indicate that the delivery state/status is unknown, sub-process 120 can proceed to step 1458.

Step 1458 is a shipping aging evaluation that compares the time between the shipment date and the current date (e.g., the date on which the evaluation is performed) to a threshold amount of time (e.g., five days for priority, next-day, and two-day shipping and ten to days for other shipment methods). If the amount of time between the shipment date and the current date is greater than the threshold amount of time, step 1456 can be performed to generate an alert to notify the operator/user of the potential issue with shipping company 14 and update the current status in device tracking database 54 to In Transit Exception. If the amount of time between the shipment date and the current date is less than the threshold amount of time, step 1460 can be performed such that sub-process 120 is complete and no further action is taken for this device (and thus the device status remains as In Transit Returning).

Back to step 1402, sub-process 120 can include step 1408 if, in step 1402, shipping information 38 indicates that the return label for the device has been delivered to client 12 (to aid client 12 in returning the device to tracking service provider 10). Sub-process 120 can then include step 1462, which is identifying whether the current status of the device in device tracking databases 54 is In Transit Returning or In Transit Delayed Return. If the current status is neither, this portion of sub-process 120 is not applicable and can proceed to step 1464, which is to take no further action regarding this device. If the current status is In Transit Delayed Return, sub-process 120 can proceed to step 1466, which is determining whether shipping information 38 indicates that the device has been provided to shipping company 14 by client 12 to return to tracking service provider 10. If not, sub-process 120 is complete and proceeds to step 1464, which is to take no further action with regards to this device. If shipping information 38 does indicate that the device has been provided to shipping company 14 by client 12, step 1468 is performed to update the current status of the device in device tracking database 54 to In Transit Returning to reflect that the device is not in the possession of shipping company 14 and in transit back to tracking service provider 10.

Back to step 1462, if the current status of the device in device tracking database 54 is In Transit Returning, sub-process 120 can include step 1470, which is determining whether shipping information 38 indicate that the device has been provided to shipping company 14 by client 12. If so, the device status in device tracking database 54 already correctly identifies the statues of the device (e.g., to reflect that the device is in the possession of shipping company 14 and in transit back to tracking service provider 10) so sub-process 120 includes step 1464, which is to take no further action so the device status remains as In Transit Returning.

If, in step 1470, shipping information 38 does not indicate that the device has been provided to shipping company 14, step 1472 can be performed, which is a device return aging evaluation. Step 1472 can include comparing the amount of time between delivery/reception of the return label (by client 12) and the current date (e.g., the date on which the evaluation is performed) to a threshold amount of time (e.g., seven days). If the amount of time between the delivery/ reception of the return label and the current date is greater than the threshold amount of time, step 1474 can be performed to generate an alert to notify the operator/user of the potential delay in returning the device by client 12, and step 1476 can be performed to update the current status in device tracking database 54 to In Transit Delayed Return to reflect that the device has been delayed in its return from client 12 to tracking service provider 10. If, in step 1472, the amount of time between the delivery/reception date of the return label and the current date is less than the threshold amount of time, step 1464 can be performed such that sub-process 120 is complete and no further action is taken for this device (and thus the device status remains as In Transit Returning).

After step 1476, sub-process 120 can include step 1480, which is identifying whether the return label for the device is expired, canceled, or missing. This information can be in any external information 58, including in client information 32 (the return label is missing) and/or in shipping information 38 (indicating that the return label has expired and/or has been canceled). If the return label is not expired, canceled, or missing, sub-process 1464 can be complete and proceed to step 1464, which is to take no further action so the device status remains as In Transit Delayed Return. If the return label is expired, canceled, or missing, sub-process 120 can include generating an alert (step 1482) to notify the operator/user to further review and potentially generate and/or send to client 12 a new return label. Further, step 1482 can include automatically generating and/or providing a new return label to client 12. For the devices upon which sub-process 120 is performed, the device status evaluation is complete and all sub-processes of process 100 may not need to be performed.

Process 100 can include sub-process 122, which is performing a device aging analysis to determine if the devices each have a device status of In Use Active, In Use Attention Required, or In Transit Delayed Return. Sub-process 122 is shown in FIG. 15, which is an example sub-process for determining whether the device statuses for any devices have aged to a point that the device status should be updated to reflect the aging, delay, etc. Sub-process 122 can be divided into three different sub-processes: connection state aging sub-process 122A, delivery aging sub-process 122B, and return aging sub-process 122C. Process 100 (and/or sub-process 122) can include performing one, multiple, or all of sub-processes 122A-122C depending on the evaluation of the device status. As detailed above, some sub-processes 104-120 can include a device aging sub-process/ evaluation and/or other device aging evaluations not expressly disclosed in FIG. 15. Thus, any of sub-processes 122A-122C (and/or other device aging evaluations) can be performed before, during, and/or after any of the other sub-processes of process 100. Additionally, while described with regards to FIG. 15 as proceeding from sub-process 122A to sub-process 122B and then to sub-process 122C, sub-process 122A-122C can be performed in any order. These sub-processes 122A-122C are described in detail below. Additionally, while described herein as being performed by device aging module 76, sub-process 122 can be performed partially or entirely by any systems, components and/or modules capable of performing the disclosed tasks. For example, sub-process 122 may be partially or entirely performed by active analysis module 65.

Sub-process 122 can be performed, for example, on/for one, multiple, or all devices in device tracking database 54 for which sub-process 122 is applicable as detailed below. Connection state aging sub-process 122A, also referred to herein as device activity aging sub-process 122A, is a determination regarding whether client 12 has used the device recently via connecting the device to client system 24 (e.g., UEM/MDM 26). Connection state aging sub-process 122A may only be applicable to devices that have a current device status of In Use Active, so sub-process 122A can begin with step 1502 by identifying whether the current status of the device in device tracking database 54 is In Use Active. If the current status is not In Use Active, sub-process 122A is complete and can proceed to step 1510, which is the beginning of delivery aging sub-process 122B.

If the current status in step 1502 is In Use Active, sub-process 122A can proceed to step 1504, which is comparing the amount of time between the most recent timestamp for the device (in device connection state 32C of client information 32 as described above) and the current date (e.g., the date on which the evaluation is performed) to a threshold amount of time (e.g., thirty days). If the amount of time between the most recent timestamp for the device and the current date is less than the threshold amount of time, the device connection state has not aged and the device status of In Use Active is still correct. In response, step 1506 is performed and sub-process 122A is complete so that no further action is taken and the device status for the device in device tracking database 54 remains as In Use Active. If the amount of time between the most recent timestamp for the device and the current date is greater than the threshold amount of time, the device connection state has aged and the device status of In Use Active is no longer correct (i.e., the device status is outdated). Thus, step 1508 is performed to update the current status of the device in device tracking database 54 to In Use Attention Required to reflect that the device has not been used by client 12 for an extended period of time. After this comparison and/or evaluation, connection state aging sub-process 122A is complete.

Delivery aging sub-process 122B is a determination regarding whether shipping company 14 has taken too much time to deliver the device to client 12 and/or whether client 12, upon delivery of the device to client 12, has taken too much time to use/connect the device to client systems 24. Sub-process 122B can begin with step 1510 (for delivery aging) and/or with step 1514 (for device use aging after delivery). Step 1510 can include identifying whether the current status of the device in device tracking database 54 is In Transit Delivered. If the current status is not In Transit Delivered, the delivery aging portion of sub-process 122B is not applicable as the device that is In Transit Delivered has already been delivered by shipping company 14 so cannot be delayed in shipping.

If the current status is not In Transit Delivered, sub-process 122B can proceed to step 1514, which is identifying whether the current status of the device in device tracking database 54 is In Transit Shipped. If the current status of the device is not In Transit Shipped, than either the device is not in the possession of shipping company 14 (so cannot be delayed by the activities of shipping company 14) or the device already has an in transit designation (e.g., the device is in the possession of shipping company 14 but process 100 has already determined the device status of the device). Thus, if the current status is not In Transit Shipped, the aging after delivery portion of sub-process 122B is not appliable and sub-process 122B can proceed to step 1526, which is the beginning of sub-process 122C.

Back to step 1510, if the current status of the device in device tracking database 54 is In Transit Delivered, sub-process 122B can proceed to step 1512, which is the device activity after delivery aging evaluation. Step 1510 can include comparing the amount of time between the delivery date of the device to client 12 (as indicated in shipping information 38) and the current date (e.g., the date on which the evaluation is performed) to a threshold amount of time (e.g., seven days). If the amount of time between the delivery date and the current date is less than the threshold amount of time, the device activity after delivery has not aged and the device status is correct as In Transit Delivered (essentially, the threshold amount of time is a grace period for client 12 to begin using the device after delivery of the device to client 12). Thus, sub-process 122B proceeds to step 1506 to take no further action regarding this device. If the amount of time between the delivery date and the current date is greater than the threshold amount of time, the device activity after delivery has aged and the device status of In Transit Delivered is no longer correct (i.e., the device status is outdated). Thus, step 1508 is performed to update the current status of the device in device tracking database 54 to In Use Attention Required to reflect that the device is in the possession of client 12 but has not been used by client 12 for an extended period of time (e.g., since client 12 received the device). Once client 12 connects the device to, for example, client systems 24, a device connection states 32C with a recent timestamp is generated. Then, process 100 can determine that the device status is In Use Active to reflect that client 12 is actively using the device.

Back to step 1510, if the current state of the device in device tracking database 54 is not In Transit Delivered, sub-process 122B can proceed to step 1514, which is identifying whether the current state of the device in device tracking database 54 is In Transit Shipped. As mentioned above, if the current status is not In Transit Shipped, sub-process 122B is complete and sub-process 122C can be performed beginning with step 1526.

If the current status of the device in device tracking database 54 is In Transit Shipped, sub-process 122B can include step 1516, which is determining whether shipping information 38 includes device/package tracking information (e.g., a tracking number). If so, sub-process 122B can proceed to step 1518, which is to perform the device outbound to client analysis as detailed in sub-process 120 and with regards to FIG. 14B (which itself may include a shipping aging analysis). If shipping information 38 does not include device/package tracking information, sub-process 122B can proceed to step 1520.

Step 1520 is the delivery aging evaluation. Step 1520 can include comparing the amount of time between the shipment date (e.g., the date shipping company 14 took possession of the device as set out in shipping information 38) and the current date (e.g., the date on which the evaluation is performed) to a threshold amount of time. This threshold amount of time can be, for example, twelve days for priority, next-day, or two day shipping (the seven day grace period for client 12 to begin use of the device plus the five day allowance for the priority, next-day, or two-day shipment) and seventeen days for other shipping methods (the seven day grace period for client 12 begin use of the device plus the ten day allowance for other shipping methods). If the amount time between the shipment date and the current date is less than the threshold amount of time, the delivery has not aged and the device status is correct as In Transit Shipped (essentially, the threshold amount of time is the specified allowable amount of time for shipping company 14 to deliver the device to client 12 and for client 12 to begin use of the device). Thus, sub-process 122B proceeds to step 1522 to take no further action regarding this device. If the amount of time between the shipment date and the current date is greater than the threshold amount of time, the delivery and client use has aged and the device status of In Transit Shipped is no longer correct (i.e., the device status is outdated). This is based on the assumption that shipping company 14 has delivered the device to client 12 within a usual amount of time but client 12 is delayed in using the device. Thus, step 1508 is performed to update the current status of the device in device tracking database 54 to In Use Attention Required to reflect that the device is likely in the possession of client 12 but is delayed in being used (and thus establish a timestamp with client systems 24 to indicate the device is actively in use.

Return aging sub-process 122C is a determination regarding whether client 12 has taken too long to provide the device to shipping company 14 to return to tracking service provider 10. Sub-process 122C can begin with step 1526, which can include identifying whether the current status of the device in device tracking database 54 is In Transit Returning. If the current status is not In Transit Returning, return aging sub-process 122C is not applicable as the device is not intended to be returned to tracking service provider 12 or the device has already been analyzed by process 100 and is deemed to be delayed (so thus is In Transit Delayed Return). Therefore, sub-process 122C can proceed to step 1528, which is to take no further action with regards to this device.

If the current status is In Transit Returning, sub-process 122C can include step 1530. Step 1530 is a determination of whether shipping information 38 includes return label/package tracking information (e.g., a tracking number). If so, sub-process 122C can proceed to step 1532, which is determining whether the device details/information in device tracking database 54 (and/or shipping information 38) indicates that the device return label has been delivered to client 12. If not, step 1534 can be performed such that sub-process 122C includes taking no further action with regards to this device as the return label for the device has yet to be delivered to client 12 so the device status has yet to change (and thus remains as In Transit Returning).

Back to step 1532, if the device details/information in device tracking database 54 (and/or shipping information 38) indicates that the device return label has been delivered to client 12, sub-process 122C can continue to step 1536, which is the return aging evaluation. Step 1536 can include comparing the amount of time between the delivery/reception of the return label (in shipping information 38) and the current date (e.g., the date on which the evaluation is performed) to a threshold amount of time (e.g., seven days). If the amount of time between the delivery/reception of the return label and the current date is greater than the threshold amount of time, step 1538 can be performed to update the current status in device tracking database 54 to In Transit Delayed Return to reflect that the device has been delayed in its return from client 12 to tracking service provider 10 because client 12 has yet to provide the device to shipping company 14. If, in step 1536, the amount of time between the delivery/reception date of the return label and the current date is less than the threshold amount of time, step 1534 can be performed such that sub-process 122C is complete and no further action is taken for this device (and thus the device status remains as In Transit Returning).

Back to step 1530, if shipping information 38 does not include return label/package tracking information (e.g., a tracking number), sub-process 122C can proceed to step 1540. Step 1540 is similar to step 1520 and is a return label delivery aging evaluation. Step 1540 can include comparing the amount of time between the shipment date (e.g., the date shipping company 14 took possession of the return label as set out in shipping information 38) and the current date (e.g., the date on which the evaluation is performed) to a threshold amount of time (e.g., five days for priority, next-day, and two-day shipping and ten days for other shipment methods). If the amount of time between the shipment date of the return label and the current date is less than the threshold amount of time, the return label delivery has not aged and the device status is correct as In Transit Returning (essentially, the threshold amount of time is the specified allowable amount of time for shipping company 14 to deliver the return label to client 12). Thus, sub-process 122C proceeds to step 1534 to take no further action regarding this device. If the time between the shipment date of the return label and the current date is greater than the threshold amount of time, the return label delivery has aged and the device status of In Transit Shipped is no longer correct (i.e., the device status is outdated). Thus, step 1538 is performed to update the current status of the device in device tracking database 54 to In Transit Delayed Return to reflect that the return label is in the possession of shipping company 14 but is taking longer than desired to be delivered to client 12 so thus the device is taking longer than desired to be provided back to shipping company 14 to return the device to tracking service provider 10. Once the return label is received by client 12 and client 12 uses the return label to start the return of the device back to tracking service provider 10, process 100 will be performed to determine that the device status is In Transit Returning (because the device is now in the possession of shipping company 14). For the devices upon which sub-process 122A, sub-process 122B, and/or sub-process 122C are performed, the device status evaluation may not be complete and the other steps/sub-processes of process 100 may need to be performed.

Process 100 can include sub-process 124, which is performing a device normalization analysis to ensure the device model name as listed/included in device status information 28 is recognizable to client 12. Sub-process 124 does not determine any device statuses 44 but instead focuses on the information (i.e., device status information 28) that is provided to client 12. As described above with regards normalization module 78, sub-process 124 ensures the device information as included in device tracking database 54 and/or device status information 28 has a model name and/or model description that is understandable by client 12. In reporting device status information 28 to client 12, the client may have specific device model name preferences. While the model name and/or model description can be populated from the device manufacturer, the device provider (e.g., tracking service provider 10), and/or from other locations, the model name is often altered such that the exact same electronic product/device may have dozens of different names. For example, an Apple MacBook may have dozens or hundreds of model names as designated by the manufacturer (that can include the specifications of the product, the size of the product, and/or other information). However, client 12 may desire, for understandability and readability, that all respective versions/models of the Apple MacBook be designated to have a model name of Apple MacBook Pro (when applicable) or Apple MacBook Air (when applicable) instead of model names that can include other descriptive information (e.g., "MacBook Pro 2019 13.3 Inch Touch Bar 1.7 GHZ 16 GB 512 GB SSD 2×Thuderbolt 2 Space Gray"). In another example, the device model name may not even indicate what type of electronic product the device is (e.g., "HP EX360830G11 U7-165U13"). Thus, sub-process 124 can greatly increase the understandability and readability of device status information 28 to help client 12 make more accurate decisions regarding the devices.

Figure 16A:
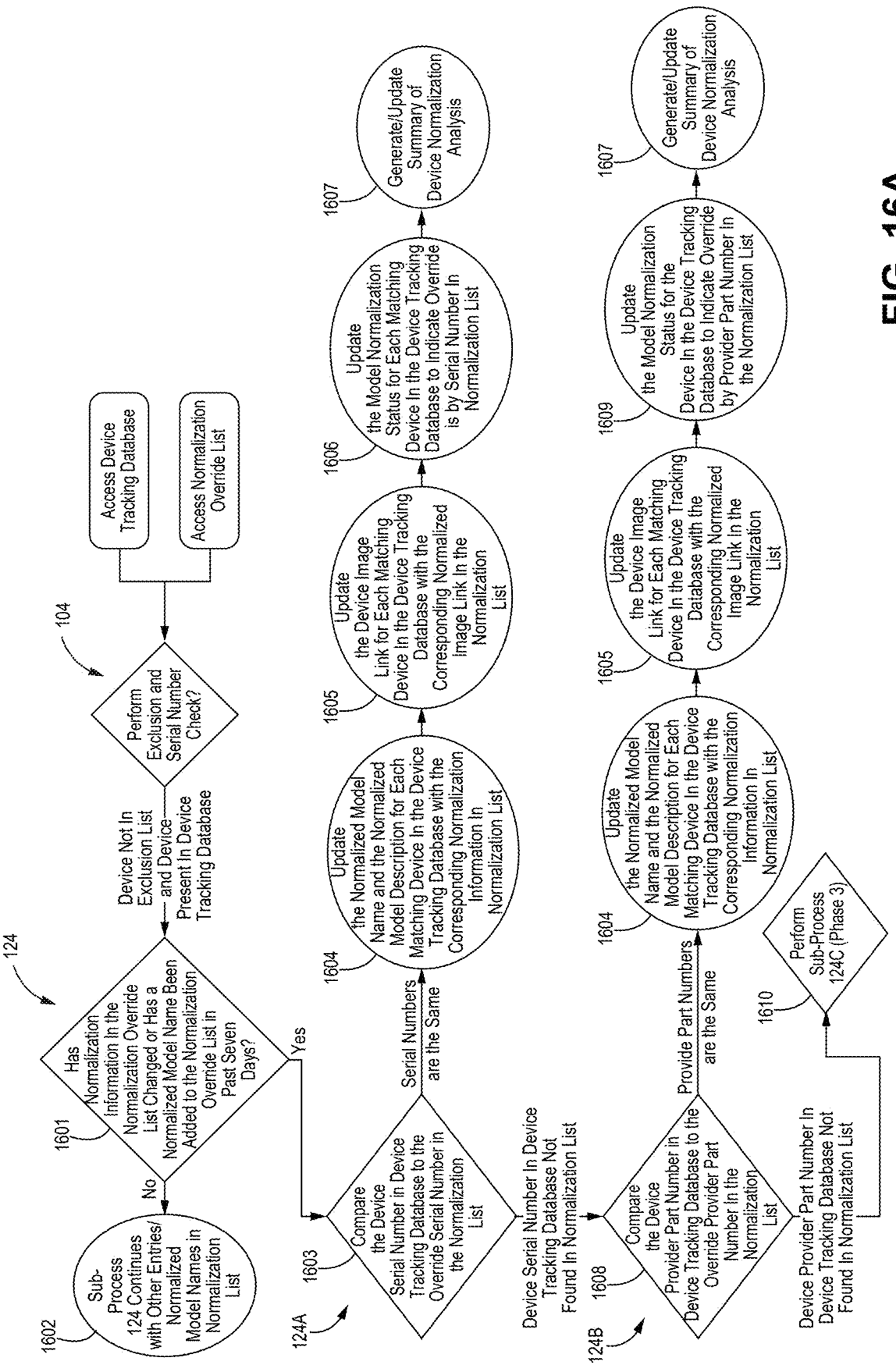
FIG. 16A-16D is an example sub-process for normalizing device model names and related information in the device tracking database and/or device status information.
Figure 16B:
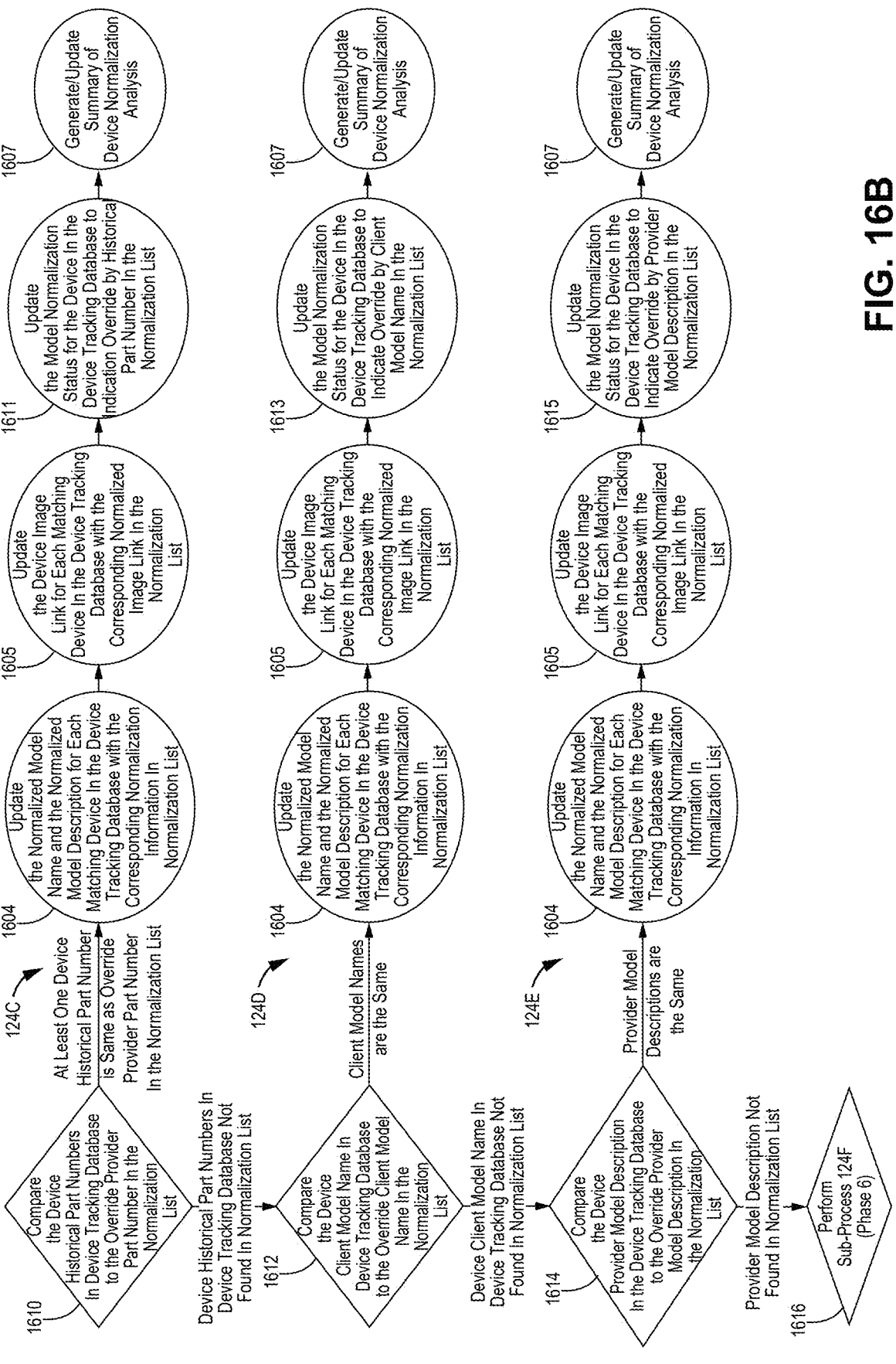
Figure 16C:
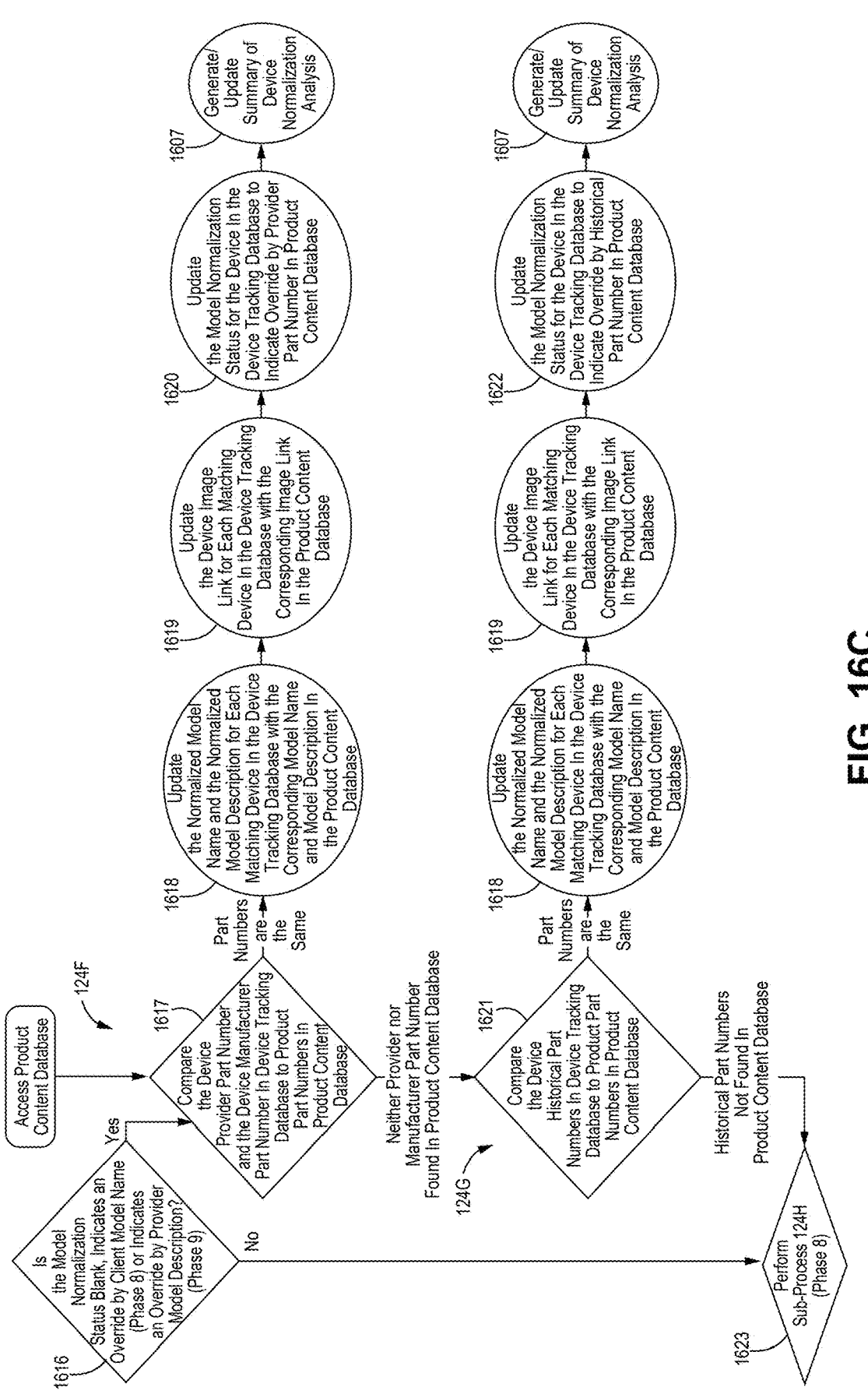
Figure 16D:
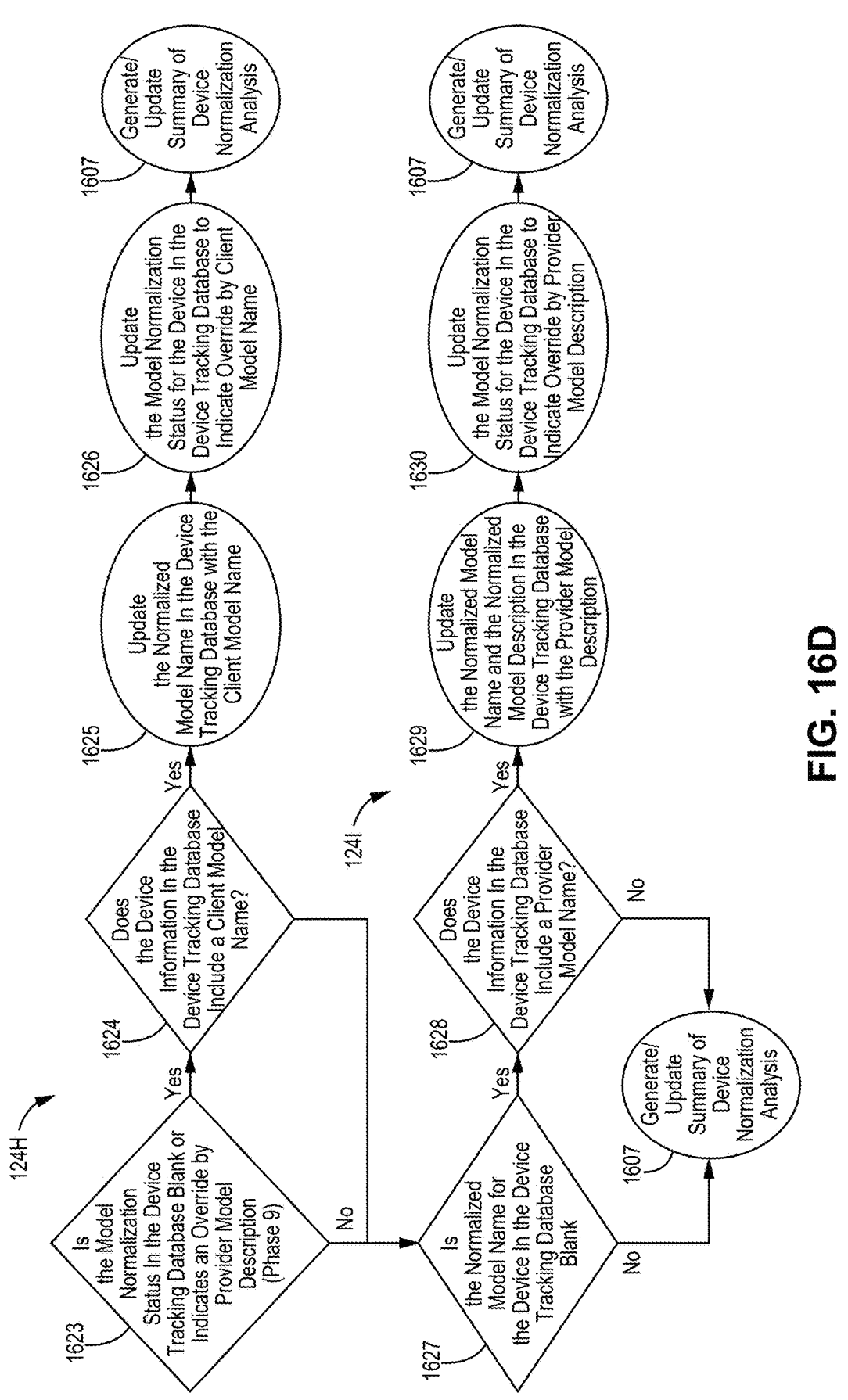

An overview of an example sub-process for normalizing device model names is shown as sub-process 124 is shown in FIGS. 16A-16D. Specifically, sub-process 124 can include nine different phases to associate a normalized model name with a device in device tracking database 54. FIG. 16A shows phase 1 (sub-process 124A) and phase 2 (sub-process 124B). FIG. 16B shows phase 3 (sub-process 124C), phase 4 (sub-process 124D), and phase 5 (sub-process 124E). FIG. 16C shows phase 6 (sub-process 124F) and phase 7 (sub-process 124G). FIG. 16D shows phase 8 (sub-process 124H) and phase 9 (sub-process 124I).

Sub-process 124 can be performed at any time with regards to the other steps/sub-processes of process 100. However, in one example/configuration, sub-process 124 is performed after steps/sub-processes 102-122 (the device status determinations) and before sub-process 126 (providing device status information 28 to client 12). Further, sub-process 124 can be performed partially or entirely multiple times during process 100 and/or can be performed automatically in response to, for example, a request to provide device status information 28, on a schedule (e.g., sub-process 124 is to be performed each morning at 4 am), the modification and/or addition of information in normalization override list 59A and/or product content database 59B, and/or other triggering events. Further, any of the steps of sub-process 124 can include requesting (and receiving), pulling, and/or otherwise obtaining information as needed. For example, sub-process 124G (phase 7) can include comparing the historical part numbers for the device to the product part numbers in product content database 59B. Sub-process 124G can include performing a search and/or pulling the historical part numbers information from, for example, provider ERP 22, device tracking database 54, and/or from other locations. This can be done automatically in response to the determination that that information is needed during that sub-process. While described herein as being performed by normalization module 78 of system 20, sub-process 124 can be performed partially and/or entirely by any systems, components, and/or modules capable of performing the disclosed tasks.

Sub-process 124 can be performed, for example, on/for one, multiple, or all devices found in device tracking database 54, whether the associated normalized model name for that device is populated or blank. In one example, phase 1 (sub-process 124A) is performed for each applicable entry/ normalized model name for all devices, then phase 2 (sub-process 124B) is performed for each entry/normalized model name for all devices, and so on for phases 3-5 (sub-processes 124C-124E) for all devices. Then, phase 6 (sub-process 124F) is performed for all devices for which sub-process 124F applies. Thereafter, phase 7 (sub-process 124G) is performed for all devices for which sub-process 124G applies, and so on for phases 8 and 9.

Sub-process 124 can include step 1601, which is determining whether the normalization information in normalization override list 59A has changed or whether new entries/normalized model names have been added to normalization override list 59A in the past designated number of days (e.g., in the past seven days). This determination in step 1601 can be performed for each entry/normalized model name in normalization list 59A and ensures that sub-process 124 is performed on all entries in normalization list 59A, which can be hundreds or thousands. Thus, in this example sub-process 124, only those entries/normalized model names in normalization model list 59A that have changed and/or are new within the last seven days are evaluated in sub-process 124. If it is the first performance of sub-process 124 on the devices in device tracking database 54, all entries/normalized model names should be evaluated/ compared to the respective devices in device tracking database 54. The designated number of days (e.g., the past seven days) can be specified by tracking service provider 10, client 12, and/or another and should be an amount of time less than the frequency that sub-process 124 is performed on device tracking database 54. For example, if sub-process 124 is scheduled to be performed every four days, the designated amount of time in step 1601 should be greater than four days to ensure any changes and/or new entries in normalization override list 59A are applied to devices in device tracking database 54.

As described herein, phases 1-5 provide normalized model names from normalization override list 59A, which is specifically generated for the device normalization analysis (sub-process 124). Alternatively, phases 6-7 provide normalized model names from product content database 59A, which is not necessarily generated for the device normalization analysis (sub-process 124), while phrases 8-9 provide normalized model names from other sources that are likely not specifically generated for the device normalization analysis but have already been formed for other purposes. Essentially, phases 6-9 use preexisting information to populate the normalized model names for respective/corresponding devices in device tracking database 54.

While shown and described herein as being performed from phase 1 through phase 9, sub-process 124 can have other configurations in which phases 6-9 are performed first and then phases 1-5 (e.g., the override phases) are performed thereafter. In one example, a device can be subject to (e.g., have its normalized model name populated by) one of phases 6-9 during a first performance of sub-process 124 but on a subsequent performance of sub-process 124 can be subject to (e.g., have its normalized model name populated by) one of phases 1-5 and/or a different phase of phase 6-9.

Phases 1-5 (described below as sub-processes 124A-124E) are performed from phase 1 through phase 5 due to the normalization category for each phase proceeding from the most specific (serial number of the device in phase 1) to the least specific (provider model description in phase 5). Once a device in device tracking database 54 is subject to one of the phases/sub-processes, process 124 is complete for that device, so that device is not evaluated in subsequent phases. Thus, for that device to be associated with the most specific/relevant normalized model name, the device should be subject to the most specific phase (e.g., the phase with the most specific normalization category) before moving on to a less specific phase (e.g., a phase with less specific normalization category as compared to the preceding phase).

Similarly, phases 6-9 (described below as sub-processes 124F-124I) are performed from phase 6 through phase 9 due to the desire for the normalized model name to be populated first with the model name from product content database 58B, second with the client model name, and third with the provider model description. In other configurations, the order of phases 6-9 (and/or phases 1-5) can be altered to reflect a different hierarchical preference of the normalized model name source.

If the entries/normalized model names (and/or other associated information) are not new and/or not have changed over the designated number of days/amount of time (e.g., the past seven days), sub-process 124 is complete for that particular entry/normalization model name (as sub-process 124 has previously been performed with regards to that entry/normalized model name). Thus, sub-process 124 proceeds to step 1602, which is that sub-process 124 continues with other entries/normalized model names in normalization override list 59A.

If the entries/normalized model names are new and/or have changed over the designated number of days (e.g., the past seven days), sub-process 124 can proceed to step 1603, which is the start of phase 1/sub-process 124A. Phases 1-5 (sub-processes 124A-124E) use normalization override list 59A to associate the normalized model name with the device in device tracking database 54, while phases 6-9 (sub-processes 124F-124I) use other techniques to determine a normalized model name as is described below.

Step 1603 includes comparing the device serial number as listed in device tracking database 54 to the serial number as listed in normalization override list 59A. In sub-process 124A, the serial number is the normalization category. If the serial numbers do not match (e.g., the device serial number does not match any serial numbers listed with regards to entries in normalization override list 59A), phase 1/sub-process 124A is complete for that particular device and sub-process 124 can proceed to step 1608, which is the start of phase 2/sub-process 124B.

If the serial number of the device in device tracking database 54 is the same as any serial numbers listed with regards to any entries in normalization override list 59A, sub-process 124A can proceed to step 1604.

Step 1604 can include updating/populating the normalized model name and the normalized model description for each matching device in device tracking database 54 with the corresponding normalized model name and normalized model description of the entry in normalization override list 59A to which the serial number matched. Then, step 1605 can be performed to update/populate the device image link for each matching device in device tracking database 54 with the corresponding normalized image link of the entry in normalization override list 59A to which the serial number matched.

Third, step 1606 can be performed, which is to update/populate the model normalization status for each matching device in device tracking database 54 to indicate that the model name override was by serial number in the normalization override list. Step 1606 can provide insight in further evaluations and/or future performances of sub-process 124 as to how the respective devices were provided with their corresponding normalized model name. Finally, sub-process 124A (phase 1) can include generating and/or updating a summary of the device normalization analysis (step 1607). The summary can include which devices were normalized in each phase, the number of devices normalized in each phase, the amount of time system 20 took to perform/complete each phase for the applicable devices in device tracking database 54, and/or other relevant information.

Back to step 1603, if the serial numbers do not match (e.g., the device serial number does not match any serial numbers listed with regards to entries in normalization override list 59A), phase 1/sub-process 124A is complete for the device and sub-process 124 can proceed to step 1608, which is the beginning of phase 2/sub-process 124B.

Step 1608 of sub-process 124B includes comparing the device provider part number as listed in device tracking database 54 to the provider part number as listed in normalization override list 59A. In step 1608, the normalization category is provider part number, which can be the part number as designated by tracking service provider 10 and/or as designated in inventory information 57. If the provider part numbers do not match (e.g., the device provider part number in device tracking database 54 does not match any part numbers as listed with regards to entries in normalization override list 59A), phase 2/sub-process 124B is complete for that particular device and sub-process 124 can proceed to step 1610, which is the beginning of phase 3/sub-process 124C.

If the provider part number of the device in device tracking database 54 is the same as any provider part numbers listed with regards to any entries in normalization override list 59A, sub-process 124B can proceed to steps 1604, 1605, 1609, and 1607.

Step 1604 in sub-process 124B is the same as step 1604 in sub-process 124C (and steps 1604 as detailed with regards to the other phases 3-5 as detailed below). Step 1604 can include updating/populating the normalized model name and the normalized model description for each matching device in device tracking database 54 with the corresponding normalized model name and normalized model description of the entry in normalization override list 59A to which the provider part number matched. Then, step 1605 can be performed to update/populate the device image link for each matching device in device tracking database 54 with the corresponding normalized image link of the entry in normalization override list 59A to which the provider part number matched. Third, step 1609 can be performed, which is to update/populate the model normalization status for each matching device in device tracking database 54 to indicate that the model name override was by provider part number in the normalization override list. As with step 1606 above with regards to sub-process 124A (and steps 1611, 1613, and 1615 with regards to the subsequent sub-processes), step 1609 can provide insight in further evaluations and/or further performances of sub-process 124 as to how the respective devices were provided with their corresponding normalized model name. Fourth, sub-process 124B (phase 2) can include step 1607, which is the same as step 1607 in sub-processes 124A, 124C, 124D, and 124E. Step 1607 can include generating and/or updating a summary of the device normalization analysis as described above.

Back to step 1608, if the provider part number for the device in device tracking database 54 does not match any of the provider part numbers listed with regards to entries in normalization override list 59A, phase 2/sub-process 124B is complete for the device and sub-process 124 can proceed to step 1610, which is the beginning of phase 3/sub-process 124C shown in FIG. 16B.

Step 1610 of sub-process 124C can include comparing the device historical part numbers as listed in device tracking database 54 to the provider part number as listed in normalization override list 59A. In step 1610, the normalization category is historical provider part number. The historical part numbers for the device are any prior/past part numbers that were formerly used to designate the device. The historical part numbers can be listed for each device in device tracking database 54. However, in some configurations/examples, the historical part numbers "box" is not populated except if phase 3 (sub-process 124C) or phase 7 (sub-process 124G) is performed on the device. In that case, those sub-processes can include accessing provider ERP 22 (and/or information in device tracking database 54) to obtain the historical part numbers for the corresponding device and then populating/adding that information (e.g., the historical part numbers) to the proper location/box in device tracking database 54 for that device. The comparison in step 1610 is similar to the comparison in step 1608 of phase 2, except that in step 1610 the past/historical part numbers for the device in device tracking database 54 are compared to the provider part number as listed in normalization override list 59A.

If the part numbers do not match (e.g., none of the device historical part numbers for the device in device tracking database 54 match any provider part numbers as listed with regards to entries in normalization override list 59A), phase 3/sub-process 124C is complete for that particular device and sub-process 124 can proceed to step 1612, which is the start of phase 4/sub-process 124D.

If any of the historical part numbers associated with the device in device tracking database 54 are the same as any provider part numbers listed with regards to any entries in normalization override list 59A, sub-process 124C can proceeds to steps 1604, 1605, 1611, and 1607.

Steps 1604, 1605, and 1607 in sub-process 124C are the same as previously described steps with the same reference number in previous sub-processes. Step 1604 can include updating/populating the normalized model name and the normalized model description for each matching device in device tracking database 54 with the corresponding normalized model name and normalized model description of the entry in normalization override list 59A to which the provider part numbers matched. Then, step 1605 can be performed to update/populate the device image link for each matching device in device tracking database 54 with the corresponding normalized image link of the entry in normalization override list 59A to which the provider part numbers matched. Third, step 1611 can be performed, which is to update/populate the model normalization status for each matching device in device tracking database 54 to indicate that the model name override was by historical part number in the normalization override list. As with step 1606 above with regards to sub-process 124A, step 1611 can provide insight in further evaluations and/or further performances of sub-process 124 as to how the respective devices were provided with their corresponding normalized model name. Fourth, sub-process 124C (phase 3) can include step 1607, which can include generating and/or updating a summary of the device normalization analysis as described above.

Back to step 1610, if the historical part numbers for the device in device tracking database 54 do not match any of the provider part numbers listed with regards to entries in normalization override list 59A, phase 3/sub-process 124C is complete for the device and sub-process 124 can proceed to step 1612, which is the beginning of phase 4/sub-process 124D.

Step 1612 of sub-process 124D can include comparing the device client model name as listed in device tracking database 54 to the client model name as listed in normalization override list 59A. In step 1612, the normalization category is client model name. The client model name as listed in device tracking database 54 can be the model name for the device as set out in client information 32 (but previously added to/associated with the device in device tracking database 54). Often times, the client model name as listed in client information (e.g., client EUM/MDM 26) is automatically populated and does not reflect the model name that client 12 prefers to use for the device. Thus, sub-process 124D provides an alternative model name (i.e., normalized model name) to refer to device(s) in device status information 28. However, sub-process 124D uses the client model name to match the device to the corresponding entry/ normalized model name in normalization override list 59A.

If the client model names do not match (e.g., the device client model name in device tracking database 54 does not match any client model names as listed with regards to entries in normalization override list 59A), phase 4/sub-process 124D is complete for that particular device and sub-process 124 can proceed to step 1614, which is the start of phase 5/sub-process 124E.

If the client model name associated with the device in device tracking database 54 is the same as any client model names listed with regards to any entries in normalization override list 59A, sub-process 124D can proceeds to steps 1604, 1605, 1613, and 1607.

Steps 1604, 1605, and 1607 in sub-process 124D are the same as previously described steps with the same reference number in previous sub-processes. Step 1604 can include updating/populating the normalized model name and the normalized model description for each matching device in device tracking database 54 with the corresponding normalized model name and normalized model description of the entry in normalization override list 59A to which the client model name matched. Then, step 1605 can be performed to update/populate the device image link for each matching device in device tracking database 54 with the corresponding normalized image link of the entry in normalization override list 59A to which the client model name matched. Third, step 1613 can be performed, which is to update/ populate the model normalization status for each matching device in device tracking database 54 to indicate that the model name override was by client model name in the normalization override list. As with step 1606 above with regards to sub-process 124A, step 1613 can provide insight in further evaluations and/or further performances of sub-process 124 as to how the respective devices were provided with their corresponding normalized model name. Fourth, sub-process 124D (phase 4) can include step 1607, which can include generating and/or updating a summary of the device normalization analysis as described above.

Back to step 1612, if the client model name for the device in device tracking database 54 does not match any of the client model names listed with regards to entries in normalization override list 59A, phase 4/sub-process 124D is complete for the device and sub-process 124 can proceed to step 1614, which is the beginning of phase 5/sub-process 124E.

Step 1614 of sub-process 124E can include comparing the device provider model description as listed in device tracking database 54 to the provider model description as listed in normalization override list 59A. In step 1614, the normalization category is provider model description. The provider model description as listed in device tracking database 54 can be the device description for the device as set out in inventory information 57 (but previously added to/associated with the device in device tracking database 54). Often times, the device description as automatically populated in provider ERP 22 and can include the device model name, but also likely includes a lot of additional information regarding the device specifications, model year, etc. The entirety of the device description may not be suitable for use as the device model name, but can be used to match the device in device tracking database 54 to the corresponding entry/normalized model name in normalization override list 59A.

If the provider model descriptions do not match (e.g., the device provider model description in device tracking database 54 does not match any provider model descriptions as listed with regards to entries in normalization override list 59A), phase 5/sub-process 124E is complete for that particular device and sub-process 124 can proceed to step 1616, which is the start of phase 6/sub-process 124F.

If the provider model description associated with the device in device tracking database 54 is the same as any provider model descriptions listed with regards to any entries in normalization override list 59A, sub-process 124E can proceeds to steps 1604, 1605, 1615, and 1607.

Steps 1604, 1605, and 1607 in sub-process 124E are the same as previously described steps with the same reference number in previous sub-processes. Step 1604 can include updating/populating the normalized model name and the normalized model description for each matching device in device tracking database 54 with the corresponding normalized model name and normalized model description of the entry in normalization override list 59A to which the provider model description matched. Then, step 1605 can be performed to update/populate the device image link for each matching device in device tracking database 54 with the corresponding normalized image link of the entry in normalization override list 59A to which the provider model description matched. Third, step 1615 can then be performed, which is to update/populate the model normalization status for each matching device in device tracking database 54 to indicate that the model name override was by provider model description in the normalization override list. As with step 1606 above with regards to sub-process 124A, step 1615 can provide insight in further evaluations and/or further performances of sub-process 124 as to how the respective devices were provided with their corresponding normalized model name. Fourth, sub-process 124E (phase 5) can include step 1607, which can include generating and/or updating a summary of the device normalization analysis as described above.

Back to step 1614, if the provider model description for the device in device tracking database 54 does not match any of the provider model descriptions listed with regards to entries in normalization override list 59A, phase 5/sub-process 124E is complete for the device and sub-process 124 can proceed to step 1616, which is the beginning of phase 6/sub-process 124F.

Phases 6 and 7 (sub-processes 124F and 124G, respectively) do not use normalization override list 59A and instead use product content database 59B to populate the normalized model name and/or normalized model description for the respective/applicable devices in device tracking database 54.

Step 1616 of sub-process 124F includes identifying if phase 6 is applicable by determining: 1) whether the model normalization status for the device in device tracking database 54 is blank (i.e., is not populated such that device normalization analysis has not been performed on that device); 2) whether the model normalization status for the device in device tracking database 54 indicates that an override was performed by client model name (e.g., the device normalization analysis was performed via phase 8 on a prior iteration of sub-process 124); or 3) whether the model normalization status for the device in device tracking database 54 indicates that an override was performed by provider model description (e.g., the device normalization analysis was performed via phase 9 on a prior iteration of sub-process 124). If, in step 1616, the model normalization status is not blank, does not indicate that the normalization override was performed by client model name (phase 8), and does not indicate that the normalization override was performed by provider model description (phase 9), phase 6/sub-process 124F, as well as phase 7/sub-process 124G, is complete for that particular device and sub-process 124 can proceed to step 1623, which is the beginning of phase 8/sub-process 124H shown in FIG. 16C.

If, in step 1616, the model normalization status is blank, indicates that the normalization override was performed by client model name (phase 8), or indicates that the normalization override was performed by provider model description (phase 9), sub-process 124F can proceed to step 1617.

Step 1617 can include comparing the device provider part number and/or the manufacturer part number as listed in device tracking database 54 to the product part number as set out in product content database 59B. Step 1617 can also include searching and/or otherwise accessing product content database 59B. Details regarding product content database 59B are described above with regards to the information in storage media 52 of system 20 and the capabilities, configurations, etc. of normalization module 78. If neither the provider part number nor the manufacturer part number of the device in device tracking database 54 match any of the product part numbers in product content database 59B, phase 6/sub-process 124F is complete for that particular device and sub-process 124 can proceed to step 1621, which is the beginning of phase 7/sub-process 124G.

If the provider part number or the manufacturer part number of the device in device tracking database 54 match any of the product part numbers in product content database 59B, sub-process 124F can proceed to steps 1618, 1619, 1620, and 1607.

Step 1618 includes, similar to step 1604 with regards to sub-processes 124A-124E, updating/populating the normalized model name and/or normalized model description for each matching device in device tracking database 54 with the corresponding model name and model description for the product with the matching part number in product content database 59B. Then, step 1619 can be performed to update/populate the device image link for each matching device in device tracking database 54 with the corresponding image link for the product with the matching part number in product content database 59B. Third, step 1620 can be performed to update/populate the model normalization status for each matching device in device tracking database 54 to indicate that the model name override was by provider part number in the product content database. As with step 1606 above with regards to sub-process 124A, step 1620 can provide insight in further evaluations and/or further performances of sub-process 124 as to how the respective devices were provided with their corresponding normalized model name. Fourth, sub-process 124F can include step 1607, which is the same as step 1607 in sub-processes 124A-124E. Step 1607 can include generating and/or updating a summary of the device normalization analysis as described above.

Back to step 1617, if neither the provider part number nor the manufacturer part number of the device in device tracking database 54 match any of the product part numbers in product content database 59B, phase 6/sub-process 124F is complete for that particular device and sub-process 124 can proceed to step 1621, which is the beginning of phase 7/sub-process 124G.

Step 1621 of sub-process 124G can include comparing the device historical part numbers as listed in device tracking database 54 to the product part number as listed in product content database 59B. The historical part numbers for the device are those described with regards to step 1610 and sub-process 124C (phase 3). The historical part numbers for the device are any prior/past part numbers that were formerly used to designate the device. The historical part numbers can be listed for each device in device tracking database 54. However, in some configurations/examples, the historical part numbers "box" is not populated except if phase 3 (sub-process 124C) or phase 7 (sub-process 124G) is performed on the device. In that case, those sub-processes can include accessing provider ERP 22 to obtain the historical part numbers for the corresponding device and then populating/adding that information (e.g., the historical part numbers) to device tracking database 54 for that device. The comparison in step 1621 is similar to the comparison in step 1617 of phase 6, except that in step 1621 the past/historical part numbers for the device in device tracking database 54 are compared (e.g., searched) to the product part number set out in product content database 59B. Step 1621 can also include searching and/or otherwise accessing product content database 59B. If none of the historical part numbers of the device in device tracking database 54 do not match any of the product part numbers in product content database 59B, phase 7/sub-process 124G is complete for that particular device and sub-process 124 can proceed to step 1623, which is the beginning of phase 8/sub-process 124H.

If any of the historical part numbers of the device in device tracking database 54 match any of the product part numbers in product content database 59B, sub-process 124G can proceed to steps 1618, 1619, 1622, and 1607.

Step 1618 includes, similar to step 1604 with regards to sub-processes 124A-124E, updating/populating the normalized model name and/or normalized model description for each matching device in device tracking database 54 with the corresponding model name and model description for the product with the matching part number in product content database 59B. Then, step 1619 can be performed to update/populate the device image link for each matching device in device tracking database 54 with the corresponding image link for the product with the matching part number in product content database 59B. Third, step 1622 can be performed to update/populate the model normalization status for each matching device in device tracking database 54 to indicate that the model name override was by historical part number in the product content database. As with step 1606 above with regards to sub-process 124A, step 1622 can provide insight in further evaluations and/or further performances of sub-process 124 as to how the respective devices were provided with their corresponding normalized model name. Fourth, sub-process 124G can include step 1607, which is the same as step 1607 in sub-processes 124A-124F. Step 1607 can include generating and/or updating a summary of the device normalization analysis as described above.

Back to step 1621, if none of the historical part numbers of the device in device tracking database 54 match any of the product part numbers in product content database 59B, phase 7/sub-process 124G is complete for that particular device and sub-process 124 can proceed to step 1623, which is the beginning of phase 8/sub-process 124H shown in FIG. 16D.

Phases 8 and 9 (sub-processes 124H and 124I, respectively) do not use normalization override list 59A or product content database 59B and instead use information from client information 32 (use client model name in phase 8) or inventory information 57 (use provider model description in phase 9) to populate the normalized model name and/or normalization model description for the respective/applicable devices in device tracking database 54. While this information can originate from client information 32 and/or inventory information 57, the information as used in phases 8 and 9 can be included in device tracking database 54 (e.g., were added to device tracking database 54 upon access/reception of the information by system 20). Sub-processes 124H and 124I can be relied on in device normalization sub-process 124 to ensure that the normalized model name for each device in device tracking database 54 is not blank at the completion of sub-process 124. While described above as being able to be performed in any order, it may be desired to first populate the normalized model name with the client model name and, if that is not possible, then populate the normalized model name with the provider model description. Thus, it may be desired to perform phase 8 before phase 9, though other configurations of sub-process 124 can perform phases 1-9 in any order.

Step 1623 of sub-process 124H includes identifying if phase 8 is applicable by determining whether the model normalization status for the device in device tracking database 54 is blank (e.g., is not populated such that device normalization analysis has not been performed on that device) or indicates that an override was performed by provider model description (e.g., the device normalization analysis was performed via phase 9 on a prior iteration of sub-process 124). If, in step 1623, the model normalization status is not blank and does not indicate that the normalization override was by provider model description (phase 9), phase 8/sub-process 124H is complete for that particular device and sub-process 124 can proceed to step 1627, which is the beginning of phase 9/sub-process 124I.

If, in step 1623, the model normalization status is blank or indicates that the normalization override was by provider model description (phase 9), sub-process 124H can proceed to step 1624.

Step 1624 is a check as to whether device tracking database 54 includes the necessary information for sub-process 124H to be performed. Thus, step 1624 identifies whether the device information for the device in device tracking database 54 includes a client model name. If not, sub-process 124H cannot be performed (i.e., sub-process 124H cannot populate the normalized model name with the client model name if there no client model name is available), and sub-process 124H is complete for that particular device. Therefore, sub-process 124 can proceed to step 1627, which is the beginning of phase 9/sub-process 124I.

If the device information for the device in device tracking database 54 includes a client model name, sub-process 124H can proceed to steps 1625, 1626, and 1607.

Step 1625 includes updating/populating the normalized model name for each applicable device in device tracking database 54 with the corresponding client model name associated with that device in device tracking database 54. Then, step 1626 can be performed to update/populate the model normalization status for each applicable device in device tracking database 54 to indicate that the model name override was by client model name. As with similar steps above with regards to the other sub-processes/phases of sub-process 124, step 1626 can provide insight in further evaluations and/or further performances of sub-process 124 as to how the respective devices were provided with their corresponding normalized model name. Third, sub-process 124H can include step 1607, which is the same as step 1607 in sub-processes 124A-124G. Step 1607 can include generating and/or updating a summary of the device normalization analysis as described above.

Back to step 1624, if the device information in device tracking database 54 does not include a client model name, phase 8/sub-process 124H is complete for that particular device and sub-process 124 can proceed to step 1627, which is the beginning of phase 9/sub-process 124I.

Step 1627 of sub-process 124I includes identifying if phase 9 is applicable by determining whether the normalized model name for the device in device tracking database 54 is blank (e.g., is not populated such that device normalization analysis has not been performed on that device). If, in step 1627, the normalized model name is not blank, phase 9/sub-process 124I is complete for that particular device (as the normalized model name has already been determined in process 124) and sub-process 124 can proceed to step 1607, which is to generate/update a summary of the device normalization analysis to include, for example, information regarding devices for which a normalized model name was not determined during sub-process 124.

If, in step 1627, the normalized model name is blank, sub-process 124I can proceed to step 1628 to check whether device tracking database 54 includes the necessary information for sub-process 124I to be performed. Thus, step 1628 identifies whether the device information for the device in device tracking database 54 includes a provider model description. If not, sub-process 124I cannot be performed (i.e., sub-process 124I cannot populate the normalized model name with the provider model description if there no provider model description is available), and sub-process 124I is complete for that particular device. Therefore, sub-process 124 can proceed to step 1607, which is to generate/update a summary of the device normalization analysis to include, for example, information regarding devices for which a normalized model name was not determined.

If the device information for the device in device tracking database 54 includes a provider model description, sub-process 124I can proceed to steps 1629, 1630, and 1607.

Step 1629 includes updating/populating the normalized model name for each applicable device in device tracking database 54 with the corresponding provider model description associated with that device in device tracking database 54. Further, step 1629 can also include updating/populating the normalized model description for each applicable device in device tracking database 54 with the corresponding provider model description associated with that device in device tracking database 54 (so thus the normalized model name and the normalized model description are the same). Then, step 1630 can be performed to update/populate the model normalization status for each applicable device in device tracking database 54 to indicate that the model name override was by provider model description. As with similar steps above with regards to the other sub-processes/phases of sub-process 124, step 1630 can provide insight in further evaluations and/or further performances of sub-process 124 as to how the respective devices were provided with their corresponding normalized model name. Third, sub-process 124I can include step 1607, which is the same as step 1607 in sub-processes 124A-124H. Step 1607 can include generating and/or updating a summary of the device normalization analysis as described above.

After sub-process 124I (phase 9), sub-process 124 is complete such that the model normalization analysis is complete for all applicable devices and/or all applicable entries/normalized model names in normalization override list 59A. For the devices upon which any of phases 1-9 (sub-processes 124A-124I, respectively) are performed, process 100 may not be complete and the other steps/sub-processes of process 100 may need to be performed.

Process 100 can include sub-process 126, which is electronically/digitally communicating/transmitting device status information 28 and/or attachments/files 30 to client 12. Sub-process 126 is shown in FIG. 17, which is an example sub-process for transmitting device status information 28. Sub-process 126 can be performed at any time with regards to the other steps/sub-processes of process 100 to provide device status information 28 for any number of devices and at any point before, during, and/or after the evaluations of the device statuses. However, in one example/configuration, sub-process 126 is performed at the end of process 100 after all device statuses have been determined. While described herein as being performed by transmission module 82, sub-process 126 can be performed by any systems, components, and/or modules capable of performing the disclosed tasks.

Sub-process 126 can be performed, for example, on one, multiple, or all devices found in device tracking database 54 (and/or for those devices that are not in a hidden excluded state as determined/set out in exclusion list 36 and/or 56). Sub-process 126 can be configured to automatically transmit device status information 28 (and/or attachments/files 30) to client 12 in response to, for example, the completion of one, multiple, or all steps/sub-processes in process 100. Additionally and/or alternatively, the transmission of device status information 28 and/or attachments/files 30 in sub-process 126 can be performed via any communication methods, include through the use of an API. Further, sub-process 126 can be performed multiple times to provide any portion of device status information 28 to client 12 at any time. In one example, one portion/subset/summary of device status information 28 is provided to client regularly and the entirety of device status information 28 is provided to client 12 less often (e.g., the subset/summary is provided daily while the entirety of the information in device status information 28 is provided once per week).

Sub-process 126 can begin with step 1702, which identifying which device status information 28 to provide to client 12. Step 1702 can include determining whether client 12 wants device status information 28 regarding all devices in device tracking database 54, only the devices that have current statuses that have changed since the last transmission of device status information 28, and/or another set of device status information 28 (and/or the categories of information for each device to provide to client 12). The information to provide can be made by client 12 and can be changed as desired. In other configurations, step 1702 can be performed in advance of sub-process 126 and sub-process 126 can proceed to step 1704 by referring to the previous determination made by client 12. Further, step 1702 can include setting up and/or otherwise determining the physical and/or electronic/digital location to which device status information 28 is to be provided. For example, this could be one or multiple email addresses, endpoints of client 12, profiles on client systems 24, and/or other locations. As mentioned above, which information for each device and/or the devices for which to provide information to client 12 can change from transmission to transmission as desired by client 12.

Next, sub-process 126 can include step 1704, which is dividing device status information 28 into discrete chunks/batches (with each batch/chunk including device status information and associated information for multiple devices). The batches/chunks can include, for example, device status information 28 and/or other relevant information with regards to fifty devices. In other examples, the batches/chunks include information associated with less than fifty devices and/or information associated with more than fifty devices. In additional examples, the number of devices (e.g., information associated with each device) in each batch/chunk can vary and is dependent upon a variety of factors, including the allowable transmission size. Step 1704 can include automatically generating the batches depending on, for example, the available transmission size, the size of the device status information 28, and/or other factors.

Next, sub-process 126 can include step 1706, which is electronically transmitting each separate/discrete chunk/batch to client 12 to, for example, update/generate a database, table, list, etc. that includes the recently transmitted device status information 28. This database, table, list, etc. can be similar to device tracking database 54. In another example, step 1706 can include electronically transmitting all requested/relevant device status information at one time and/or over a short period of time. Step 1706 can include automatically transmitting/communicating the desired information to client 12 in response to, for example, the completion of the determinations of device statuses in the other steps/sub-processes of process 100. In other configurations, step 1706 can include transmitting the desired information in response to other events, such as according to a transmission schedule (at designated and/or periodic intervals), as requested by client 12, and/or upon the completion of other tasks. The transmission/communication of device status information 28 and/or other information can be via any communication methods, including via one or multiple emails, via providing access to the information by client 12 (e.g., as stored in storage media 52 and/or located at another location), via the use of an API, and/or via other methods.

Sub-process 126 can proceed to step 1707, which is to generate an alert if any of the transmissions/communications of device status information 28 (and/or other relevant information, such as attachments/files 30) fail. Step 1707 can notify the operator/user of the failure so that the operator/user can investigate the failure and retransmit the information.

Step 1708 can be performed to determine if there are any attachments/files 30 that should be electronically transmitted to client 12. These attachments/files 30 can include any additional information, documents, etc. relevant to the devices of client 12. In one example, attachments/files 30 are certificates of wipe, recycling, and/or sale as provided by disposal vendor 16 regarding the retirement of devices owned by client 12. Step 1708 can be performed by reviewing the device details/information in device tracking database 54 to determine if there is an indication that the device has one or more associated attachments/files. This information can be added to device tracking database during step 903 of sub-process 110, which includes indicating, for the device in device tracking database 54, that a corresponding certificate is saved in storage media 52 (or at another location). The attachment information in device tracking database 54 can include details regarding when the attachment/file was saved, the file name of the attachment/file, and/or the location at which the attachment/file is saved, which can aid system 20 in determining whether to transmit the attachment/file 30. If there are no attachments/files 30 that are to be provided/transmitted to client 12, transmission of device status information 28 is complete and sub-process 126 is finished (step 1710).

If there are attachments/files 30 that are to be provided/transmitted to client 12, sub-process 122 can proceed to step 1712, which is to retrieve the attachments/files from the location to which the attachments/files were saved (in step 902 of sub-process 110). Then, sub-process 126 can include step 1714, which is calling client 12 to determine the endpoint(s) of client 12 to which the attachments/files are to be sent/provided. The client endpoint as called in step 1714 can also be determined in, for example, step 1702 to determine the necessary connection/transmission information to transmit device status information 28 and/or attachments/files 30 (as well as other relevant information).

Then, when the location (e.g., endpoint(s)) to which attachments/files 30 are to be sent/provided is determined and/or accessed, sub-process 126 can include step 1716. Step 1716 can be similar to step 1704 and can include dividing the attachments/files for the relevant devices into discrete chunks/batches (with each batch/chunk including attachments/files 30 associated with multiple devices). In other examples, the batches/chunks include attachments/files 30 associated with less than fifty devices and/or information associated with more than fifty devices. In additional examples, the number of devices (e.g., attachments/files 30 associated with each device) in each batch/chunk can vary and is dependent upon a variety of factors, including the allowable transmission size. Step 1704 can include automatically generating the batches/chunks depending on, for example, the available transmission size, the size of the attachments/files, and/or other factors. In some examples, step 1716 may not be performed and each attachment/file is provided to client 12 separately and/or the entirety of the attachments/files are provided to client 12 in one electronic communication.

Next, sub-process 126 can include step 1718, which is electronically transmitting the attachments/files to client 12. Step 1718 can include automatically transmitting/communicating the attachments/files 30 to client 12 in response to, for example, the transmission of the device status information 30 to client 12, the completion of the determinations of device statuses in the other steps/sub-processes of process 100, and/or the reception of attachments/files 30 from, for example, disposal vendor 16. In other configurations, step 1718 can include transmitting the attachments/files in response to other events, such as according to a transmission schedule (at designated and/or periodic intervals), as requested by client 12, and/or upon the completion of other tasks. The transmission/communication of attachments/files can be via any communication methods, including via one or multiple emails, via providing access to the information by client 12 (e.g., as stored in storage media 52 and/or located at another location), via the use of an API, and/or via other methods.

After and/or during transmission of attachments/files 30 to client 12, sub-process 126 can include step 1707 as described above, which is to generate an alert if any of the transmissions/communications of attachments/files 30 (and/or other relevant information) fails. Step 1707 can notify the operator/user of the failure so that the operator/user can investigate the failure and retransmit the information.

Sub-process 126 can include other capabilities, configurations, and/or functionalities not expressly disclosed herein for providing access to device status information 28, attachments/files 30, and/or other relevant information by client 12. For example, sub-process 126 can include filtering, conditioning, and/or otherwise formatting device status information 28, attachments/files 30, and/or other relevant information for transmission to client 12 and/or to improve readability, understanding, and/or use by client 12. In another example, sub-process 126 can include automatically generating a summary of device status information 28, of device tracking database 54, and/or other relevant information and transmitting that summary to client 12.

As described above, process 100 is shown and described herein as one example of determining device statuses 44 and reporting those device statuses to client 12. Process 100 can include other configurations, organizations, capabilities, functionalities, and/or characteristics. In one example, process 100 is performed for one client 12 having thousands of devices. Process 100 can be performed periodically, such as each night, on the thousands of devices for client 12. Additionally and/or alternatively, process 100 can be initiated automatically, and one, multiple, or all steps/sub-processes of process 100 can be performed automatically.

For example, process 100 can be performed as follows: step 102 is performed either before all of sub-processes 104-124 are performed, or a portion of step 102 is performed before each sub-process 104-124 to access/receive the information necessary to perform that particular sub-process. Then, for example, sub-process 104 is performed concurrently and/or within a designated period of time on all relevant devices of the thousands of devices. In this example, sub-process 104 is performed on all relevant devices of the thousands of devices beginning at midnight and being completed by at least 12:30 am, if not sooner. Then, in this example, sub-process 106 is performed concurrently and/or within a designated period of time on all relevant devices of the thousands of devices (beginning at 12:30 am and being completed by at least 1:00 am, if not sooner). Then, in this example, sub-process 108 is performed concurrently and/or within a designated period of time on all relevant devices of the thousands of device (beginning at 1:00 am and being completed by at least 1:30 am, if not sooner). The performance of process 100, in this example, can proceed accordingly with each sub-process being performed concurrently and/or within a designated period of time on all relevant devices of the thousands of devices with the sub-process beginning after a preceding sub-process is completed and before a subsequent sub-process begins.

The capabilities of process 100, and system 20, to perform the device status determinations for all devices for each sub-process within a short period of time allows for subsequent sub-processes, which may rely on the device status as determined in a preceding sub-process (and recorded/updated in device tracking database 54), to correctly determine the appropriate device status based upon accurate information (that may have been determined in preceding sub-processes). If process 100 and/or the sub-processes were to take longer than a few hours, the information and/or device statuses as determined in preceding sub-processes may become obsolete (e.g., outdated) so that device status determinations in subsequent sub-processes of process 100 may be incorrect due to their reliance on now obsolete/inaccurate information and/or device statuses.

System 20 and process 100 can perform the process (and, in turn, each sub-process) quickly because each sub-process is divided into simple, discrete evaluations/steps that can be performed quickly and efficiently for thousands of devices. Additionally, system 20 and process 100 can perform process/sub-processes quickly due to their ability to access information from a variety of sources automatically and quickly. Thus, system 20 and process 100 can gather information, evaluate that information, determine device statuses via a number of discrete evaluations/steps, and provide the device statuses to client 12 without extensive resources (e.g., computing resources) and over a short amount of time.

Further, because system 20 and/or process 100 may be reliant on the device status change and the determination of whether that status change is allowable, unusual, or prohibited, any failure to determine and/or delay in determining intervening device statuses (due to obsolete/outdated information because process 100 took too long to be completed/performed) can result in a device status being incorrectly allowed or prevented.

For example, process 100 can determine that device 1 has a device status of In Stock Available. Then, in this example, device 1 is shipped to client 12 and client 12 begins using device 12 (by connecting device 1 to client systems 24), thus establishing a device status of In Use Active. However, in a configuration in which process 100 and/or system 20 takes too long to determine the intervening device status for device 1 (which is In Transit Shipped) and instead skips to determining a device status for device 1 of In Use Active, process 100 and/or system 20 would determine that the status change from In Stock Available to In Use Active is prohibited and prevent the device status from being updated to In Use Active. Rather, in a properly functioning process 100 and/or system 20 that can perform the device status determinations for thousands of devices over a short amount of time, process 100 and/or system 20 determines, after the device status for device 1 is In Stock Available, that the next device status is In Transit Shipped. This device status change is an allowable status change so the device status would be updated to In Transit Shipped. Then, when client 12 receives device 1 and connects device 1 to client systems 24, process 100 and/or system 20 determines that the device status is In Use Active. Because a status change from In Transit Shipped to In Use Active is an allowable status change, process 100 and/or system 20 correctly updates the status to be In Use Active. Thus, it may be very important for process 100 and/or system 20 to make the determinations for thousands of devices over a short amount of time.

Process 100, and system 20, can be configured to perform the device status evaluations/determinations for hundreds or more clients 12 each having thousands of devices. In such a situation, each of the sub-processes of process 100 can be performed for all devices for all clients first before the subsequent sub-process is performed for all devices for all clients. Alternatively, process 100 can be performed in its entirety for one client before being performed in its entirety for another client, or process 100 can be performed for one client concurrent with the performance of process 100 for another client.

A method of tracking multiple electronic devices with each capable of having one of multiple statuses can include accessing first information regarding the multiple electronic devices, the first information including a connection state for a first plurality of electronic devices of the multiple electronic devices representative of a most recent timestamp that each of the first plurality of electronic devices was active, each respective timestamp being established during a most recent electronic communication of the respective one of the first plurality of electronic devices. The method can further include concurrently determining, by a computer processor, a first status for each respective electronic device of the multiple electronic devices dependent upon the first information; assigning the first status as a current status for each of the multiple devices in a device tracking database; and accessing second information regarding the multiple electronic devices, the second information including the connection state for a second plurality of electronic devices of the multiple electronic devices. The method can also include concurrently determining, by the computer processor, a second status for each of the multiple electronic devices dependent upon the second information; automatically determining, by the computer processor, a status change representative of a change of the status from the current status to the second status for each electronic device of the multiple electronic devices; automatically preventing, by the computer processor, the status change from the current status to the second status for each electronic device for which the first status and the second status are determined in response to the status change being a prohibited status change, such that the current status for each applicable electronic device in the device tracking database remains the first status; and automatically updating the current status, by the computer processor, for each of the multiple electronic devices in the device tracking database with the second status in response to the status change being an allowable status change.

The method of the preceding paragraph can optionally include, additionally and/or alternatively, any one or more of the following features, configurations, steps, and/or components:

The method of the preceding paragraphs can include that the first status and the second status are each one of the following: In Stock Available, In Stock Unavailable, In Stock Pending Disposal, In Transit Shipped, In Transit Delivered, In Transit Exception, In Transit Returning, In Transit Delayed Return, In Use Active, In Use Attention Required, Retired Disposed, Retired Sold, Retired Lease End, Retired Vendor Credit, Missing Lost, and Missing Stolen.

The method of the preceding paragraphs can include that the prohibited status change is one of the following: from In Stock Available to In Transit Returning, from In Stock Available to In Use Active, from In Stock Available to In Use Attention Required, from In Stock Available to Missing Lost, from In Stock Available to Missing Stolen, from In Stock Unavailable to In Transit Returning, from In Stock Unavailable to In Use Active, from In Stock Unavailable to In Use Attention Required, from In Stock Unavailable to Missing Lost, from In Stock Unavailable to Missing Stolen, from In Stock Pending Disposal to In Transit Returning, from In Stock Pending Disposal to In Use Active, from In Stock Pending Disposal to In Use Attention Required, from In Stock Pending Disposal to Missing Lost, from In Stock Pending Disposal to Missing Stolen, from In Transit Returning to In Transit Shipped, and from In Transit Returning to In Use Active, from In Transit Returning to In Use Attention Required, from In Transit Delayed Return to In Transit Shipped, from In Transit Delayed Return to In Use Active, from In Transit Delayed Return to In Use Attention Required, from Retired Disposed to any other status, from Retired Sold to any other status, from Retired Lease End to any other status, from Retired Vendor Credit to any other status, from Missing Lost to Missing Stolen, and from Missing Stolen to Missing Lost.

The method of the preceding paragraph can include automatically generating an alert, by the computer processor, in response to the status change being an unusual status change.

The method of the preceding paragraph can include that the unusual status change is one of the following: from In Stock Available to Retired Disposed, from In Stock Available to Retired Sold, from In Stock Available to Retired Lease End, from In Stock Unavailable to Retired Disposed, from In Stock Unavailable to Retired Sold, from In Stock Unavailable to Retired Lease End, from In Stock Pending Disposal to In Transit Shipped, from In Transit Shipped to In Stock Pending Disposal, from In Transit Shipped to Retired Disposed, from In Transit Shipped to Retired Sold, from In Transit Shipped to Retired Lease End, from In Transit Delivered to In Stock Available, from In Transit Delivered to In Stock Unavailable, from In Transit Delivered to In Stock Pending Disposal, from In Transit Delivered to Retired Disposed, from in stock delivered to Retired Sold, from In Transit Delivered to Retired Lease End, from In Transit Exception to Retired Disposed, from In Transit Exception to Retired Sold, from In Transit Exception to Retired Lease End, from In Transit Returning to Retired Disposed, from In Transit Returning to Retired Sold, from In Transit Delayed Return to Retired Disposed, from In Transit Delayed Return to Retired Sold, from In Use Active to Retired Disposed, from In Use Active to Retired Sold, from In Use Attention Required to Retired Disposed, from In Use Attention Required to Retired Sold, from Missing Lost to In Stock Available, from Missing Lost to In Stock Unavailable, from Missing Lost to In Stock Pending Disposal, from Missing Lost to Retired Disposed, from Missing Lost to Retired Sold, from Missing Lost to Retired Lease End, from Missing Lost to Retired Vendor Credit, from Missing Stolen to In Stock Available, from Missing Stolen to In Stock Unavailable, from Missing Stolen to In Stock Pending Disposal, from Missing Stolen to Retired Disposed, from Missing Stolen to Retired Sold, from Missing Stolen to Retired Lease End, and from Missing Stolen to Retired Vendor Credit.

The method of the preceding paragraphs can include automatically updating the current status, by the computer processor, for each of the multiple devices in the device tracking database with the second status in response to the status change being an unusual status change.

The method of the preceding paragraphs can include that the step of determining the status change includes determining whether the status change is one of the allowable status change, the prohibited status change, and the unusual status change.

The method of the preceding paragraphs can include monitoring electrical transmissions of each electronic device of the first plurality of electronic devices to determine the most recent timestamp representative of the electronic activity of each electronic device of the first plurality of electronic devices.

The method of the preceding paragraphs can include that the step of accessing first information further comprises requesting the first information via an electronic transmission and receiving at least a portion of the first information in response to the request.

The method of the preceding paragraphs can include that requesting the first information includes implementing an application programming interface to format and transmit the request.

The method of the preceding paragraphs can include that the first plurality of electronic devices is different from the second plurality of electronic devices.

The method of the preceding paragraphs can include that the steps of accessing the first information and accessing the second information includes accessing at least one of the following: an enterprise resource planning (ERP) system of a client for which the multiple electronic devices are tracked, a unified endpoint management (UEM) system of the client for which the multiple electronic devices are tracked, and a mobile device management (MDM) system of the client for which the multiple electronic devices are tracked.

The method of the preceding paragraphs can include accessing third information regarding the multiple electronic devices, determining a third status for each applicable electronic device of the multiple electronic devices dependent upon the third information, automatically determining the status change representative of the change of the status from the current status to the third status for each electronic device of the multiple electronic devices, and reperforming the preventing and updating steps with regards to the new status change.

The method of the preceding paragraphs can include that the third information is ascertained from one of a disposal vendor and a shipping provider.

The method of the preceding paragraphs can include that the step of accessing third information comprises requesting the third information via an electronic transmission and receiving at least a portion of the third information in response to the request.

The method of the preceding paragraphs can include that the steps of requesting the third information are performed by an application programming interface.

The method of the preceding paragraphs can include that the steps of accessing the first information and determining the first status are performed at regularly scheduled intervals.

The method of the preceding paragraphs can include that the steps of accessing the second information, determining the second status, and determining the status change are performed for at least one thousand electronic devices of the multiple electronic devices.

The method of the preceding paragraphs can include that the steps of accessing the second information, determining the second status, and determining the status change are performed for the at least one thousand electronic devices collectively in less than two hours.

The method of the preceding paragraphs can include providing device status information for the multiple electronic devices dependent upon the device tracking database, via at least one electronic transmission, to a client for which the multiple electronic devices are tracked.

A system for tracking multiple electronic devices, each capable of having one of multiple statuses, can include a device tracking database that includes a current status for each of the multiple devices; external information regarding the multiple electronic devices, the external information including a connection state for a plurality of electronic devices of the multiple electronic devices representative of a most recent timestamp that each of the plurality of electronic devices was active; and a computer processor in electronic communication with the external information and device tracking database. The computer processor is configured to access the external information and concurrently identify, for at least a portion of the multiple electronic devices, a pending status dependent upon the external information; automatically and concurrently determine, for at least a portion of the multiple electronic devices for which the current status and the pending status are identified, a status change representative of a change of the status from the current status to the pending status for each electronic device of the multiple electronic devices; automatically prevent the status change in the device tracking database from the current status to the pending status in response to the status change being a prohibited status change such that the current status for each applicable electronic device in the device tracking database remains unchanged; and automatically update the current status for at least a portion of the multiple electronic devices in the device tracking database with the pending status in response to the status change being an allowable status change. The system can further include a transmission module in communication with the device tracking database and configured to provide, via electronic transmission, device status information for the multiple electronic devices to a client for which the multiple electronic devices are tracked, the device status information being dependent upon the device tracking database.

The system of the preceding paragraph can optionally include, additionally and/or alternatively, any one or more of the following features, configurations, steps, and/or components:

The system of the preceding paragraphs can include that the transmission module is configured to automatically divide the device status information into batches that are provided to the client in separate transmissions.

The system of the preceding paragraphs can include that each batch includes device status information for at least fifty electronic devices of the multiple electronic devices.

The system of the preceding paragraphs can include that the transmission module provides, via electronic transmission, at least one digital document associated with the device status information of the multiple electronic devices to the client.

The system of the preceding paragraphs can include that the at least one digital document is one of a certificate of wipe and a certificate of sale associated with a disposal of an electronic device of the multiple electronic devices.

The system of the preceding paragraphs can include a current exclusion list within the external information that includes a list of electronic devices of the multiple electronic devices that are to be excluded from the device status information provided to the client; a previous exclusion list that includes a previous list of electronic devices that were to be excluded from a previous version of the device status information provided to the client; and an exclusion and asset existence (EAE) module in electronic communication with the current exclusion list, the previous exclusion list, and the device tracking database with the EAE module being configured to compare the current exclusion list to the previous exclusion list and update the device tracking database to reflect changes.

The system of the preceding paragraphs can include that the EAE module is configured to compare each electronic device present in the external information to the device tracking database and, in response to the electronic device being missing from the tracking database, generate an alert to a tracking service provider of the device tracking database of a potential error.

The system of the preceding paragraphs can include a lost-stolen-missing (LSM) module in electronic communication with the external information and the device tracking database with the LSM module being configured to identify any electronic devices of the multiple electronic devices that have a pending status of one of Missing Lost and Missing Stolen dependent upon the external information.

The system of the preceding paragraphs can include that the LSM module includes the computer processor.

The system of the preceding paragraphs can include a disposal module in electronic communication with the external information and the device tracking database with the disposal module being configured to determine the pending status of each electronic device of the multiple electronic devices, dependent upon disposal details in the external information, that are present in the disposal details.

The system of the preceding paragraphs can include that the pending statuses dependent upon the disposal details are at least one of Retired Disposed and Retired Sold.

The system of the preceding paragraphs can include that the disposal details of the external information are received from a disposal vendor.

The system of the preceding paragraphs can include that the current status and the pending status for each electronic device of the multiple electronic devices are each one of the following: In Stock Available, In Stock Unavailable, In Stock Pending Disposal, In Transit Shipped, In Transit Delivered, In Transit Exception, In Transit Returning, In Transit Delayed Return, In Use Active, In Use Attention Required, Retired Disposed, Retired Sold, Retired Lease End, Retired Vendor Credit, Missing Lost, and Missing Stolen.

The system of the preceding paragraphs can include that the prohibited status change is one of the following: from In Stock Available to In Transit Returning, from In Stock Available to In Use Active, from In Stock Available to In Use Attention Required, from In Stock Available to Missing Lost, from In Stock Available to Missing Stolen, from In Stock Unavailable to In Transit Returning, from In Stock Unavailable to In Use Active, from In Stock Unavailable to In Use Attention Required, from In Stock Unavailable to Missing Lost, from In Stock Unavailable to Missing Stolen, from In Stock Pending Disposal to In Transit Returning, from In Stock Pending Disposal to In Use Active, from In Stock Pending Disposal to In Use Attention Required, from In Stock Pending Disposal to Missing Lost, from In Stock Pending Disposal to Missing Stolen, from In Transit Returning to In Transit Shipped, and from In Transit Returning to In Use Active, from In Transit Returning to In Use Attention Required, from In Transit Delayed Return to In Transit Shipped, from In Transit Delayed Return to In Use Active, from In Transit Delayed Return to In Use Attention Required, from Retired Disposed to any other status, from Retired Sold to any other status, from Retired Lease End to any other status, from Retired Vendor Credit to any other status, from Missing Lost to Missing Stolen, and from Missing Stolen to Missing Lost.

The system of the preceding paragraphs can include a communication module configured to automatically generate an alert in response to the status change being an unusual status change.

The system of the preceding paragraphs can include that the unusual status change is one of the following: from In Stock Available to Retired Disposed, from In Stock Available to Retired Sold, from In Stock Available to Retired Lease End, from In Stock Unavailable to Retired Disposed, from In Stock Unavailable to Retired Sold, from In Stock Unavailable to Retired Lease End, from In Stock Pending Disposal to In Transit Shipped, from In Transit Shipped to In Stock Pending Disposal, from In Transit Shipped to Retired Disposed, from In Transit Shipped to Retired Sold, from In Transit Shipped to Retired Lease End, from In Transit Delivered to In Stock Available, from In Transit Delivered to In Stock Unavailable, from In Transit Delivered to In Stock Pending Disposal, from In Transit Delivered to Retired Disposed, from in stock delivered to Retired Sold, from In Transit Delivered to Retired Lease End, from In Transit Exception to Retired Disposed, from In Transit Exception to Retired Sold, from In Transit Exception to Retired Lease End, from In Transit Returning to Retired Disposed, from In Transit Returning to Retired Sold, from In Transit Delayed Return to Retired Disposed, from In Transit Delayed Return to Retired Sold, from In Use Active to Retired Disposed, from In Use Active to Retired Sold, from In Use Attention Required to Retired Disposed, from In Use Attention Required to Retired Sold, from Missing Lost to In Stock Available, from Missing Lost to In Stock Unavailable, from Missing Lost to In Stock Pending Disposal, from Missing Lost to Retired Disposed, from Missing Lost to Retired Sold, from Missing Lost to Retired Lease End, from Missing Lost to Retired Vendor Credit, from Missing Stolen to In Stock Available, from Missing Stolen to In Stock Unavailable, from Missing Stolen to In Stock Pending Disposal, from Missing Stolen to Retired Disposed, from Missing Stolen to Retired Sold, from Missing Stolen to Retired Lease End, and from Missing Stolen to Retired Vendor Credit.

The system of the preceding paragraphs can include that the computer processor is configured to automatically update the current status for each of the multiple devices in the device tracking database with the pending status in response to the status change being an unusual status change.

The system of the preceding paragraphs can include that the multiple electronic devices include at least one thousand electronic devices and the computer processor automatically determines the status change, prevents the status change, and updates the current status for at least a majority of the multiple electronic devices.

The system of the preceding paragraphs can include that the computer processor automatically determines the status change, prevents the status change, and updates the current status for the majority of the at least one thousand electronic devices in less than two hours.

The system of the preceding paragraphs can include that the computer processor includes multiple computing components that are configured to operate in conjunction to perform determinations.

A method of determining statuses for electronic devices with each electronic device being capable of having one of multiple statuses can include obtaining a first portion of external information via electronic communication, the external information including at least one of client information, shipping information, lease information, disposal information, and inventory information regarding the electronic devices; concurrently, for at least a portion of the electronic devices and by a computer processor, determining a first status for each respective electronic device dependent upon the first portion of external information; obtaining a second portion of external information via electronic communication, the second portion of external information including at least client information having a device connection timestamp representative of a most recent time each electronic device of a subset of electronic devices established an electronic connection to a digital client communication system; concurrently, by the computer processor and for the subset of electronic devices for which the device connection timestamp is obtained, determining a second status for each respective electronic device dependent upon the second portion of external information, wherein the second status for each respective electronic device is representative of an electronic activity of the electronic device; and providing, to a client, a device status report that includes the first status for each respective electronic device for which the second status was not determined and the second status for each respective electronic device for which the second status was determined, wherein the device status report is electronically communicated to the client.

The method of the preceding paragraph can optionally include, additionally and/or alternatively, any one or more of the following features, configurations, steps, and/or components:

The method of the preceding paragraphs can include that the step of obtaining the first portion of external information further comprises accessing, by an application programming interface (API), at least a subset of the first portion of external information at a location distant from the computer processor.

The method of the preceding paragraphs can include that the API is configured to automatically access the subset of the first portion of external information periodically based upon a schedule.

The method of the preceding paragraphs can include that the second status for each respective device for which the device connection timestamp is obtained as determined by the computer processor is one of In Use Active and In Use Attention Required.

The method of the preceding paragraphs can include recording, after the determination of the first status, the first status for each respective electronic device in a device tracking database that includes the first status and additional electronic device information associated with the corresponding electronic device.

The method of the preceding paragraphs can include recording, after the determination of the second status, the second status in the device tracking database for each respective electronic device for which the second status was determined and for which the first status was not determined and replacing, after the determination of the second status, the first status with the second status in the device tracking database for each respective electronic device for which the first status and the second status were determined.

The method of the preceding paragraphs can include that the device status report provided to the client includes at least a portion of the device tracking database.

The method of the preceding paragraphs can include that the first portion of external information includes the shipping information and the step of determining the first status dependent upon the first portion of external information further comprises determining, dependent upon the shipping information in the first portion of external information, the first statuses for electronic devices that each have associated information that is present in the shipping information, wherein the first statuses dependent upon the shipping information are each one of In Transit Shipped, In Transit Delivered, In Transit Exception, In Transit Returning, and In Transit Delayed Return.

The method of the preceding paragraphs can include that the first portion of external information includes lease information and the step of determining the first status dependent upon the first portion of external information further comprises determining, dependent upon the lease information in the first portion of external information, the first statuses for electronic devices that are indicated as being returned to a lessor in the lease information, wherein the first statuses dependent upon the lease information are each Retired Lease End.

The method of the preceding paragraphs can include that the step of obtaining the first portion of external information further comprises receiving the lease information from the lessor in a comma-separated-values (CSV) file format.

The method of the preceding paragraphs can include that the first portion of external information includes the disposal information and the step of determining the first status dependent upon the first portion of external information further comprises determining, dependent upon the disposal information in the first portion of external information, the first statuses for electronic device that each have associated information that is present in the disposal information, wherein the first statuses dependent upon the disposal information are each one of Retired Disposed and Retired Sold.

The method of the preceding paragraphs can include receiving, from a disposal vendor, at least one digital document certifying that a specified respective electronic device has been one of wiped and sold and providing, to the client, the at least one digital document along with the device status report.

The method of the preceding paragraphs can include, in response to the reception of the at least one digital document from the disposal vendor, saving the at least one digital document to storage media and indicating, in a device tracking database, that the electronic device is associated with a corresponding digital document, wherein the indication of the digital document in the device tracking database includes at least one of a date on which the digital document was saved to the storage media, an electronic file name of the digital document, and a location at which the digital document is stored.

The method of the preceding paragraphs can include that the step of providing the at least one digital document to the client further comprises automatically evaluating the device tracking database for at least one indication that an electronic device is associated with a corresponding digital document, automatically retrieving the respective digital document from storage media, automatically sending a request to the client to provide an electronic location at which the client can receive the respective digital document, and automatically electronically transmitting the respective digital document to the client at the specified electronic location. The method of the preceding paragraphs can include that the at least one digital document includes at least ten digital documents each associated with an electronic device and the step of providing the at least ten digital documents further comprises automatically dividing the at least ten digital documents into discrete batches that include multiple digital documents and automatically electronically transmitting the batches to the client in separate electronic transmissions.

The method of the preceding paragraphs can include that a total number of electronic devices for which the first status and the second status are determined is greater than five hundred.

The method of the preceding paragraphs can include that the first portion of external information includes the inventory information and the step of determining the first status dependent upon the first portion of external information further comprises determining, dependent upon the inventory information in the first portion of external information, the first statuses for electronic devices that each are indicated to be one of the following: in inventory of a device provider and in process of being sent to a disposal vendor, wherein the first statuses dependent upon the inventory information are each one of In Stock Available, In Stock Unavailable, and In Stock Pending Disposal.

The method of the preceding paragraphs can include that the step of obtaining the first portion of external information further comprises accessing the inventory information on an enterprise resource planning (ERP) system of the device provider.

The method of the preceding paragraphs can include that the step of obtaining the second portion of external information that includes the device connection timestamps for the subset of electronic devices further comprises accessing the device connection timestamps on a client electronic communication system.

The method of the preceding paragraphs can include that the client electronic communication system is at least one of a unified endpoint management (UEM) system and a mobile device management (MDM) system.

A system for determining statuses for electronic devices with each electronic device being capable of having one of multiple statuses can include a device tracking database that includes statuses for each of the electronic devices; a first portion of external information regarding the electronic devices and including at least one of client information, shipping information, lease information, disposal information, and inventory information with the first portion of external information being digital information made available at a first time; a second portion of external information regarding the electronic devices and including at least one of client information, shipping information, lease information, disposal information, and inventory information with the second portion of external information being digital information made available at a second time; and a device tracking system in electronic communication with the device tracking database and configured to obtain the portions of external information, the device tracking system including at least one computer processor. The device tracking database can be configured to identify, for at least a first portion of the electronic devices concurrently, a first status for each electronic device of the first portion of electronic devices with the first status being based on the first portion of external information obtained by the device tracking system at the first time and identify, for at least a second portion of the electronic devices concurrently, a second status for each electronic device of the second portion of electronic devices with the second status being based on the second portion of external information obtained by the device tracking system at the second time that is after the first time. The system can also include a transmission module configured to provide to a client, via electronic communication, device status information dependent upon the device tracking database with the statuses including the first status for each respective electronic device for which the second status was not identified and the second status for each respective electronic device for which the second status was identified, wherein the device tracking system is configured to identify the first statuses and the second statuses for at least five hundred electronic devices and identify the first statuses for all respective electronic devices within a designated amount of time.

The system of the preceding paragraph can optionally include, additionally and/or alternatively, any one or more of the following features, configurations, steps, and/or components:

The system of the preceding paragraphs can include at least one application programming interface (API) configured to access at least a subset of the first portion of external information at a location distant from the device tracking system and provide, to the device tracking system, access to the at least subset of the first portion of the external information.

The system of the preceding paragraphs can include that the API is configured to request the subset of the first portion of external information via an electronic communication and receive the subset of the first portion of external information in response to the request.

The system of the preceding paragraphs can include that the first portion of external information includes the client information and the device tracking system further comprises an active analysis module in electronic communication with the device tracking database and configured to obtain the portions of external information, the active analysis module configured to determine, depending upon client information in the first portion of external information, the first statuses for electronic devices that are present in the client information and include a timestamp representative of a most recent time that the corresponding electronic device established an electronic connection to a digital client communication system.

The system of the preceding paragraphs can include that the active analysis module determines that the first status for each electronic device is In Use Active in response to an amount of time between a time represented by the timestamp for the respective electronic device and the current time being less than a threshold amount of time.

The system of the preceding paragraphs can include that the active analysis module determines that the first status for each electronic device is In Use Attention Required in response to an amount of time between a time represented by the timestamp for the respective electronic device and the current time being greater than a threshold amount of time.

The system of the preceding paragraphs can include that the threshold amount of time is thirty days.

The system of the preceding paragraphs can include that the device tracking system identifies the first status for the first portion of the electronic devices automatically and the second status for the second portion of the electronic devices automatically at regularly scheduled intervals.

The system of the preceding paragraphs can include storage media within which the device tracking database is electronically stored.

The system of the preceding paragraphs can include that the first portion of external information includes the shipping information and the device tracking system further comprises a shipping module in electronic communication with the device tracking database and configured to obtain the portions of external information, the shipping module configured to determine, dependent upon shipping information in the first portion of external information, the first statuses for electronic devices that are present in the shipping information.

The system of the preceding paragraphs can include that the first statuses for the electronic devices as determined by the shipping module are one of In Transit Shipped, In Transit Exception, In Transit Delivered, In Transit Returning, and In Transit Delayed Return.

The system of the preceding paragraphs can include that the shipping information in the first portion of external information is from at least one shipping company.

The system of the preceding paragraphs can include a user interface configured to allow for the visual display of information dependent upon the device tracking database.

The system of the preceding paragraphs can include that the client information in the first portion of external information is from at least one of: an enterprise resource planning (ERP) system of the client, a unified endpoint management (UEM) system of the client, and a mobile device management (MDM) system of the client.

The system of the preceding paragraphs can include that the first portion of external information includes the inventory information and the device tracking system further comprises a stock module in electronic communication with the device tracking database and configured to obtain the portions of external information, the stock module configured to determine, depending upon inventory information in the first portion of external information, the first statuses for electronic devices that are present in the inventory information.

The system of the preceding paragraphs can include that the first statuses for the electronic devices as determined by the stock module are one of In Stock Available, In Stock Unavailable, and In Stock Pending Disposal.

The system of the preceding paragraphs can include that the inventory information in the first portion of external information is from an enterprise resource planning (ERP) system of an electronic device provider.

The system of the preceding paragraphs can include that the first status and the second status for each electronic device are each one of the following: In Stock Available, In Stock Unavailable, In Stock Pending Disposal, In Transit Shipped, In Transit Delivered, In Transit Exception, In Transit Returning, In Transit Delayed Return, In Use Active, In Use Attention Required, Retired Disposed, Retired Sold, Retired Lease End, Retired Vendor Credit, Missing Lost, and Missing Stolen.

The system of the preceding paragraphs can include that the designated amount of time during which the device tracking system identifies the first statuses for all respective electronic devices is six hours.

The system of the preceding paragraphs can include that the first portion of external information includes the lease information and the device tracking system further comprises a lease analysis module in electronic communication with the device tracking database and configured to obtain the portions of external information, the lease analysis module configured to determine, depending upon lease information in the first portion of external information, the first statuses for electronic devices that are indicated as being returned to a lessor in the lease information.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for identifying and transmitting device information and ensuring associated electronic device files corresponding to the device information for multiple electronic devices are transmitted along with the device information to a client without duplicate transmissions of the associated electronic device files, the method comprising:

automatically identifying, dependent upon a designation by the client, the device information to provide to the client corresponding to a plurality of electronic devices of the multiple electronic devices, wherein the device information includes a device status for each respective electronic device and is at least partially found in a device tracking database;

automatically extracting, by a transmission module in response to the identification of the device information to provide to the client, the device information from the device tracking database;

automatically determining an available transmission size dependent upon a maximum size of one electronic transmission of information to the client;

automatically dividing via execution of computer-readable memory encoded with instructions, by the transmission module that includes a computer processor, the device information into discrete batches dependent upon the available transmission size, the discrete batches including device information corresponding to a designated number of electronic devices of the plurality of electronic devices with the designated number of electronic devices in each batch being specified by a device tracking provider;

separately transmitting, by the transmission module in response to the division of the device information into discrete batches, the discrete batches to the client in separate transmissions via electronic communication to a first electronic location on one or more servers of a client distributed server system;

automatically determining, by the transmission module in response to the transmission of at least one of the discrete batches, whether all discrete batches of the device information have been transmitted to the first electronic location on the one or more servers of the client distributed server system;

automatically combining, in response to the transmission module determining that all discrete batches have been transmitted, the discrete batches in a client device tracking database to form a complete set of device information corresponding to the plurality of electronic devices on the one or more servers of the client distributed server system;

automatically identifying, for each of the plurality of electronic devices included in the device information provided to the client, an indication in the device tracking database that the respective electronic device of the plurality of electronic devices includes:

an associated electronic device file;

a second electronic location at which the associated electronic device file is saved; and a first date representative of a time at which the associated electronic device file was saved to the second electronic location;

automatically comparing, for each of the plurality of electronic devices that include the indication, the first date to a second date representative of the last time the device information for the corresponding electronic device was transmitted to the client to determine whether the associated electronic device file was previously transmitted to the client along with the corresponding device information to ensure the associated electronic device file is transmitted along with the corresponding device information to the client without duplicate transmission of the associated electronic device file;

accessing, in response to the first date being more recent than the second date, each electronic device file at the second electronic location as indicated in the device tracking database for each corresponding electronic device;

automatically determining, for each electronic device file for which the first date is more recent than the second date, whether the electronic device file is smaller than or equal to the available transmission size; and automatically transmitting, by the transmission module and in response to each of the electronic device files being smaller than or equal to the available transmission size, the electronic device files to the client via electronic communication.

2. The method of claim 1, wherein, in response to the date the electronic device file was saved being more in the past than the date representative of the last time the device information for the corresponding electronic device was transmitted to the client, the respective electronic device file is not transmitted to the client.

3. The method of claim 1, wherein the electronic device files are transmitted to the client via at least one email.

4. The method of claim 1, wherein the step of automatically transmitting the electronic device files to the client further comprises:

dividing the to-be-transmitted electronic device files into discrete batches of electronic device files; and automatically transmitting, by the transmission module, each discrete batch of electronic device files to the client.

5. The method of claim 1, further comprising:

determining a client endpoint at the first electronic location to which the electronic device files are transmitted via electronic communication.

6. The method of claim 1, further comprising:

monitoring the transmission of the discrete batches of the device information; and generating an alert in response to a failure of at least one transmission of at least one of the discrete batches of the device information.

7. The method of claim 6, further comprising:

automatically retransmitting, in response to the failure of the at least one transmission, that discrete batch of the device information to the client.

8. The method of claim 1, further comprising:

receiving the electronic device files from a disposal vendor;

saving the electronic device files to the electronic location; and adding the indication of each electronic device file and the corresponding electronic location in the device tracking database for each corresponding electronic device of the plurality of electronic devices.

9. The method of claim 8, wherein the electronic device files are saved to storage media.

10. The method of claim 8, wherein each electronic device file is at least one of: a certificate of wipe, a certificate of recycle, and a certificate of sale regarding the corresponding electronic device.

11. The method of claim 1, wherein each discrete batch of device information includes device information corresponding to fifty electronic devices of the plurality of electronic devices.

12. The method of claim 1, wherein the designated number of electronic devices of the plurality of electronic devices for each discrete batch of device information is dependent upon at least one of: an electronic size of the device information corresponding to each electronic device in each discrete batch, the transmission time of each discrete batch, and a maximum electronic size that is able to be transmitted in each electronic transmission.

13. A system for identifying and transmitting device information and ensuring associated electronic device files corresponding to the device information for multiple electronic devices are transmitted along with the device information to a client without duplicate transmissions of the associated electronic device files, the system comprising:

device information that is designated to be provided to the client corresponding to a plurality of electronic devices of the multiple electronic devices with the device information including a device status for each respective electronic device of the plurality of electronic devices, wherein the device information is provided to the client at a first electronic location on one or more servers of a client distributed server system;

electronic device files associated with at least a portion of the plurality of electronic devices and saved in storage media;

a device tracking database that includes:

the device information;

the corresponding device statuses for the plurality of electronic devices; and an indication that at least one electronic device of the portion of electronic devices includes:

an associated electronic device file;

a second electronic location at which the associated electronic device file is saved; and a first date representative of a time at which the associated electronic device file was saved to the second electronic location;

a transmission module in communication with the device tracking database and storage media, the transmission module including at least one computer processor and configured, via execution of computer-readable memory encoded with instructions, to:

identify the device information from the device tracking database that is designated to be provided to the client;

automatically extract, in response to the identification of the device information to provide to the client, the device information from the device tracking database;

automatically determine an available transmission size dependent upon a maximum size of one electronic transmission of information to the client;

automatically divide the device information into discrete batches dependent upon the available transmission size, the discrete batches including that include device information corresponding to a designated number of electronic devices of the plurality of electronic devices;

automatically separately transmit, in response to the division of the device information into discrete batches, each of the discrete batches to the client via electronic communication;

automatically determine, in response to the transmission of at least one of the discrete batches, whether all discrete batches of the device information have been transmitted to the first electronic location on the one or more servers of the client distributed server system;

combine, in response to the determination that al discrete batches have been transmitted, the discrete batches into a complete set of device information corresponding to the plurality of electronic devices;

identify the indications in the device tracking database for each electronic device file corresponding to one electronic device of the portion of electronic devices;

compare, for each electronic device of the portion of electronic devices that includes the indication in the device tracking database that the electronic device has an associated electronic device file, the first date to a second date representative of the last time the device information for the corresponding electronic device was transmitted to the client to determine whether the associated electronic device file was previously transmitted to the client along with the corresponding device information to ensure the associated electronic device file is transmitted along with the corresponding device information to the client without duplicate transmission of the associated electronic device file;

retrieve, in response to the first date being more recent than the second date, each electronic device file at the second location set out in the device tracking database;

automatically determine, for each electronic device file for which the first date is more recent than the second date, whether the electronic device file is smaller than or equal to the available transmission size; and automatically transmit, in response to each of the electronic device files being smaller than or equal to the available transmission size, the electronic device files corresponding to the portion of electronic devices to the client via electronic communication.

14. The system of claim 13, wherein the transmission module is configured to:

divide the to-be-transmitted electronic device files into discrete batches of electronic device files; and automatically transmit each discrete batch of electronic device files to the client.

15. The system of claim 13, further comprising:

a client endpoint at the first electronic location to which the electronic device files are transmitted.

16. The system of claim 13, wherein each indication corresponding to each electronic device file further includes a date representative of the time at which the electronic device file was saved in the storage media.

17. The system of claim 13, wherein the electronic device files are received from a disposal vendor and each electronic device file is at least one of: a certificate of wipe, a certificate of recycle, and a certificate of sale regarding the corresponding electronic device.

* * * * *